United States Patent [19]

Gross et al.

[11] Patent Number: 5,764,509
[45] Date of Patent: Jun. 9, 1998

[54] INDUSTRIAL PROCESS SURVEILLANCE SYSTEM

[75] Inventors: Kenneth C. Gross, Bolingbrook; Stephan W. Wegerich, Glendale Heights; Ralph M. Singer, Naperville, all of Ill.; Jack E. Mott, Idaho Falls, Id.

[73] Assignee: The University of Chicago, Chicago, Ill.

[21] Appl. No.: 666,938

[22] Filed: Jun. 19, 1996

[51] Int. Cl.⁶ .................................................. G05B 13/04
[52] U.S. Cl. .......................... 364/149; 364/148; 364/164; 395/22
[58] Field of Search .............................. 364/148, 149, 364/164, 492, 576, 554, 600, 198; 395/22; 376/216, 217; 340/506, 651

[56] References Cited

U.S. PATENT DOCUMENTS 4,295,128  10/1981  Hashemian et al. .................. 340/506
4,975,685  12/1990  Rahhal ................................. 340/651
5,009,833   4/1991  Takeuchi et al. ..................... 376/127
5,223,207   6/1993  Gross et al. .......................... 376/216
5,402,521   3/1995  Niida et al. .......................... 395/22
5,410,492   4/1995  Gross et al. .......................... 364/492
5,459,675  10/1995  Gross et al. .......................... 364/492
5,586,066  12/1996  White et al. ......................... 364/576

Primary Examiner—Reba I. Elmore
Assistant Examiner—Ramesh Patel
Attorney, Agent, or Firm—Michael D. Rechtin; Foley & Lardner

[57] ABSTRACT

A system and method for monitoring an industrial process and/or industrial data source. The system includes generating time varying data from industrial data sources, processing the data to obtain time correlation of the data, determining the range of data, determining learned states of normal operation and using these states to generate expected values, comparing the expected values to current actual values to identify a current state of the process closest to a learned, normal state; generating a set of modeled data, and processing the modeled data to identify a data pattern and generating an alarm upon detecting a deviation from normalcy.

30 Claims, 96 Drawing Sheets

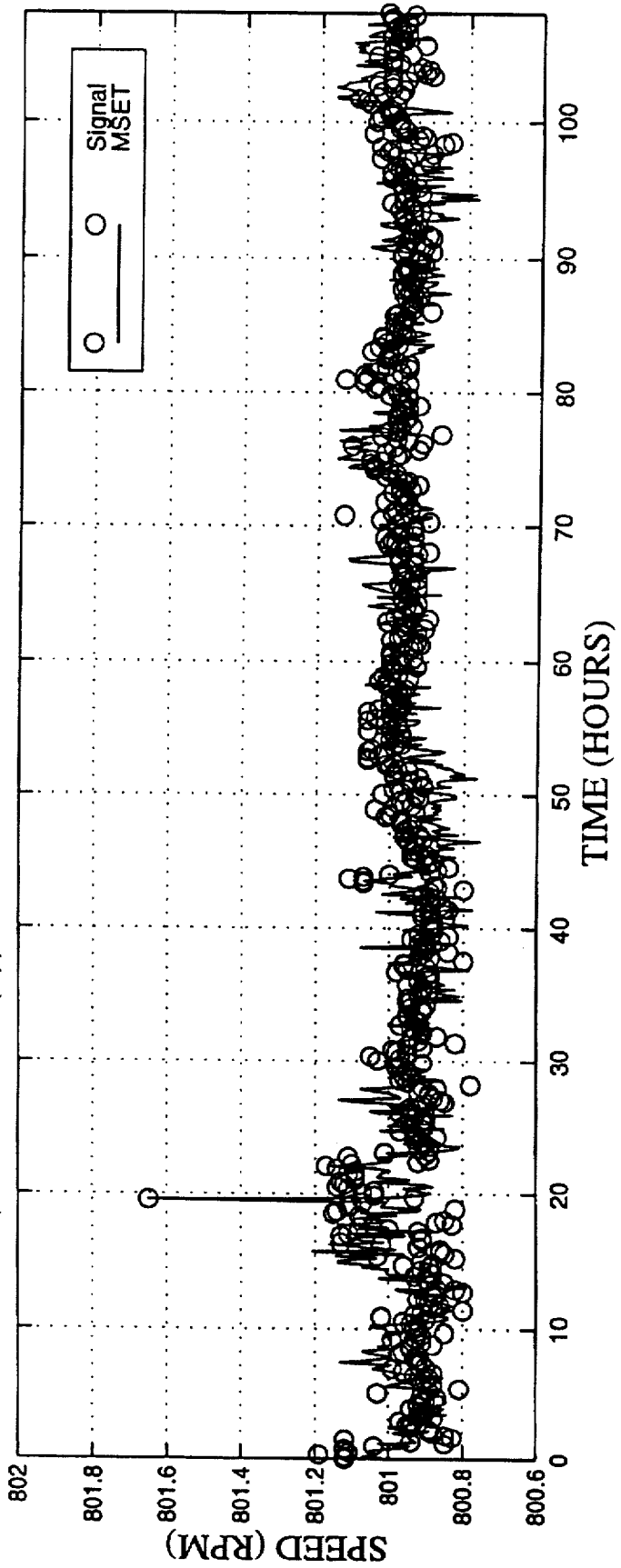

INDUSTRIAL PROCESS SURVEILLANCE SYSTEM

This invention was made with U.S. Government support under Contract No. W-31-109-ENG-38 awarded by the Department of Energy. The U.S. Government has certain rights in this invention.

The present invention is related generally to a method and system for carrying out surveillance of industrial processes using sensor or data source outputs. More particularly, the invention is concerned with a method and system for processing sensor data and using virtual data as an improved methodology over basic statistical approaches to industrial process surveillance. Further, the invention involves use of a plurality of techniques coupled for enhanced analysis of industrial process data.

Conventional parameter-surveillance schemes are sensitive only to gross changes in the mean value of a process or to large steps or spikes that exceed some threshold limit check. These conventional methods suffer from either large numbers of false alarms (if thresholds are set too close to normal operating levels) or a large number of missed (or delayed) alarms (if the thresholds are set too expansively). Moreover, most conventional methods cannot perceive the onset of a process disturbance, sensor deviation or data anomaly which gives rise to a signal below the threshold level for an alarm condition. Most methods also do not account for the relationship between a measurement by one sensor relative to another sensor measurement.

In another monitoring method, a conventional sequential probability ratio test ("SPRT") technique has found wide application as a signal validation tool in the nuclear reactor industry. The SPRT method is a pattern recognition technique which processes the stochastic components associated with physical process variables and has high sensitivity for the onset of subtle disturbances in those variables. Two features of the conventional SPRT technique make it attractive for parameter surveillance and fault detection: (1) early annunciation of the onset of a disturbance in noisy process variables, and (2) the SPRT technique has user-specificable false alarm and missed-alarm probabilities. SPRT techniques are primarily directed to the analysis of data from paired or multiple pairs of sensors in contrast to a large number of different process sensor data points. SPRT is also typically dependent on assumptions of the data being independent of other data sources and being Gaussian distributed data. The SPRT technique used alone therefore has certain shortcomings in identifying anomalies in processes.

Other types of statistical techniques also have been developed for industrial process monitoring and analysis but have other insensitivities for certain classes of sensor data.

It is, therefore, an object of the invention to provide an improved method and system for surveillance of industrial processes and apparati.

It is another object of the invention to provide a novel method and system for on-line surveillance of industrial processes and apparati with multiple sensors.

It is also an object of the invention to provide an improved method and system for evaluation of process data, on-line or off-line, from sensors or data accumulation sources.

It is a further object of the invention to provide a novel method and system for performing preliminary analysis of data for alarm conditions prior to data input to a SPRT system.

It is an additional object of the invention to provide an improved method and system for masking selected sensor data and substituting virtual data to perform tests to determine whether abnormal process conditions or abnormal sensor conditions exist and whether or not to halt or modify the process under scrutiny.

It is still another object of the invention to provide a novel method and system using training data characteristic of normal system and/or sensor and/or data source operation to compare with ongoing industrial processes and/or data accumulation.

It is yet a further object of the invention to provide an improved method and system for processing data from a process to determine training data for normal operation, storing such training data on a computer storage media and analyzing real process data relative to the normal training data using a plurality of mathematical methodologies stored on a ROM or PROM storage medium.

It is also an additional object of the invention to provide a novel method and system utilizing a virtual signal characteristic of normal state operation derived on the basis of correlation with a plurality of other process data values to compare with a real process data signal set for deriving the likelihood of an abnormal process or operation of data sources.

It is yet another object of the invention to provide a novel method and apparatus to accumulate training data to recognize any one of a plurality of specific states of operation and thereby identify a particular type of fault or condition present in a process or other system.

It is also a further object of the invention to provide a novel method and apparatus for monitoring a process using training data to identify slowly changing operational sensor data characteristic of normal process changes.

It is still an object of the invention to provide an improved method and system for determining whether a system or data source abnormality can be ignored without undesirable effects.

Other advantages and features of the invention, together with the organization and manner of operation thereof, will become apparent from the following detailed description when taken in conjunction with the accompanying drawings described below.

BRIEF DESCRIPTION OF THE DRAWINGS

FIG. 9A illustrates sensor signal data from pump 1 speed with an SMSET estimate superimposed thereon.

FIG. 21 shows subassembly outlet temperature ("SOT") and SMSET estimates and in particular

FIGS. 24C and 24D correspond exactly to FIGS. 22C and 22D, respectively;

FIGS. 28A and 28B corresponds exactly to FIGS. 22A and 22B.

DETAILED DESCRIPTION OF PREFERRED EMBODIMENTS

Figure 1:
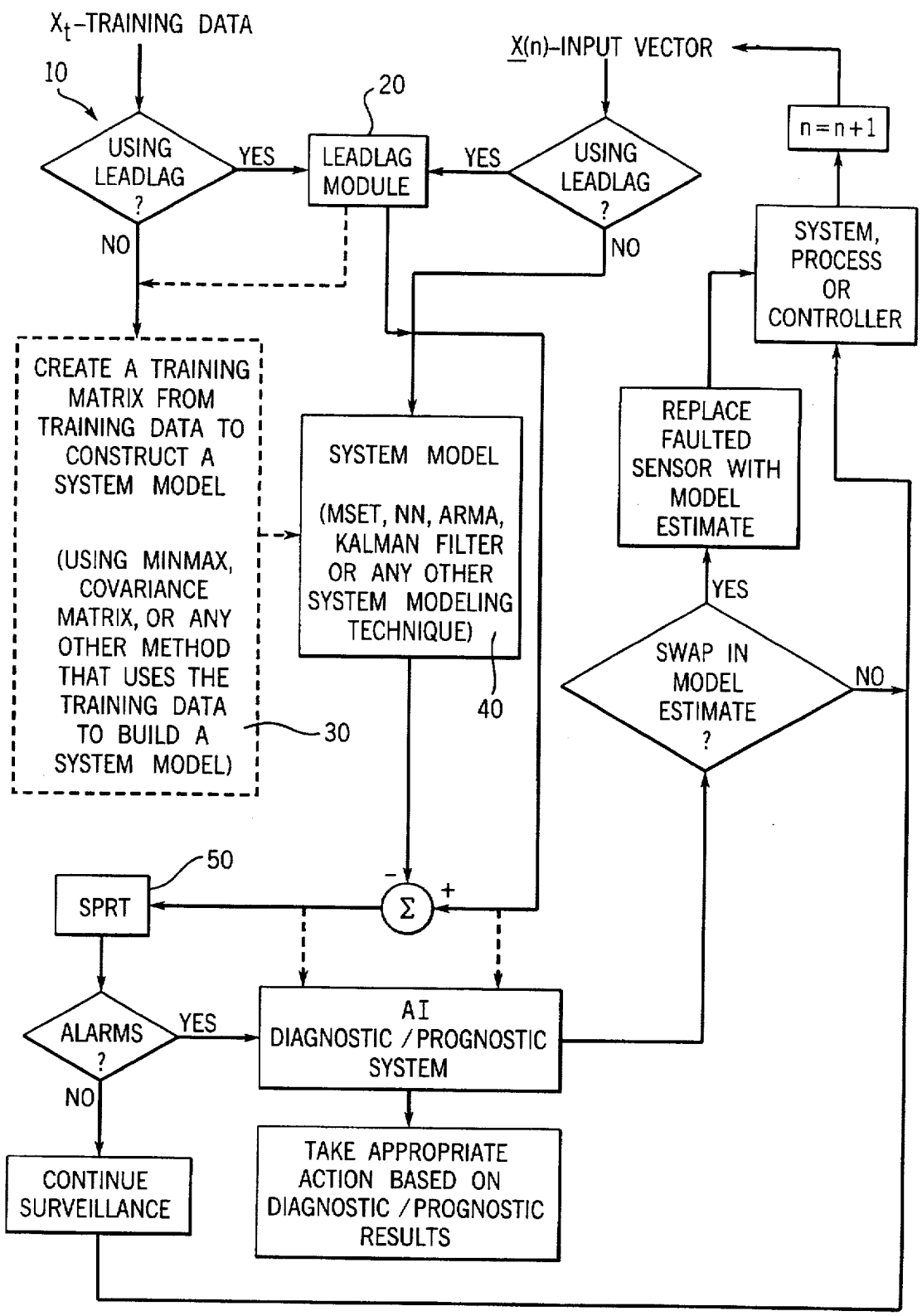
FIG. 1 illustrates a schematic functional flow diagram of a preferred embodiment of the invention.
Figure 2:
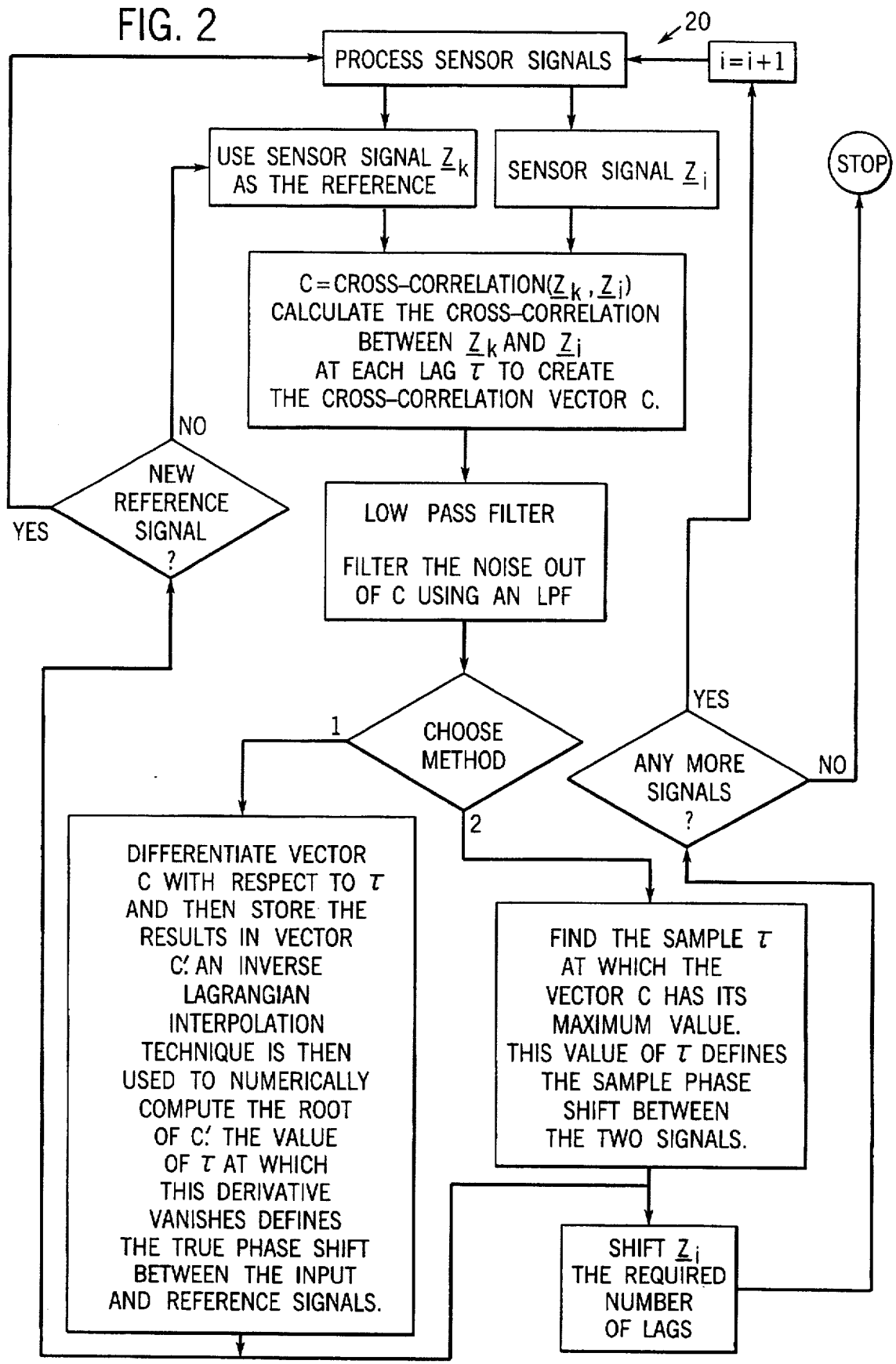
FIG. 2 illustrates a functional flow diagram of a time lead-lag correlation methodology.
Figure 3:
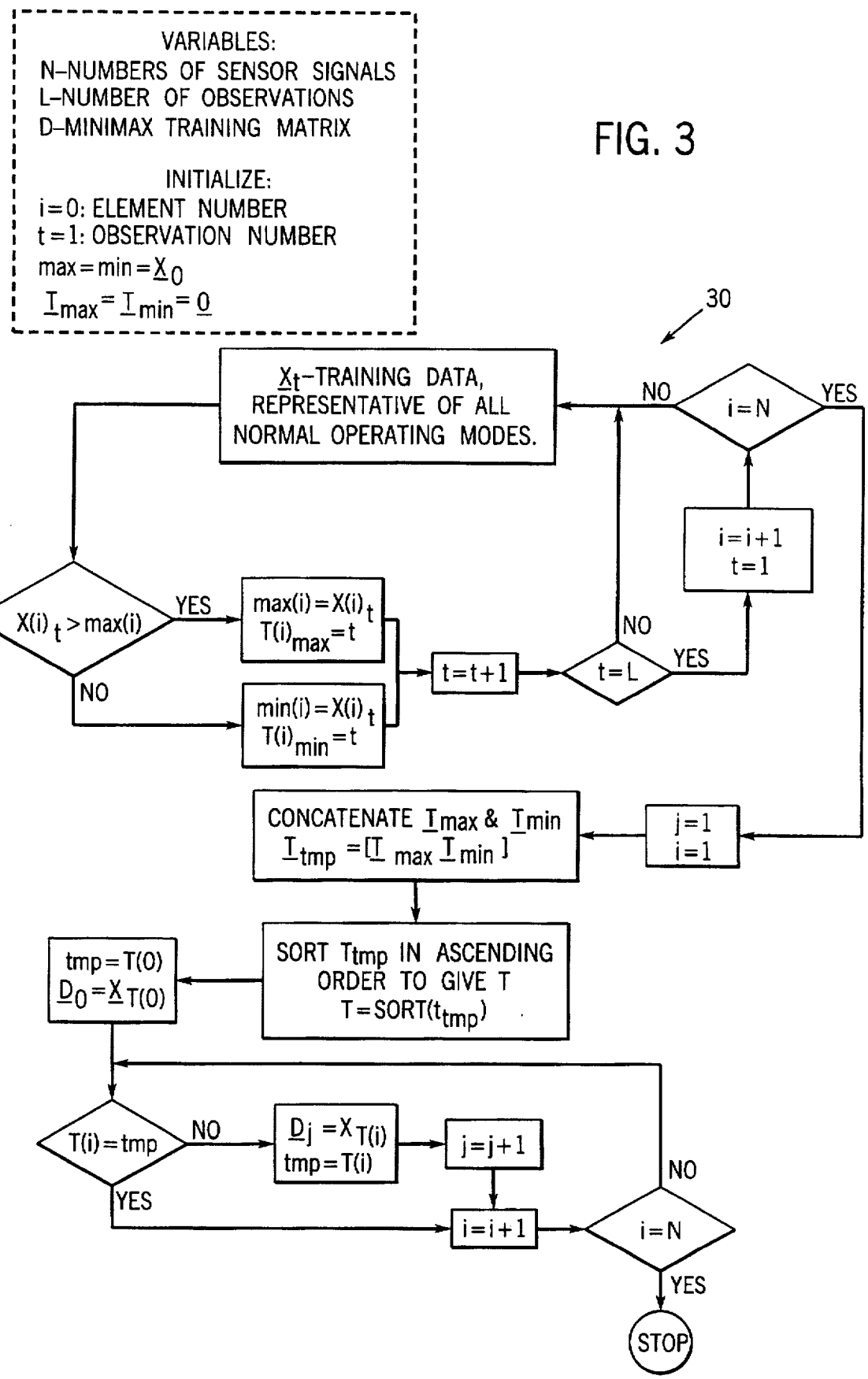
FIG. 3 illustrates a functional flow diagram of a method of determining a full range of data by searching normal state training data.
Figure 4:
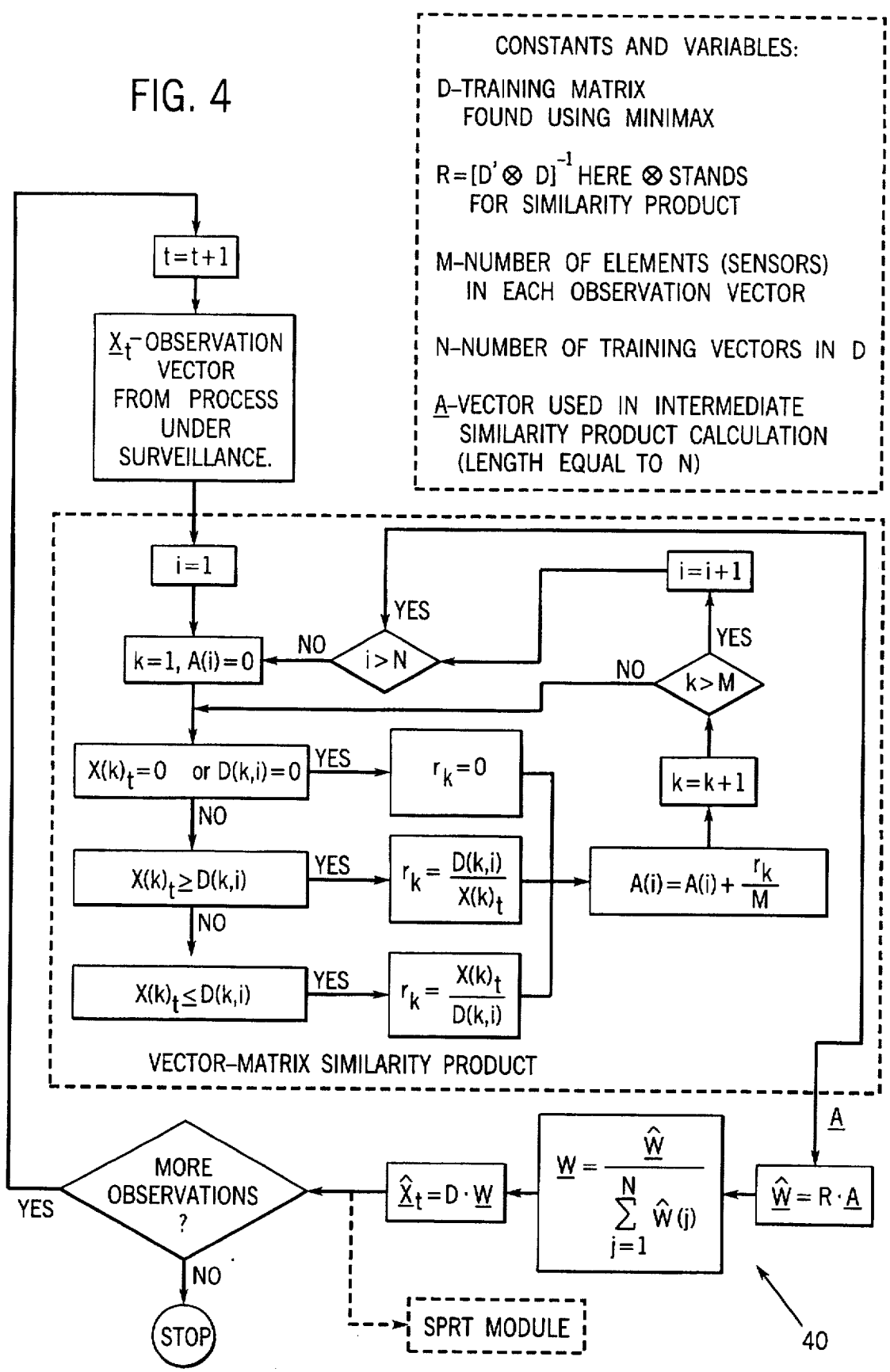
FIG. 4 illustrates a functional flow diagram of a method for modeling behavior of commercial system operating states.
Figure 5:
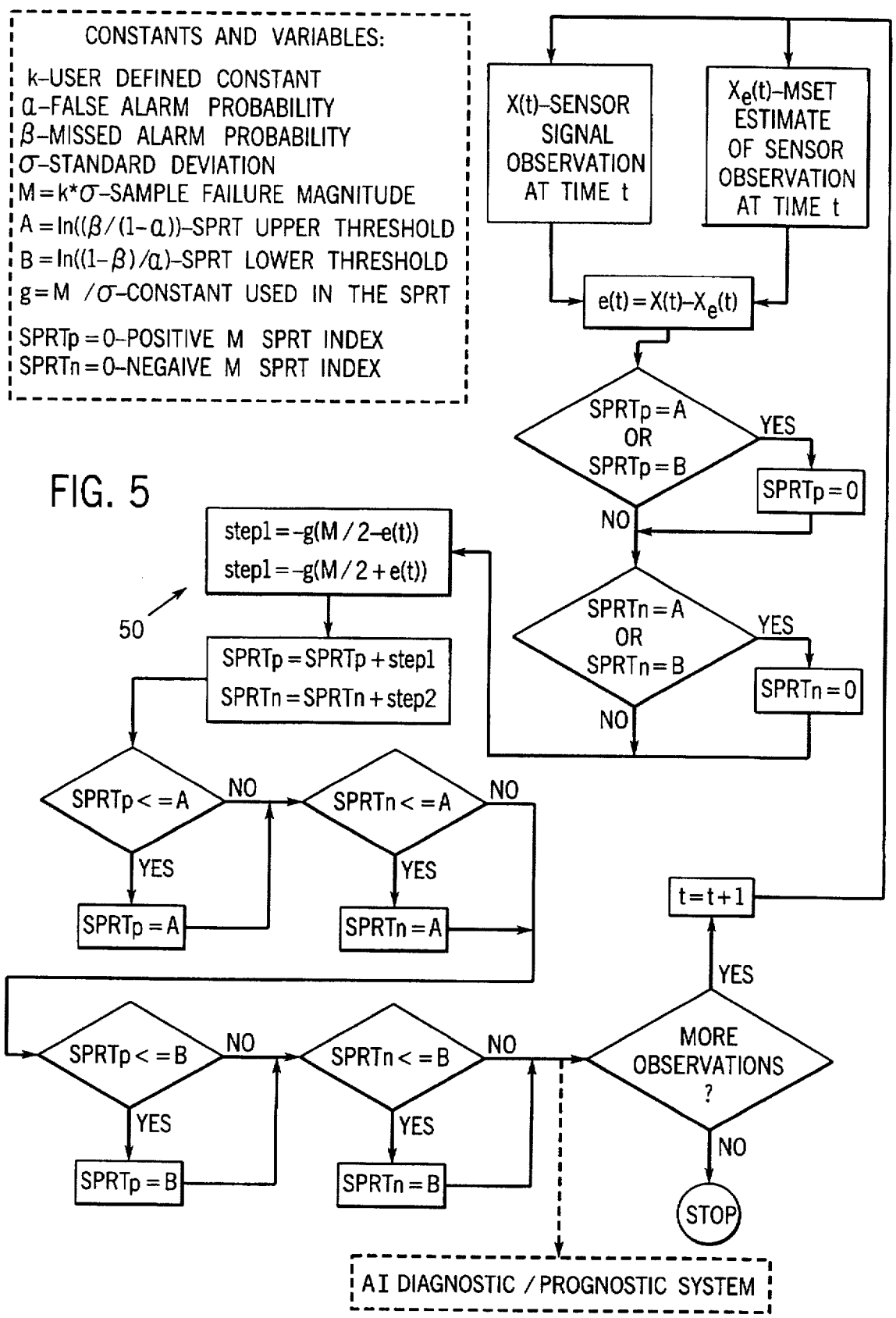
FIG. 5 illustrates a functional flow diagram of a method for performing pattern recognition.

The system 10 herein includes a methodology (see FIG. 1) and apparatus for surveillance of sensor or data accumulation configurations in industrial, utility, business, medical, investment and transportation applications. The system 10 is useful for sensitive identification of the onset of sensor or data source degradation, process or system anomalies, or the onset of change to a different operational state. The most preferred form of the system 10 comprises a synergistic integration of four techniques to provide enhanced surveillance capabilities compared to conventional approaches (including neural networks), and also provide enhanced reliability and improved computational efficiency. The four elements that make up the most preferred surveillance form of the system 10 are embodied in four different methodologies generally characterized as a time correlation module 20, a training module 30, a system state estimation module 40 and a pattern recognition module 50.

Many attempts to apply conventional neural networks to nuclear, petrochemical or any industrial process surveillance applications have met with poor results in part because they fail to take into account lead-lag relationships (lack of proper time correlation of the data sets) between the various sensors or data sources. In one example, a pipe is instrumented with a sequence of N thermocouples ("TCs") which measure the instantaneous temperature of the fluid passing through the pipe; and the signals from these TCs are displaced in time along the fluid stream flow path. If the sampling interval for the sensors is smaller than the transit time for fluid passing through the pipe, any attempt to monitor these signals with a neural net will produce very high uncertainties in the estimated signals for the TCs. For example, if it takes ten seconds for the fluid to pass through the pipe, and the sampling interval is one second, then at any given instant in time, TC(N), at the outlet end of the pipe, is seeing fluctuations that passed TC(1) ten seconds ago. These TCs may still contain a small degree of correlation due to gross changes in fluid temperature from a heat source or sink that is upstream of the pipe; however, the more valuable intersensor correlation that arises from local temperature perturbations carried along the pipe will be lost. This same phenomenon degrades the performance of neural networks and other pattern-recognition paradigms applied to any processes wherein the physical sensors or data sources are displaced in time across the process they are monitoring. Other examples of time delays in correlated systems include: systems with slow data flow rates and/or large physical distances (oil refineries, power plants, HVAC (heat, vent and air conditioning systems, and financial systems), delays due to analog or digital electronics (noise filters and large capacitors) or transmission delays (satellite communications, or transmitting data over different BUS systems.

In a preferred form of the time con elation model 20, a Leadlag component of the invention (see FIG. 6) performs dynamic, real-time intersensor lead-lag adjustments. The Leadlag module 20 performs adjustments so that the output signals, which are then input subsequently into the SMSET routine (the system state estimation module 40), are optimally correlated and impart the maximum information content to the pattern recognition module 50. The Leadlag module 20 is attached hereto as a computer software Appendix A. The Leadlag module 20 accomplishes the adjustment function by performing, for each pair of signals, an iterative regression procedure that generates a vector of correlation coefficients with respect to lag time. This vector of correlation coefficients is a unimodal concave function of lag time. Thus, the optimal lag time between the pair of signals is identified simply by searching for the zero-crossing of the first derivative of the vector with respect to the lag time.

In other forms of the invention it may be unnecessary to utilize the Leadlag module 20, as noted in FIG. 1 wherein the option exists to skip use of the module 20. This could occur for systems in which there is adequate time correlation or if time shifting is not needed to achieve correlation. If the Leadlag module 20 is not utilized or the data has already been processed by the Leadlag module 20, the data is preferably input to a training module 30.

In a preferred embodiment this training module is a MiniMax module 30 which searches through all the observations for all signals or data during a training time period to construct training vectors that include the highest point and lowest point for each signal or data space under surveillance. A computer software Appendix B sets forth the MiniMax module 30 The MiniMax module 30 produces an "optimal" training set. It is optimal in the sense that it contains only, at most, 2N vectors, where N is the number of signals or data points in the system; and these vectors span the full range that all sensors or data sources have noted during the available training period. Wherever two or more sensors or data sources simultaneously attain maxima or minima, the resulting number of training vectors will be less than 2N.

In another form of the invention both the Leadlag module 20 and the MiniMax module 30 can be skipped, and the data can be input directly to the system state module 40.

Once the MiniMax module 30 has constructed a system model (or been skipped as noted above), the system state estimation module 40 (such as the preferred Subsystem Multivariate State Estimation Technique ("SMSET") module) models the behavior of a system through examples of the operating states of the commercial system being modeled. A computer software Appendix C sets forth the SMSET module 40. In general, the system state estimation module 40 can be any one of a variety of modeling methodologies, such as auto regressive moving average, a neural network, or a Kalman filtering technique or an empirical methodology.

The SMSET module 40 utilizes its memory of the learned states of the commercial system in conjunction with a single new observation to provide an estimate of the current "true" system state. States of the system are represented by vectors whose elements are comprised of direct values of system parameters (measured signals) as well as any transformation of these system parameters that produce scalar values, e.., calculated parameters based upon measured data. The SMSET module 40 does not require the state vector elements to be linearly independent as do most other types of estimation techniques. The learning process, which results in a "learned-state" matrix, is performed according to the MiniMax module 30 and the Leadlag module 20 described hereinbefore.

The basic methodology of the SMSET module 40 involves the input of a new observation of the behavior of a system that is compared with the "memory" of previous system behavior embodied in the learned-state matrix. A series of mathematical operations are performed that generates an estimate of the states in the system's memory that is "closest" to the new observation. The definition of "closest" that is used by the SMSET module 40 is the state that is lying closest to the new observation from the point of view of a set of rules that determine the association of two vectors. From this closest state, an estimate of the "true" state of the system is performed for each and every element of the state vector. Thus, given a set of current observed parameters of a system, the SMSET module 40 provides an estimate of the current true state of the system. The value of this method is that an estimate of all of the values of the system parameters in the state vector can be provided even if the current observation vector is incomplete (e.g., some sensors of data sources may have failed or are no longer available), contains erroneous or faulty elements (some sensors may have drifted, become uncalibrated, become contaminated with high noise levels, etc.), or even if the new system state does not coincide with previous operating states. However, the new system state must, in a general sense, be bounded by the domain of the states used to develop the system memory (learned-state matrix).

This estimation of the hue current state of the commercial system, including estimated values of all system parameters, is used in conjunction with the actual measured system parameters to ascertain the operability of sensors (or other data sources) and disturbances in the system state. This state estimation process can further be described as an inference engine that accepts as input a set of learned states and a new observation of the commercial system. After a series of operations are performed by the inference engine on this input, the result is an estimate of the learned state "closest" to the new observation. The definition of "closest" used here is the state lying closest to the new observation from the point of view of a set of rules that determine the association (overlap) of any two vectors. Another result is the estimation of the "true" value of each and every element in the new observation vector in the form of an estimated state vector. The series of operations performed in the inference engine consist of various matrix operations. First, all pairs of learned states are preferably associated two at a time using a rule set to create the elements of a recognition matrix. Next, the new observation is associated with each learned state using the rule set to produce a vector that has the same number of elements as the number of learned states. The largest element value in this vector identifies the "closest" learned state to the new observation. Finally, the normal matrix product of this vector with the recognition matrix produces a set of linear combination coefficients for combining the learned states into the estimated state vector. This methodology, when applied to any true state of a commercial system that is a combination of the learned states, yields a very close approximation to the true state. The actual closeness achieved depends most upon nonlinearities arising from the rule set and physical and/or random fluctuations in the variables and is demonstrated by direct testing. General experience with use of this method for real operating commercial systems has indicated predictive capabilities typically no worse than ±0.5% and normally ±0.1%.

Once the SMSET module 40 has modeled the data as described hereinbefore, the data is input to a pattern recognition module 50, such as the Sequential Probability Ratio Test ("SPRT") module. The computer software for the SPRT module 50 is in Appendix D. This SPRT module 50 is a sensitive pattern recognition method that can detect the onset of subtle degradation in noisy signals with high reliability, and with quantitative false-alarm and missed-alarm probabilities. Output from the SMSET module 40 is provided as a set of estimated signals (also called "virtual signals") for each sensor under surveillance. These virtual signals are fed into a network of interacting SPRT modules 50 together with the actual sensor readings. Each of the SPRT modules 50 receives one sensor-signal, virtual-signal pair. If any sensor degradation or process disturbance starts to affect the output of one or more signals under surveillance, the SPRT module(s) 50 provide an annunciation to the operator and an actuator signal to the control system, which can selectively as needed automatically swap in the virtual signal to replace the degrading sensor signal, or data source. Further details of the SPRT module 50 are described in U.S. Pat. No. 5,459,675, which is incorporated by reference herein.

The above-described combination of methodologies enables identification of a faulted process, a particular type of fault, a faulted sensor or data source or faulty data itself and enables actions to be taken to correct or modify the process being monitored.

In some cases when a failed sensor, or improper data stream source, is not important to the continued operation of a commercial system, the user can continue operating the commercial system or process if the sensor or data source were operating normally. For example, the system 10 can operate to substitute in a modeled estimate into an actual commercial system or process as input to replace a failed sensor or failed data source. This allows the commercial system or process to keep operating.

Since the system 10 does not rely on analytical modeling by itself, it is applicable to a wide variety of processes and systems, such as petro-chemical, power generation, automotive, manufacturing, medical, aeronautical, financial and any system in which signals are available for processing that are related to the commercial system/process operation or performance. The only requirement of the system 10 is that there is some type of cross-correlation, be it linear or nonlinear, between the signals used as input to the system 10. The signals can be linear, nonlinear, stationary, nonstationary, clean or noisy (with an arbitrary distribution). The system 10 uses a database of historical operation data to model the commercial system or process. The database is assumed to contain data from all relevant operating modes of the system; however, if a new mode of operation is encountered and is determined not to be a result of commercial system or sensor failures, a new vector can be added to the existing training matrix to incorporate the unanticipated operating mode in the system model.

The following nonlimiting examples illustrate various aspects of the invention described herein. The data used is all taken from the EBR-II reactor at Argonne National Laboratory (West).

EXAMPLE I

Figure 6A:
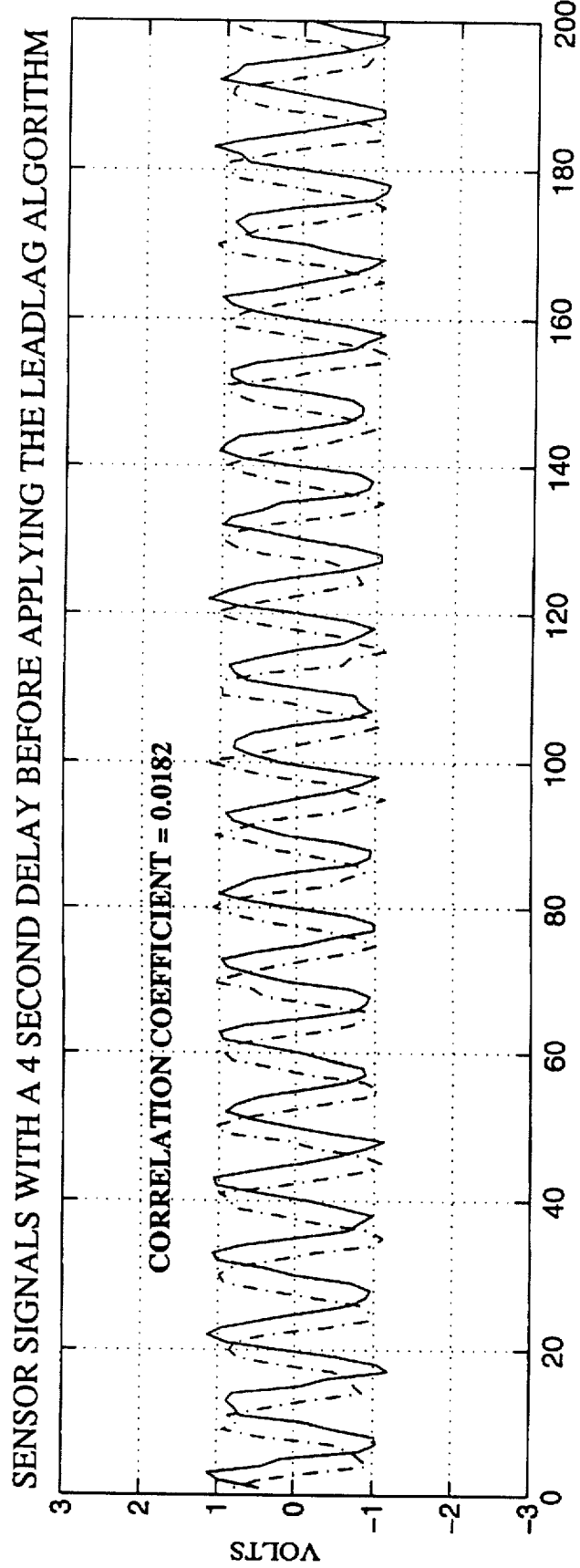
FIG. 6A illustrates sensor signals having a four second delay before applying a lead-lag method.
Figure 6B:
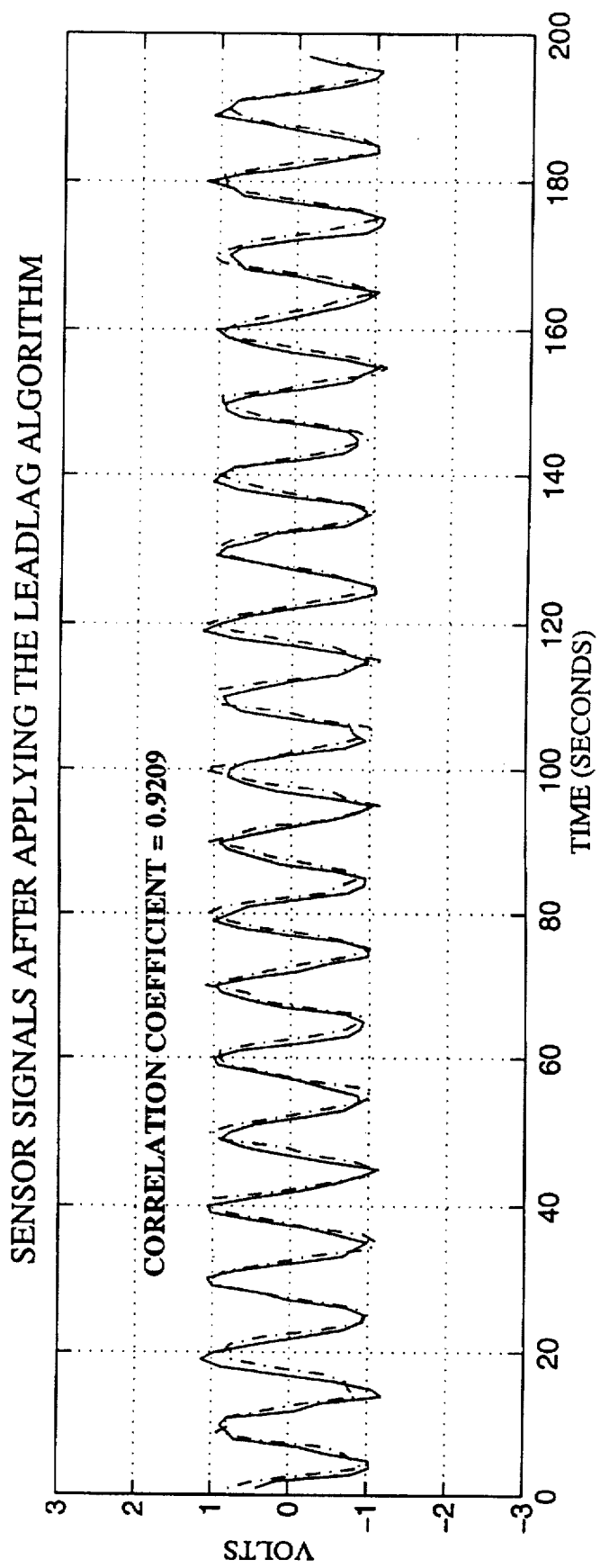
FIG. 6B illustrates the sensor signals after applying the lead-lag method.
Figure 7A:
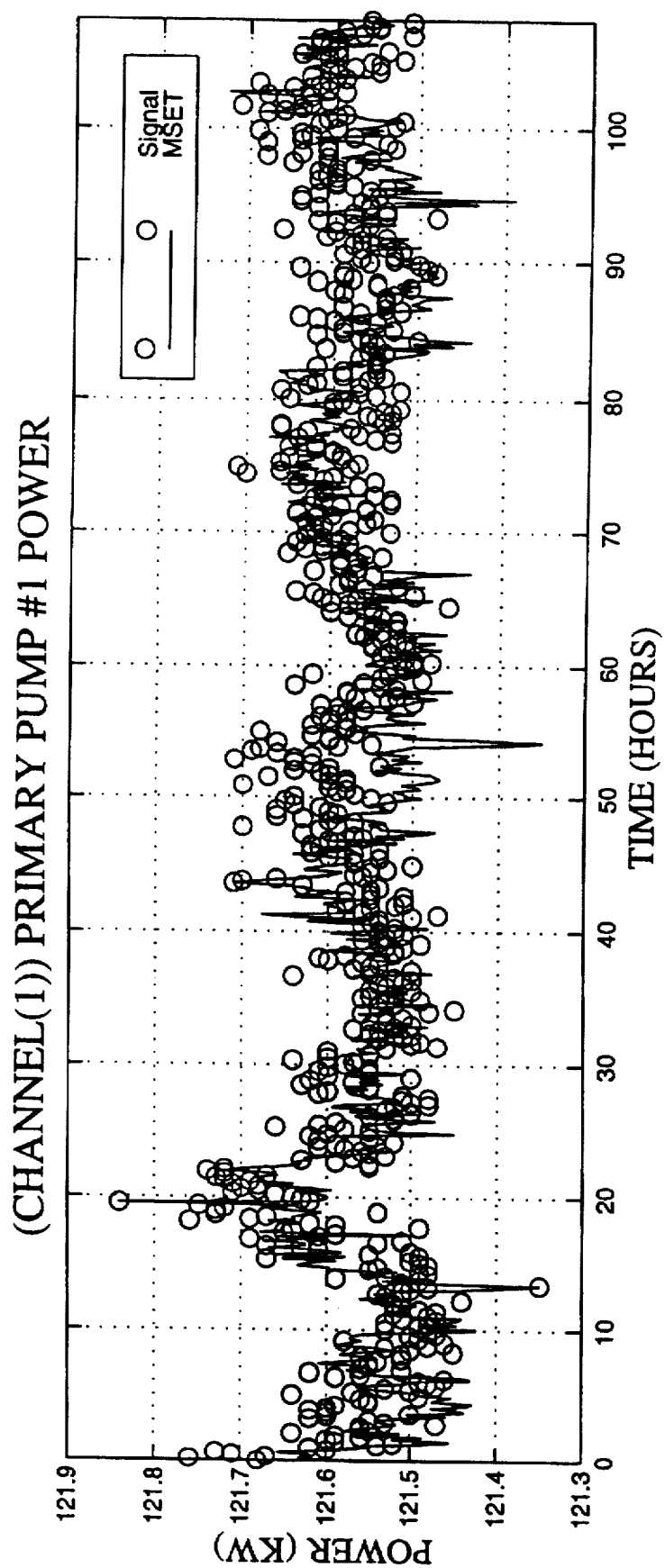
FIG. 7A illustrates sensor signal data from pump 1 power with an SMSET estimate superimposed thereon.
Figure 7B:
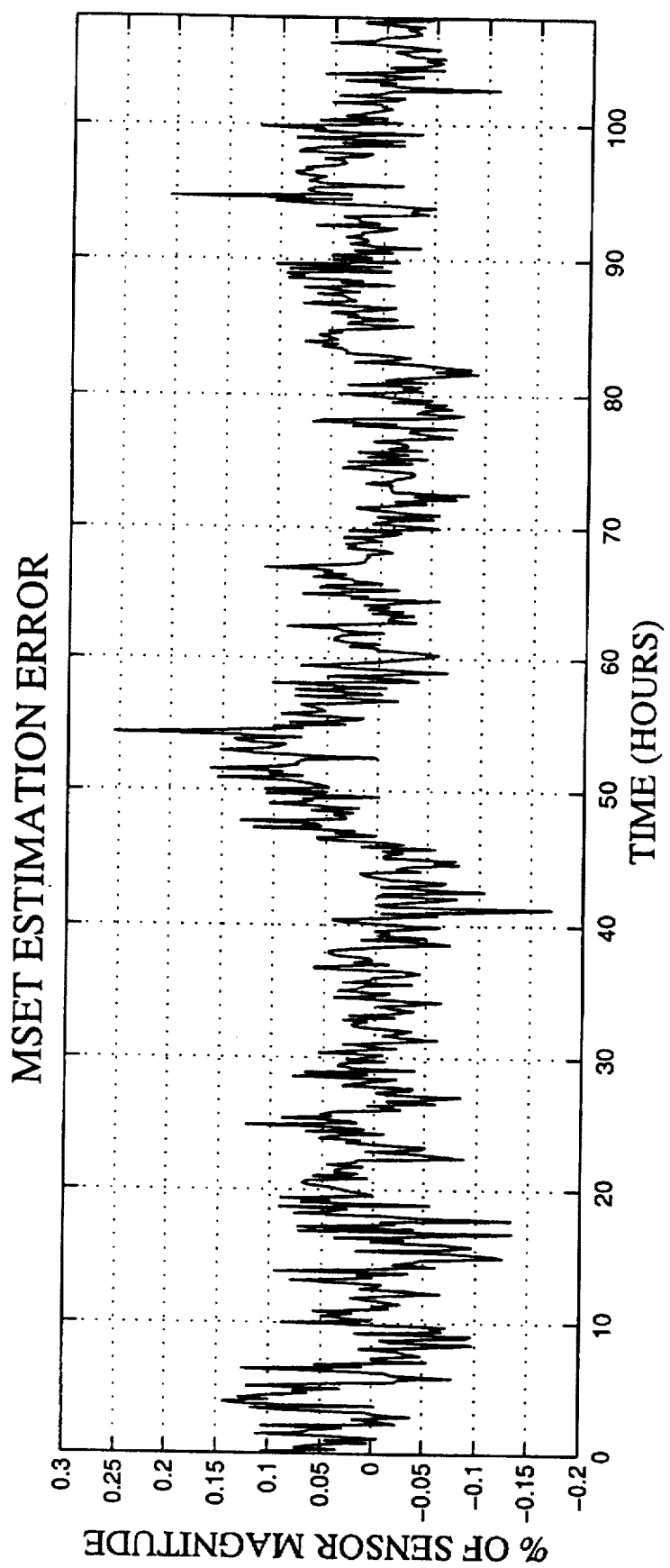
FIG. 7B illustrates the SMSET estimation error between the SMSET estimate and the sensor signal data.
Figure 7C:
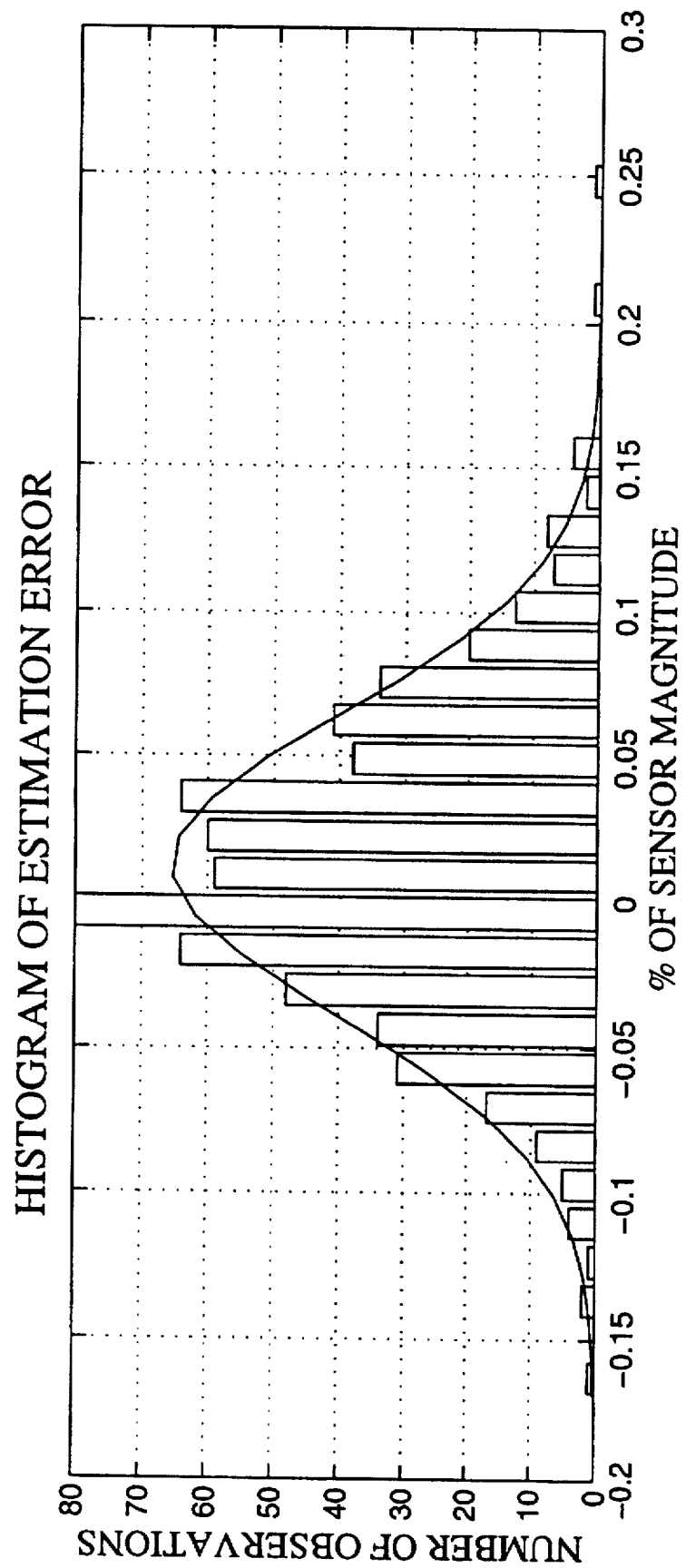
FIG. 7C illustrates a histogram of the error.
Figure 8A:
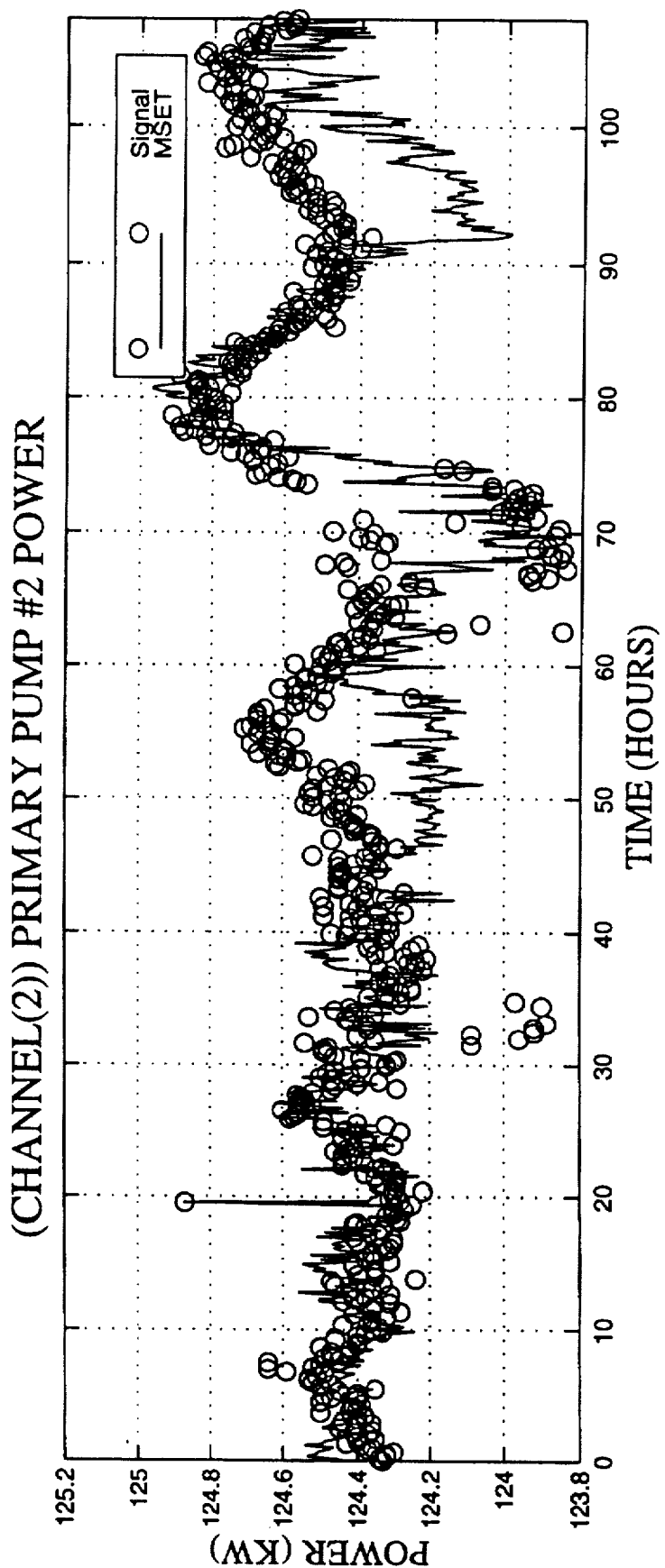
FIG. 8A illustrates sensor signal data from pump 2 power with an SMSET estimate superimposed thereon.
Figure 8B:
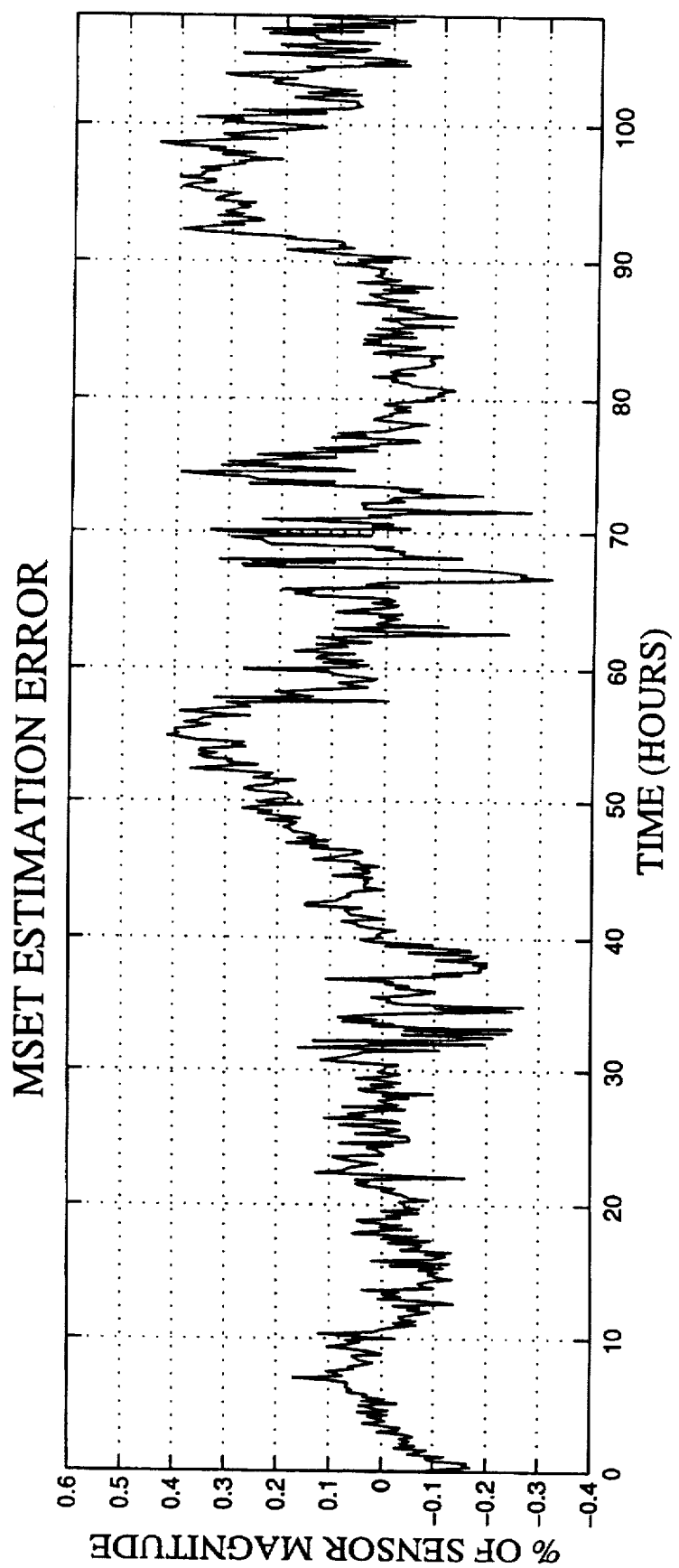
FIG. 8B illustrates the SMSET estimation error between the SMSET estimate and the sensor signal data.
Figure 8C:
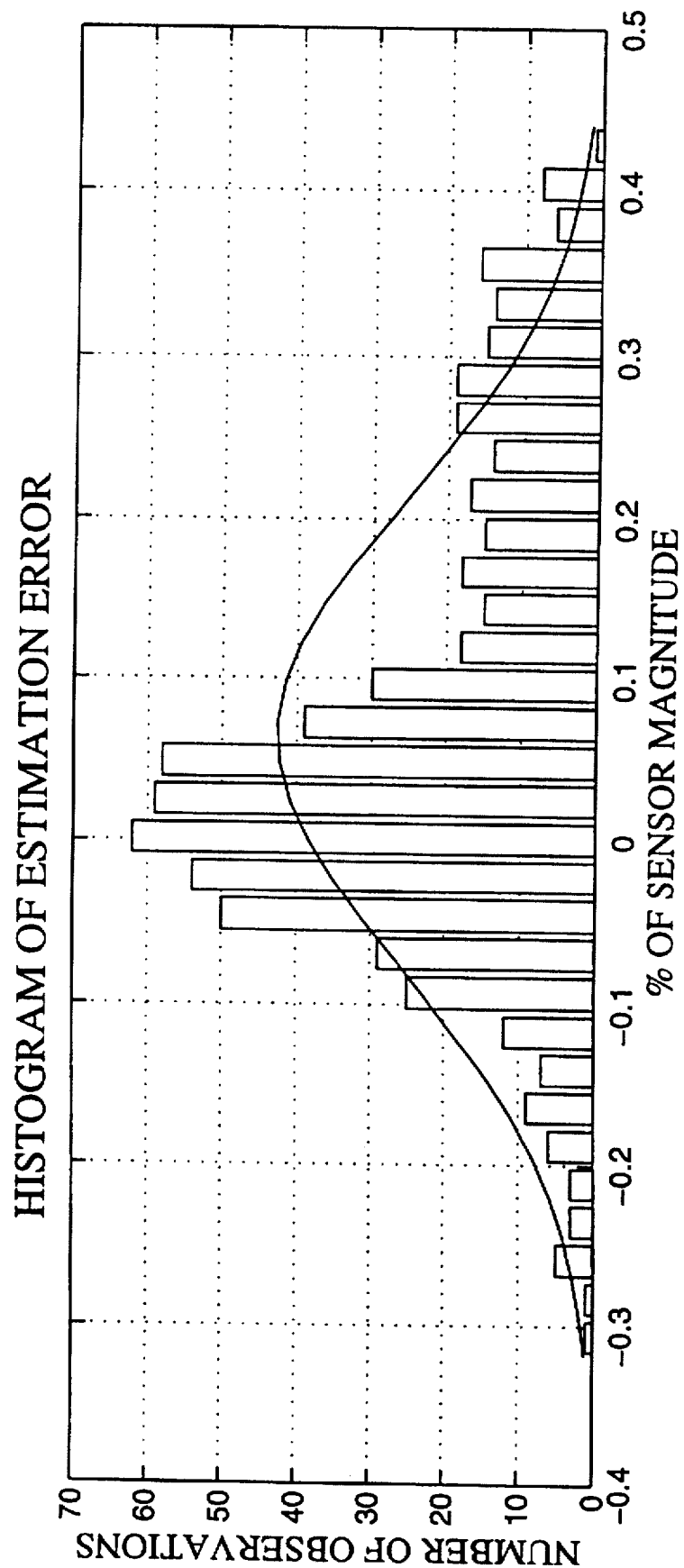
FIG. 8C illustrates a histogram of the error.
Figure 9B:
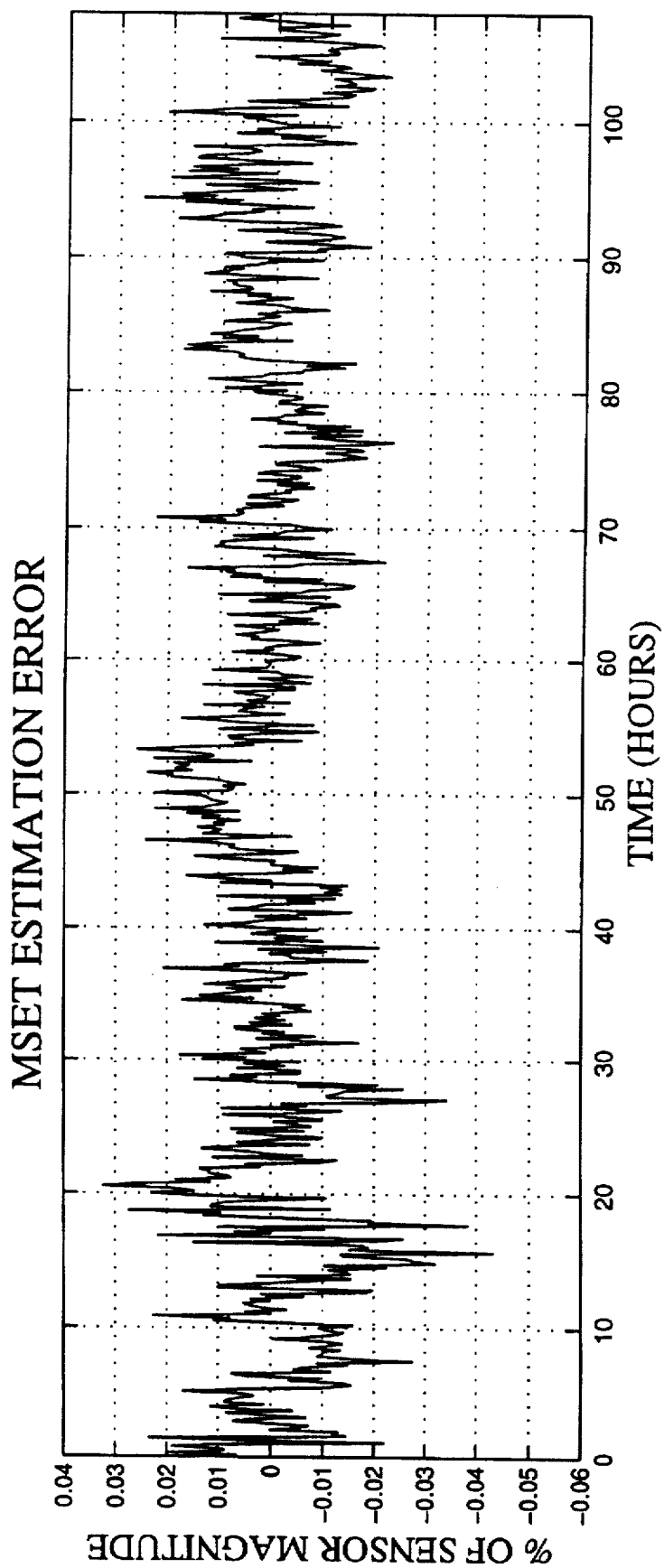
FIG. 9B illustrates the SMSET estimation error between the SMSET estimate and the sensor signal data.
Figure 9C:
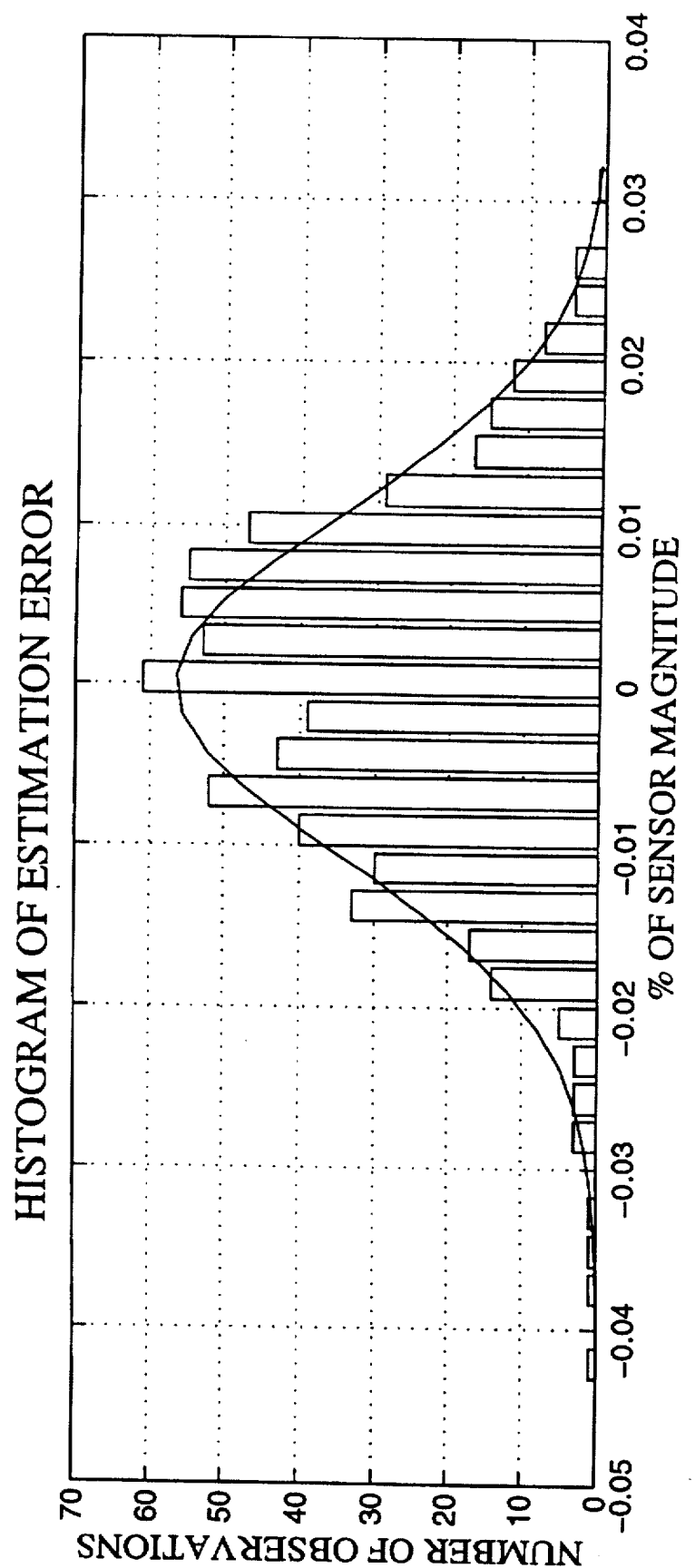
FIG. 9C illustrates a histogram of the error.
Figure 10A:
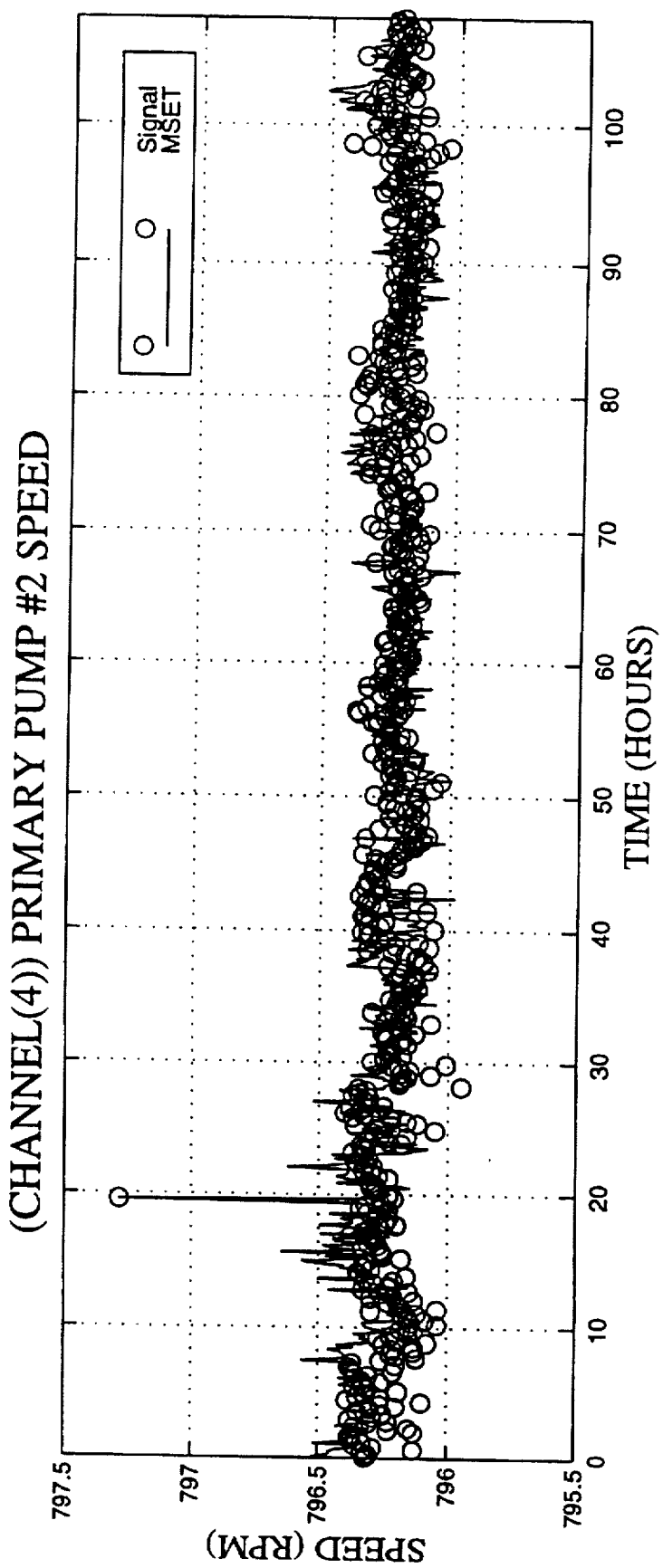
FIG. 10A illustrates sensor signal data from pump 2 speed with an SMSET estimate superimposed thereon.
Figure 10B:
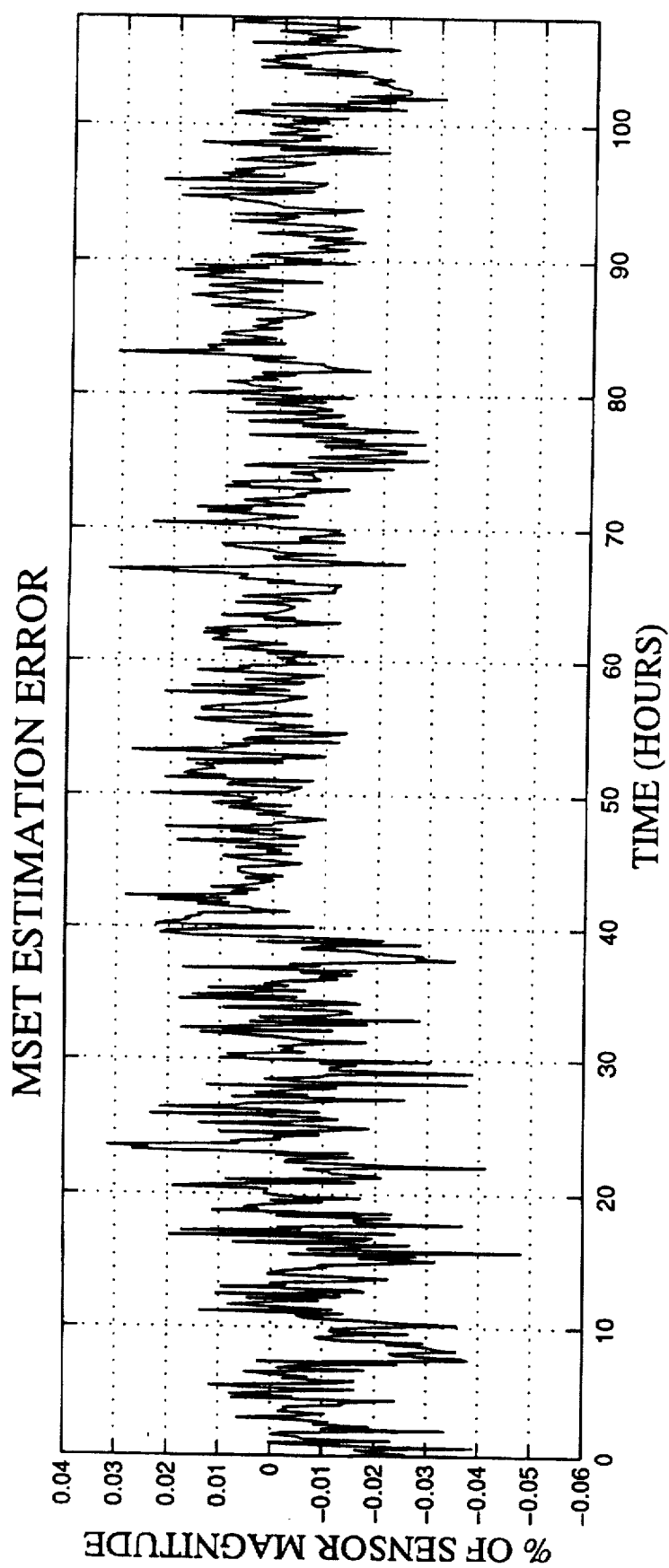
FIG. 10B illustrates the SMSET estimation error between the SMSET estimate and the sensor signal data.
Figure 10C:
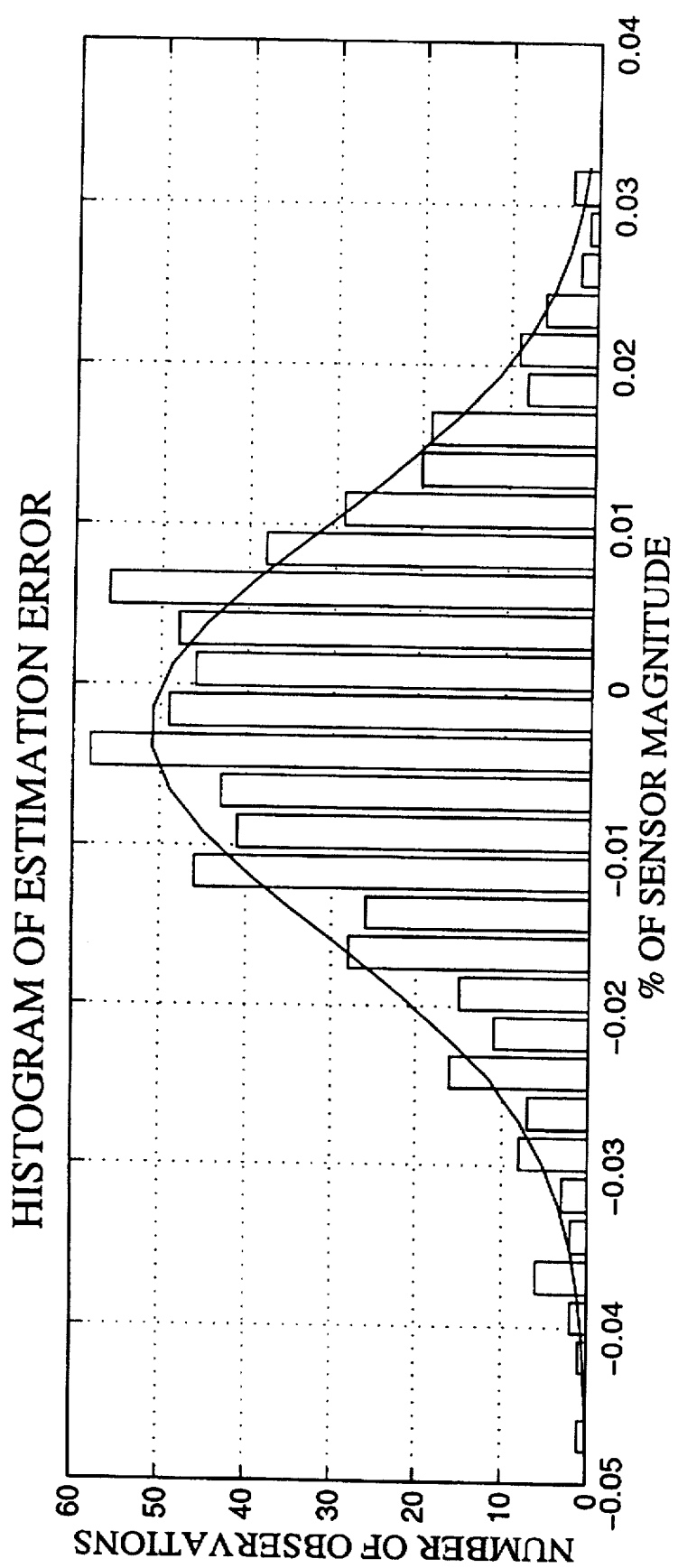
FIG. 10C illustrates a histogram of the error.
Figure 11A:
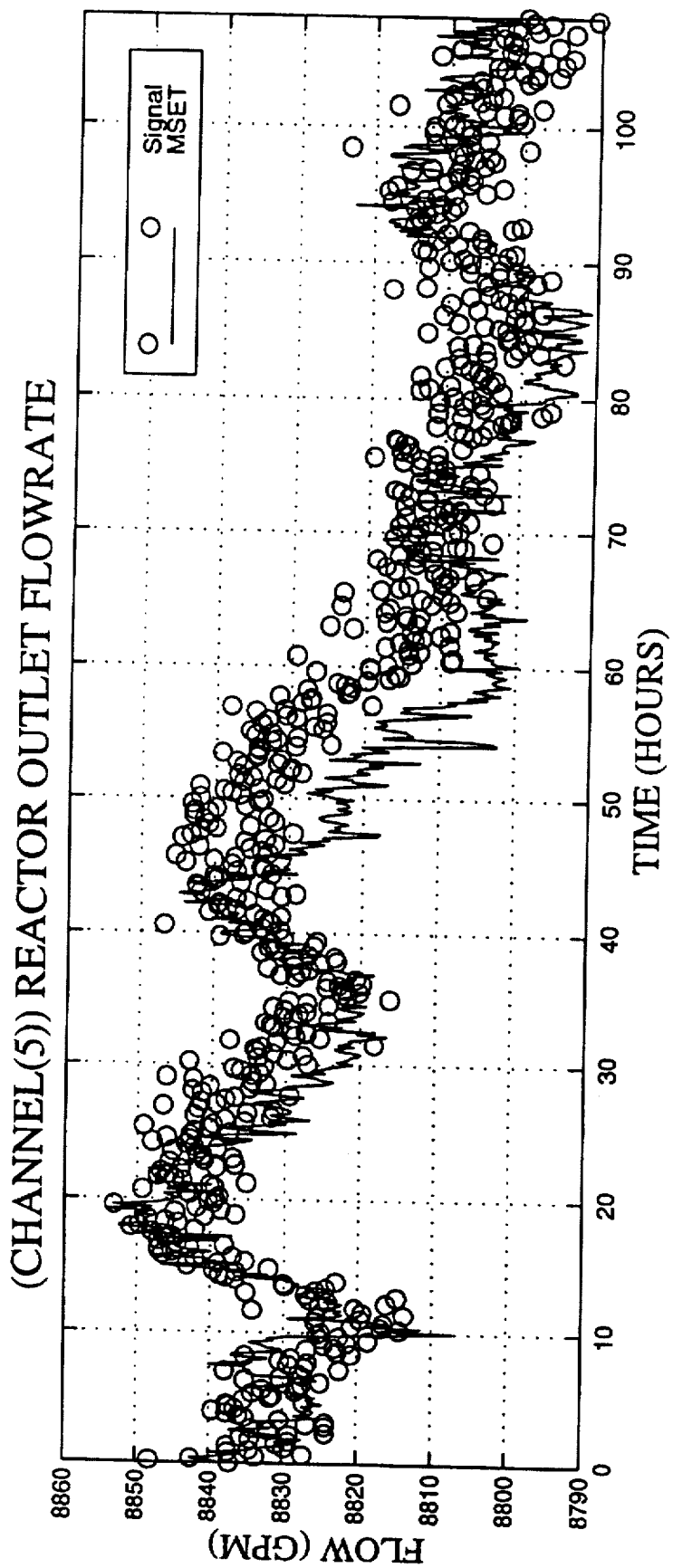
FIG. 11A illustrates sensor signal data for reactor outlet flow rate.
Figure 11B:
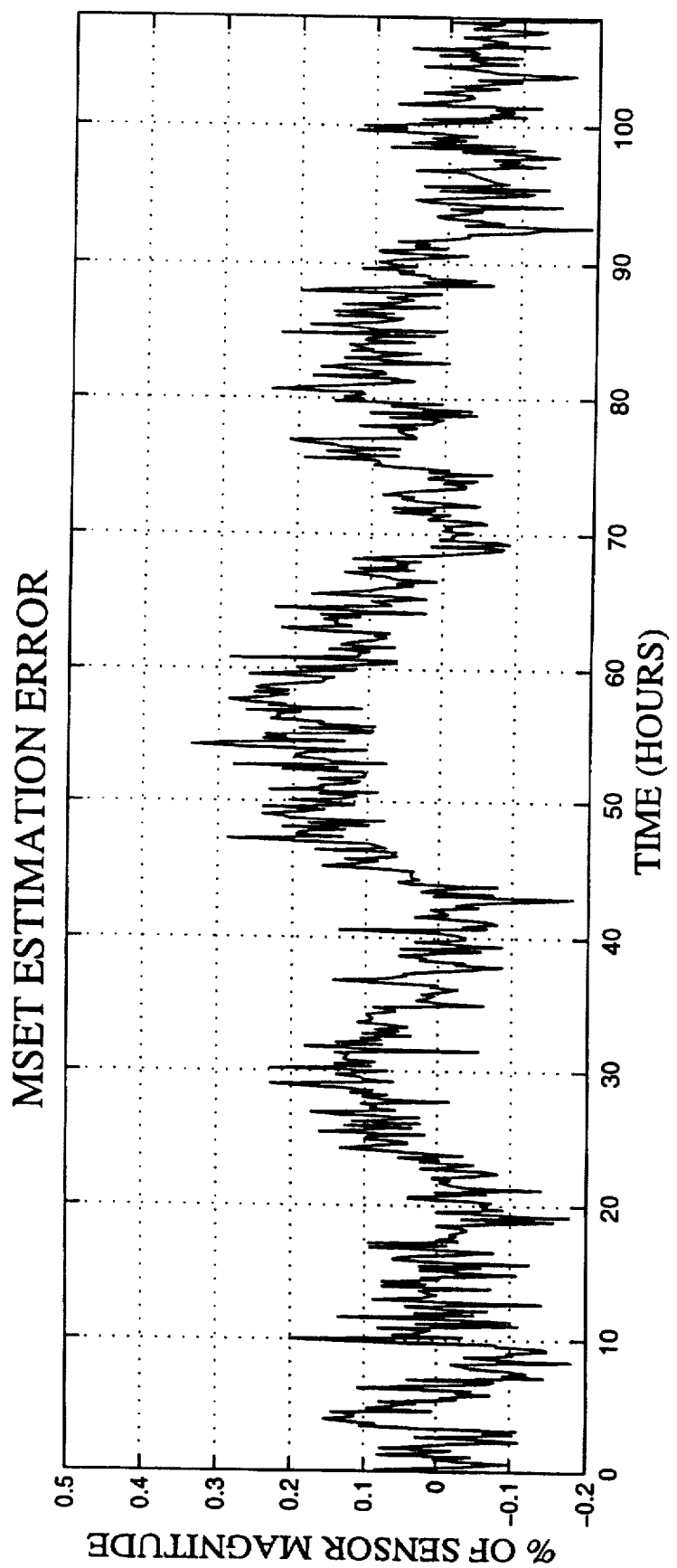
FIG. 11B illustrates the SMSET estimation en-or between the SMSET estimate and the sensor signal data.
Figure 11C:
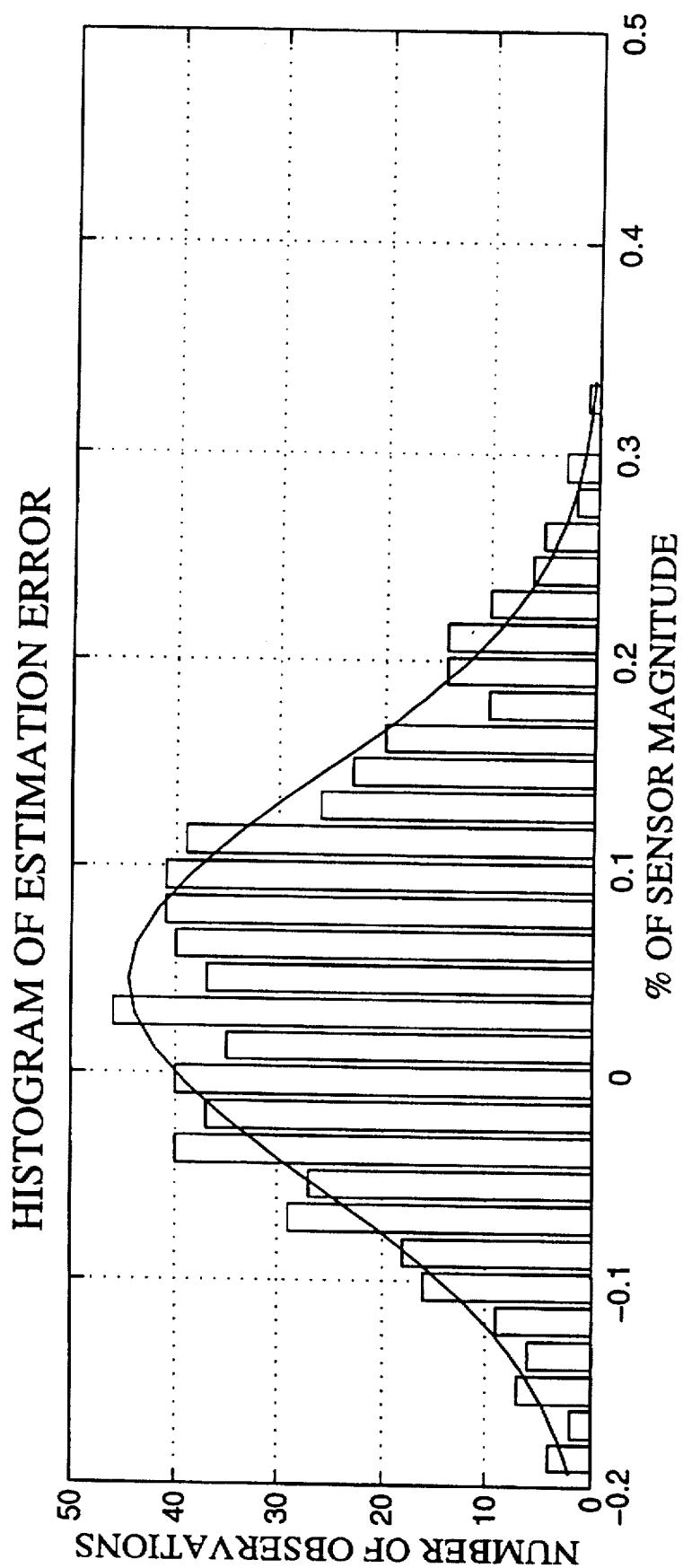
FIG. 11C illustrates a histogram of the error.
Figure 12A:
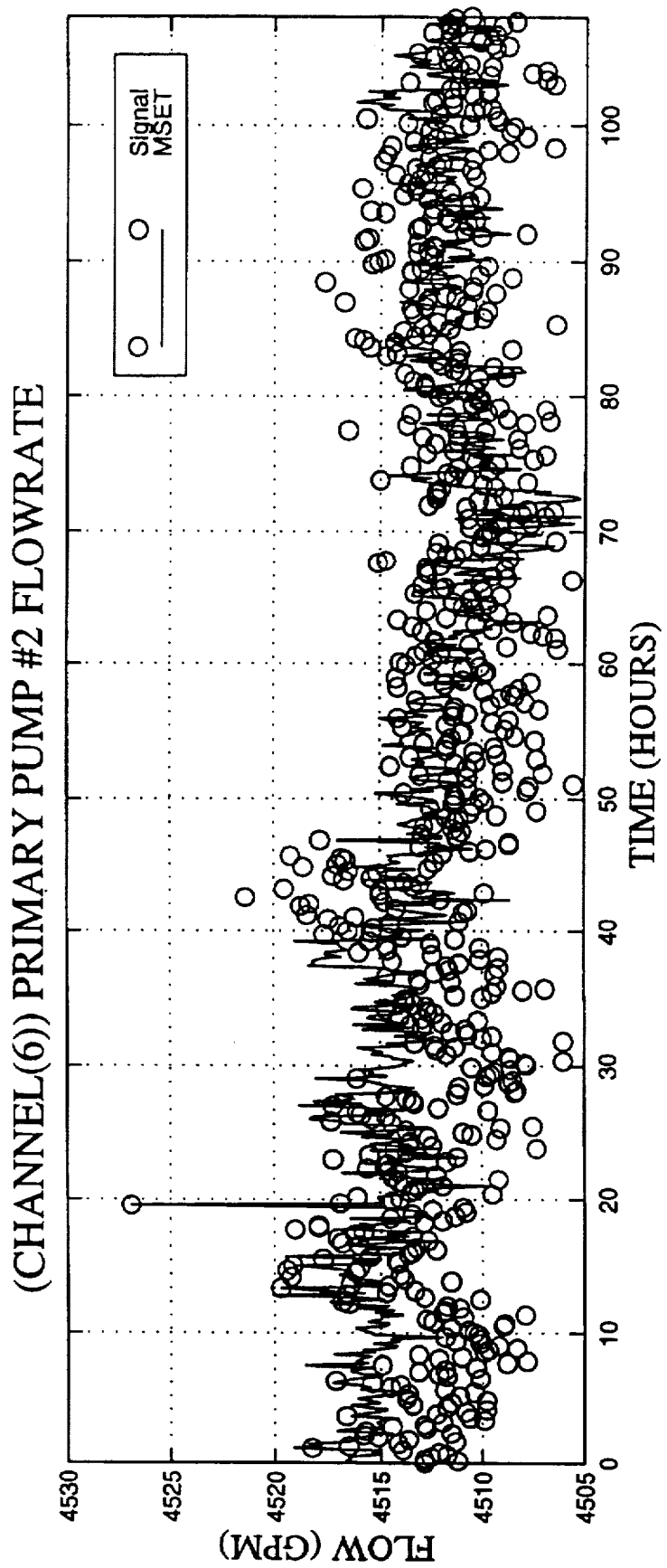
FIG. 12A illustrates sensor signal data for primary pump 2 flow rate.
Figure 12B:
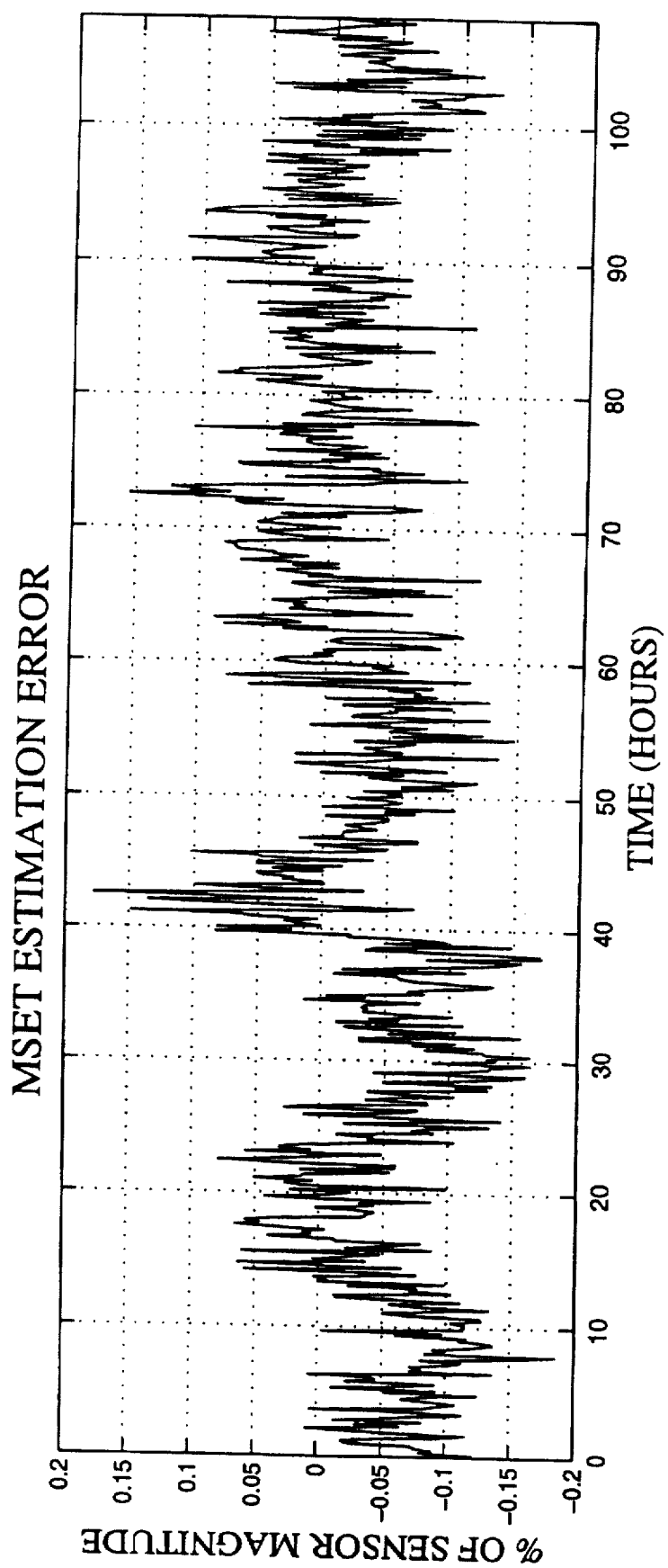
FIG. 12B illustrates the SMSET estimation error between the SMSET estimate and the sensor signal data.
Figure 12C:
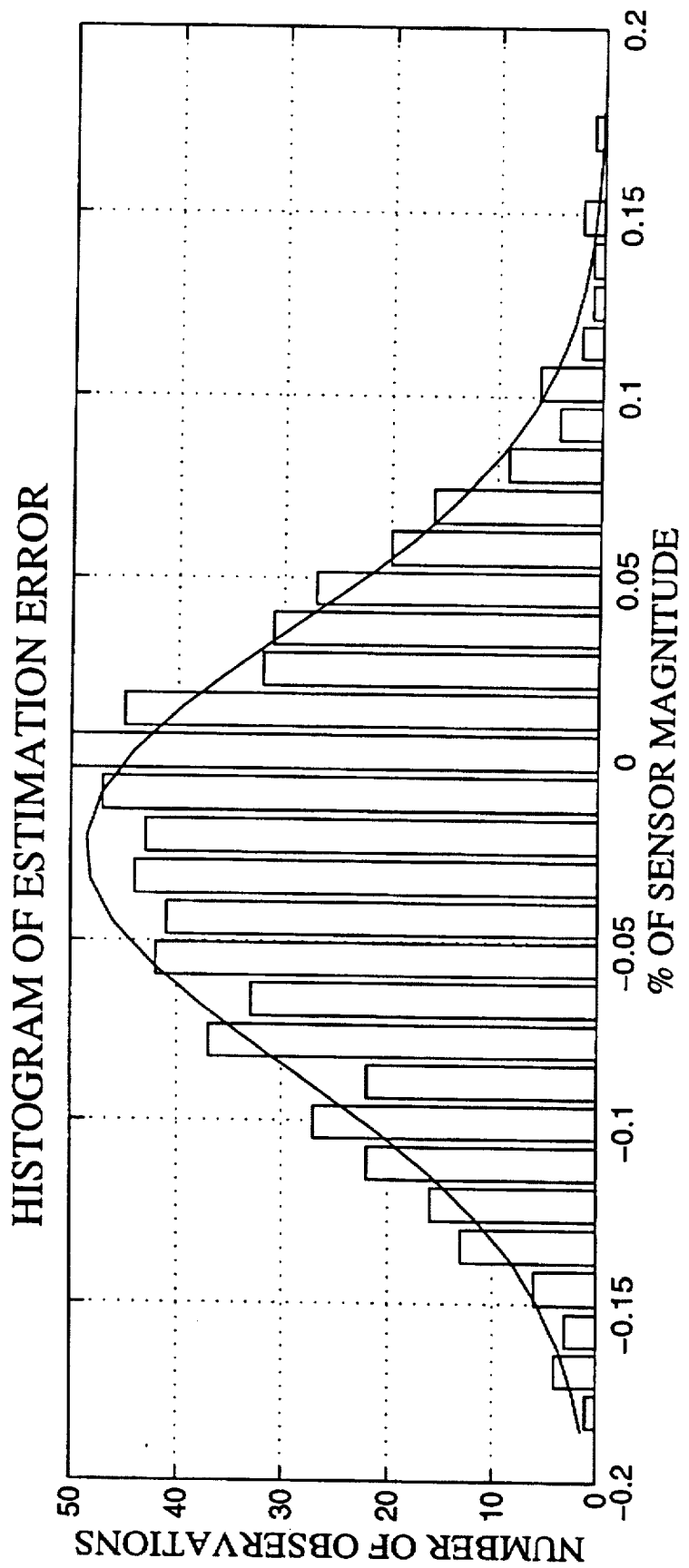
FIG. 12C illustrates a histogram of the error.
Figure 13A:
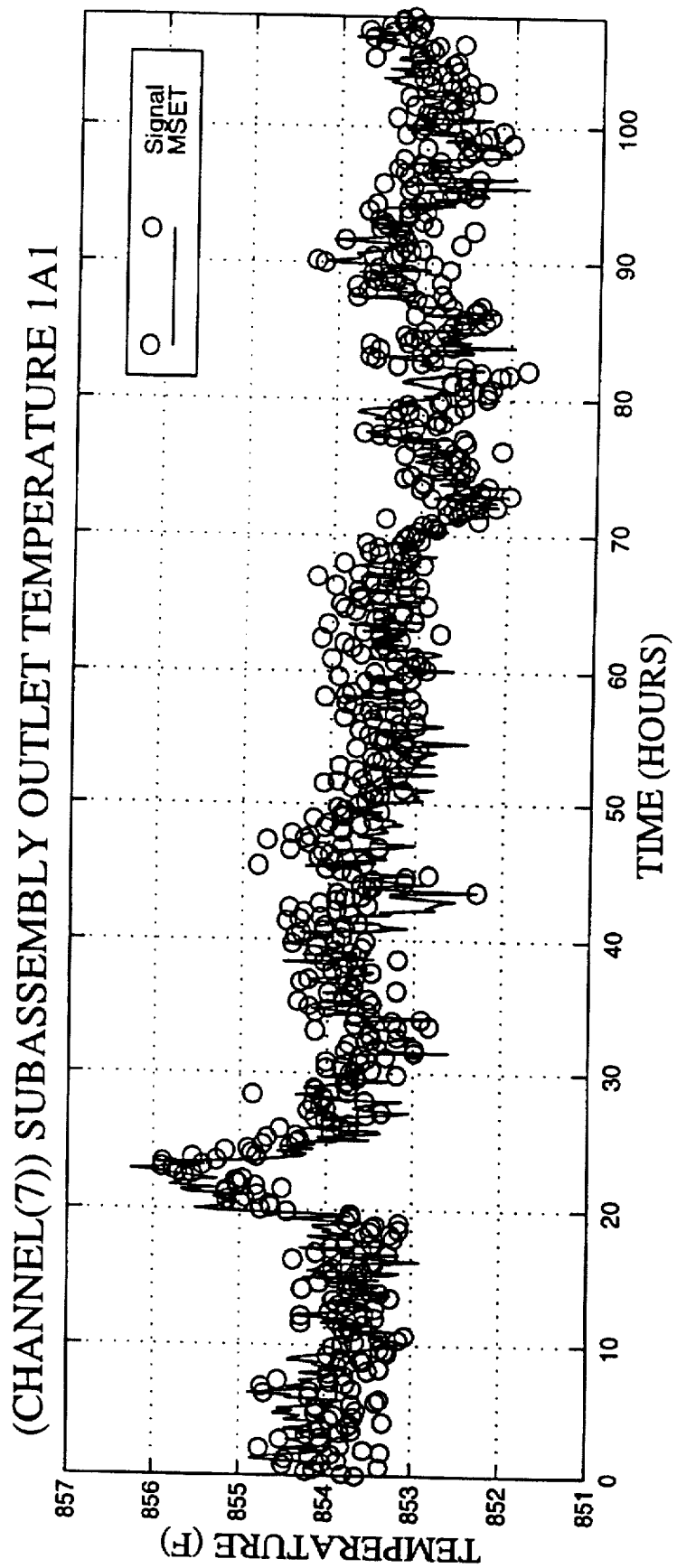
FIG. 13A illustrates sensor signal data for subassembly outlet temperature 1A1.
Figure 13B:
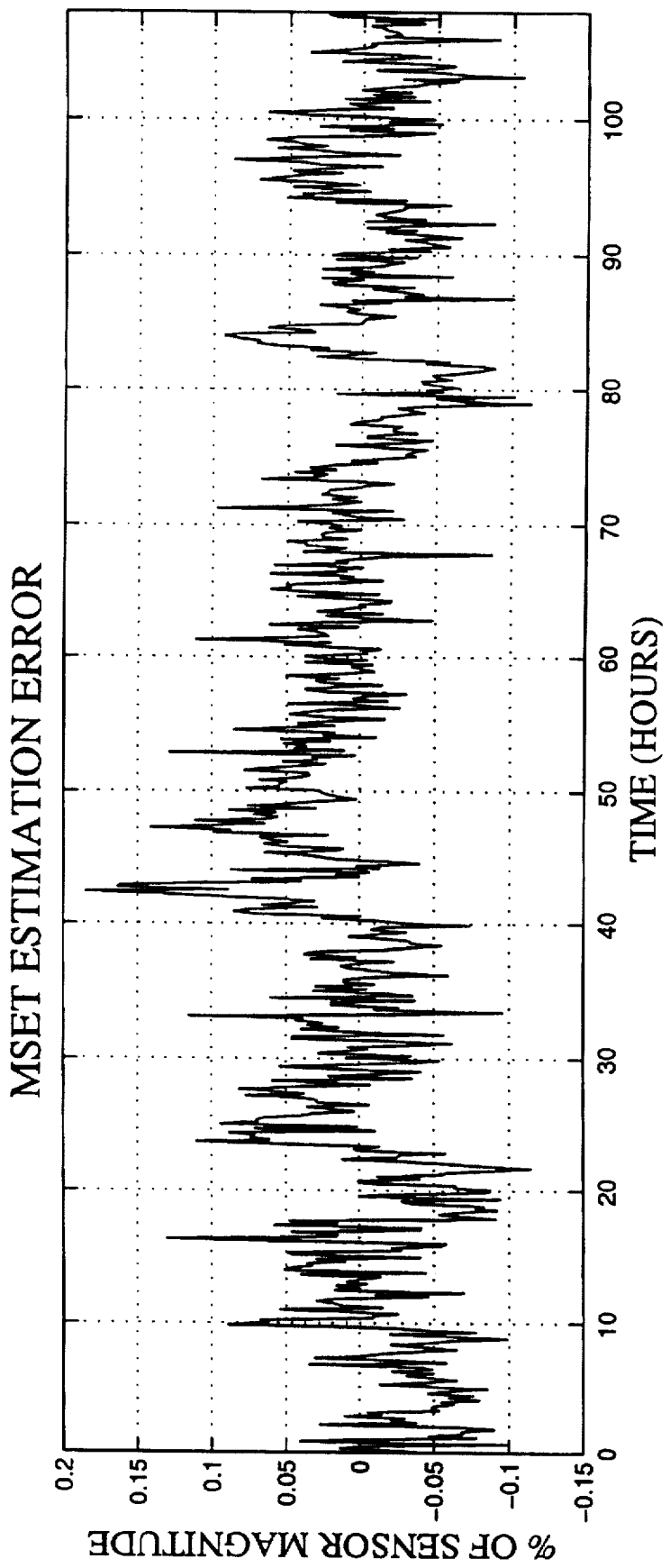
FIG. 13B illustrates the SIMSET estimation error between the SMSET estimate and the sensor signal data.
Figure 13C:
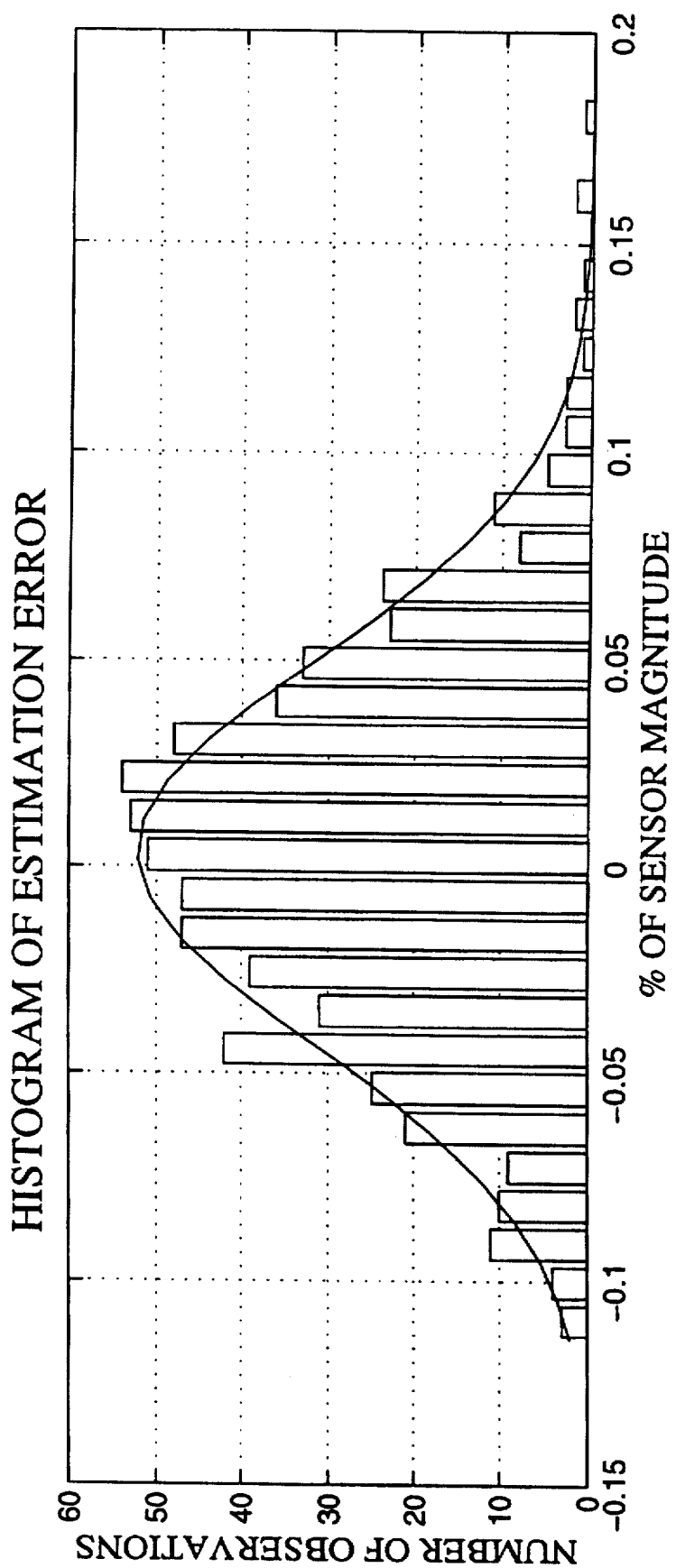
FIG. 13C illustrates a histogram of the error.
Figure 14A:
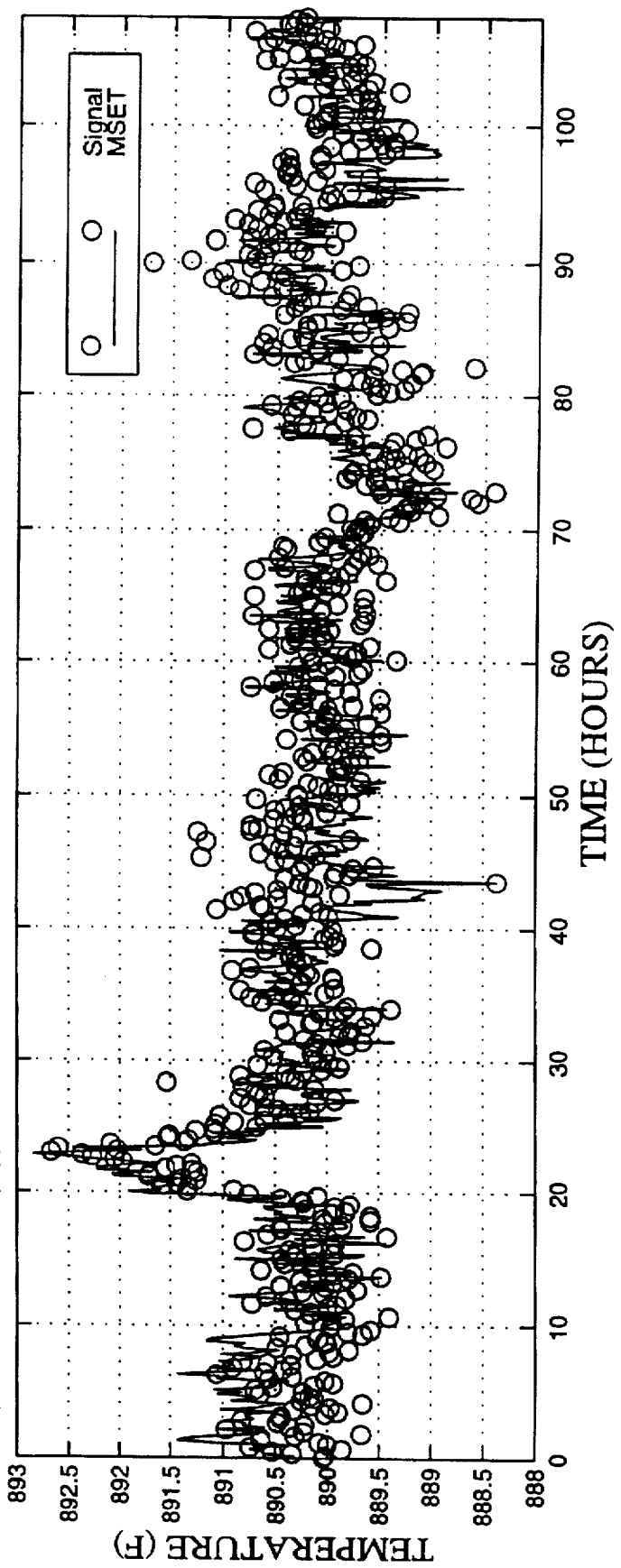
FIG. 14A illustrates sensor signal data for subassembly outlet temperature 2B 1.
Figure 14B:
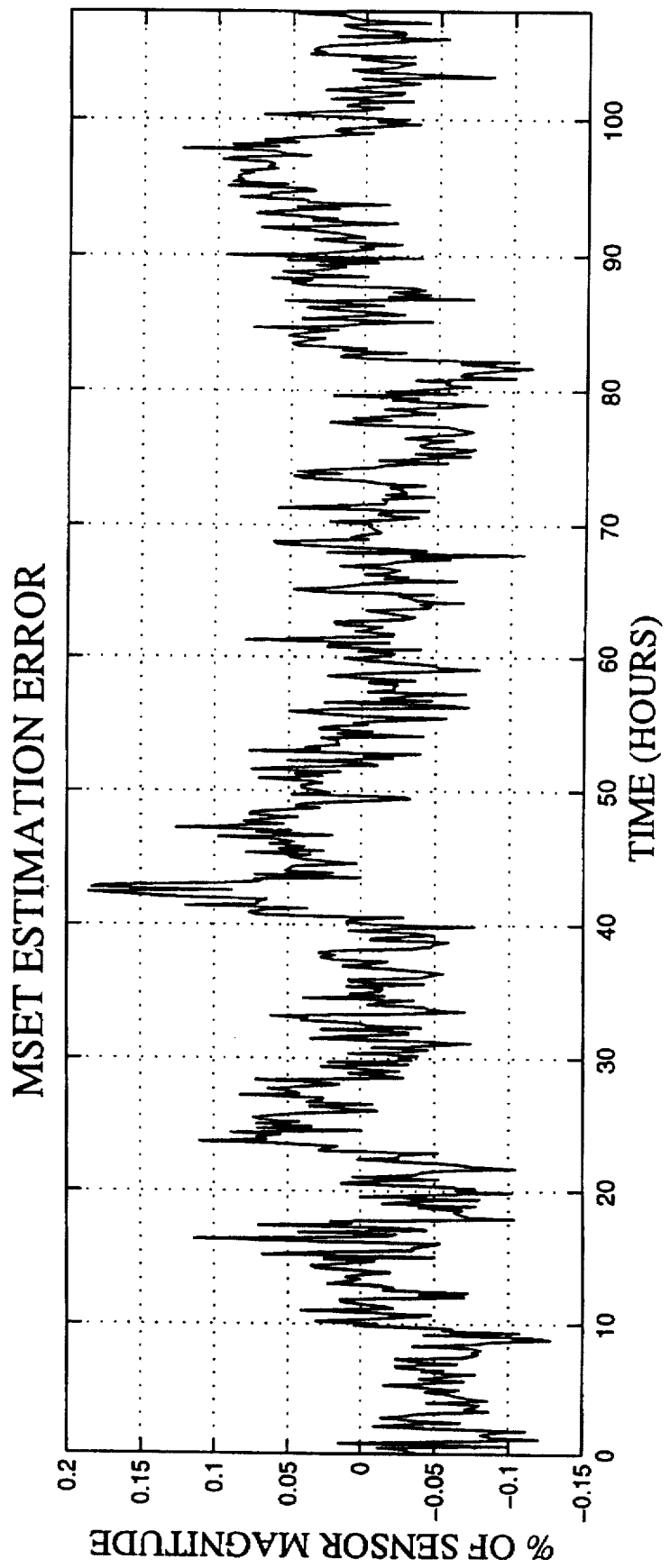
FIG. 14B illustrates the SMSET estimation error between the SMSET estimate and the sensor signal data.
Figure 14C:
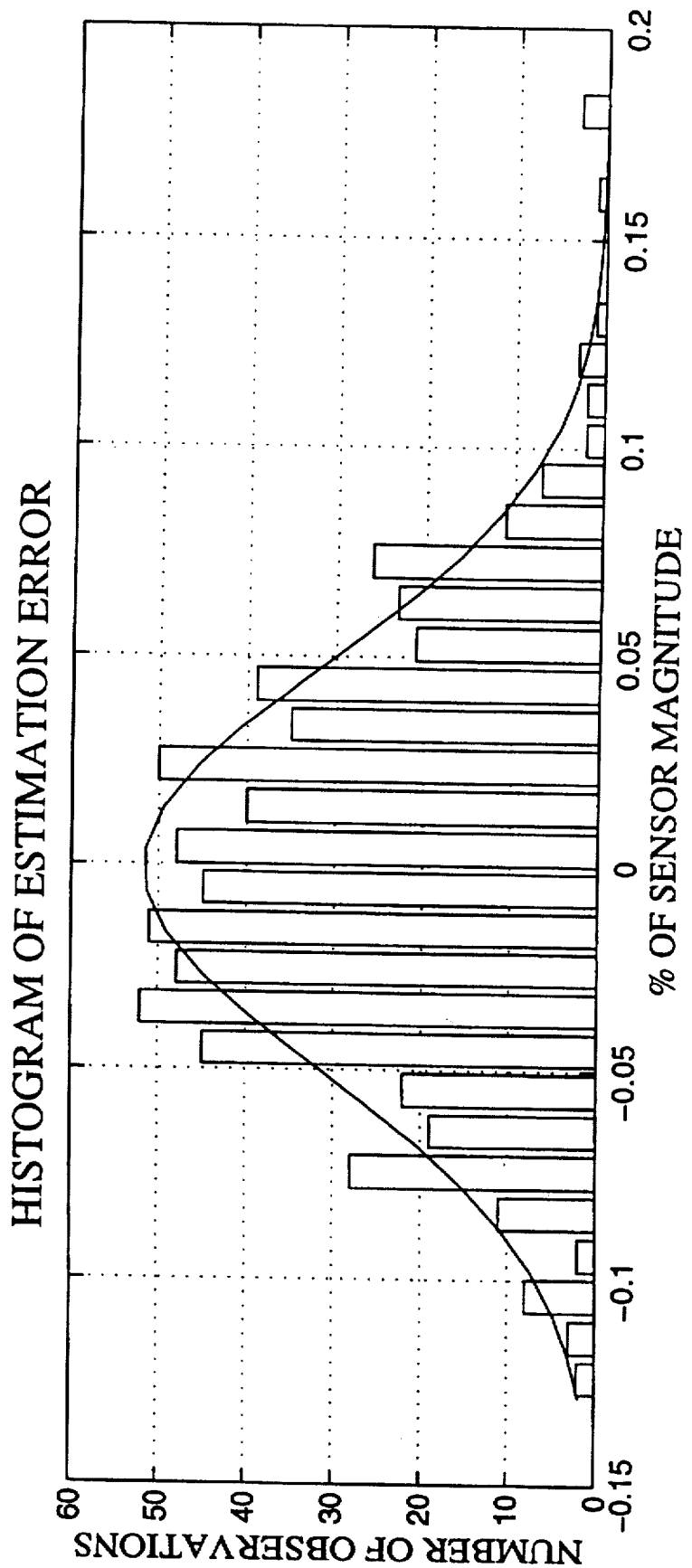
FIG. 14C illustrates a histogram of the error.
Figure 15A:
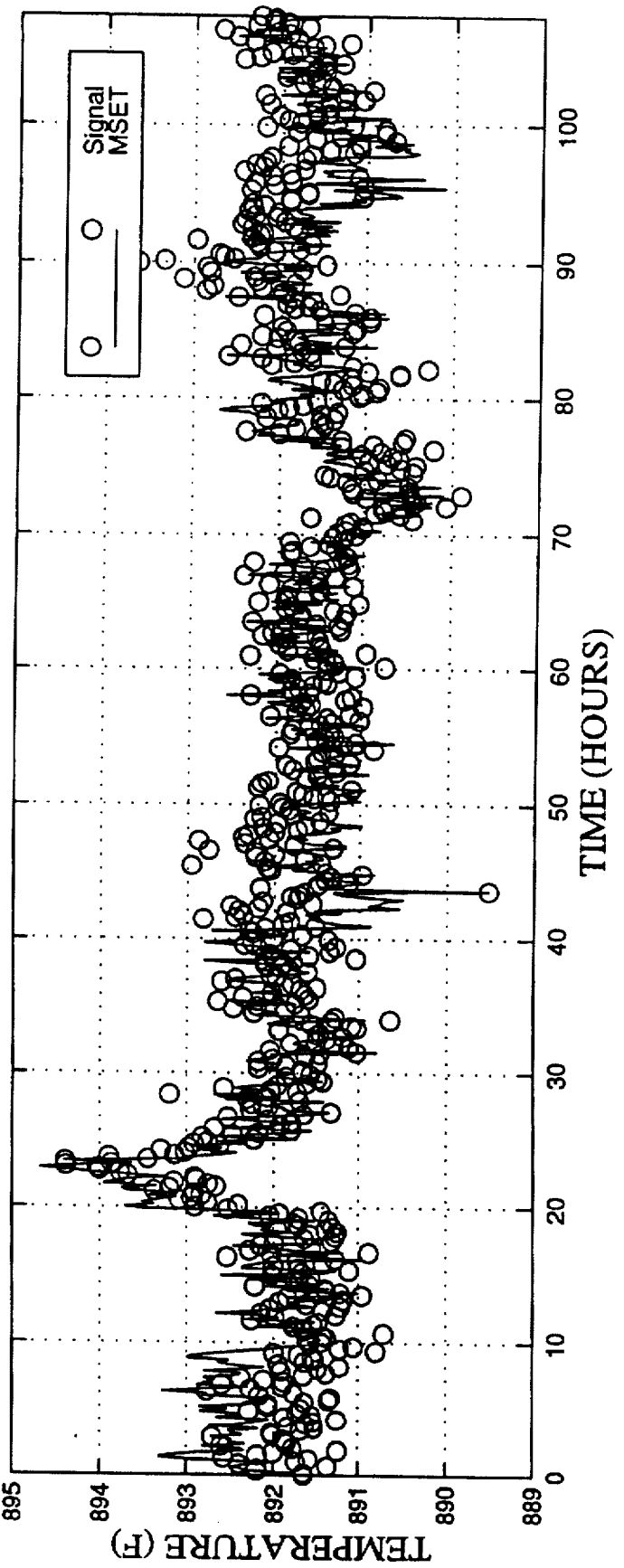
FIG. 15A illustrates sensor signal data for subassembly outlet temperature 4E1.
Figure 15B:
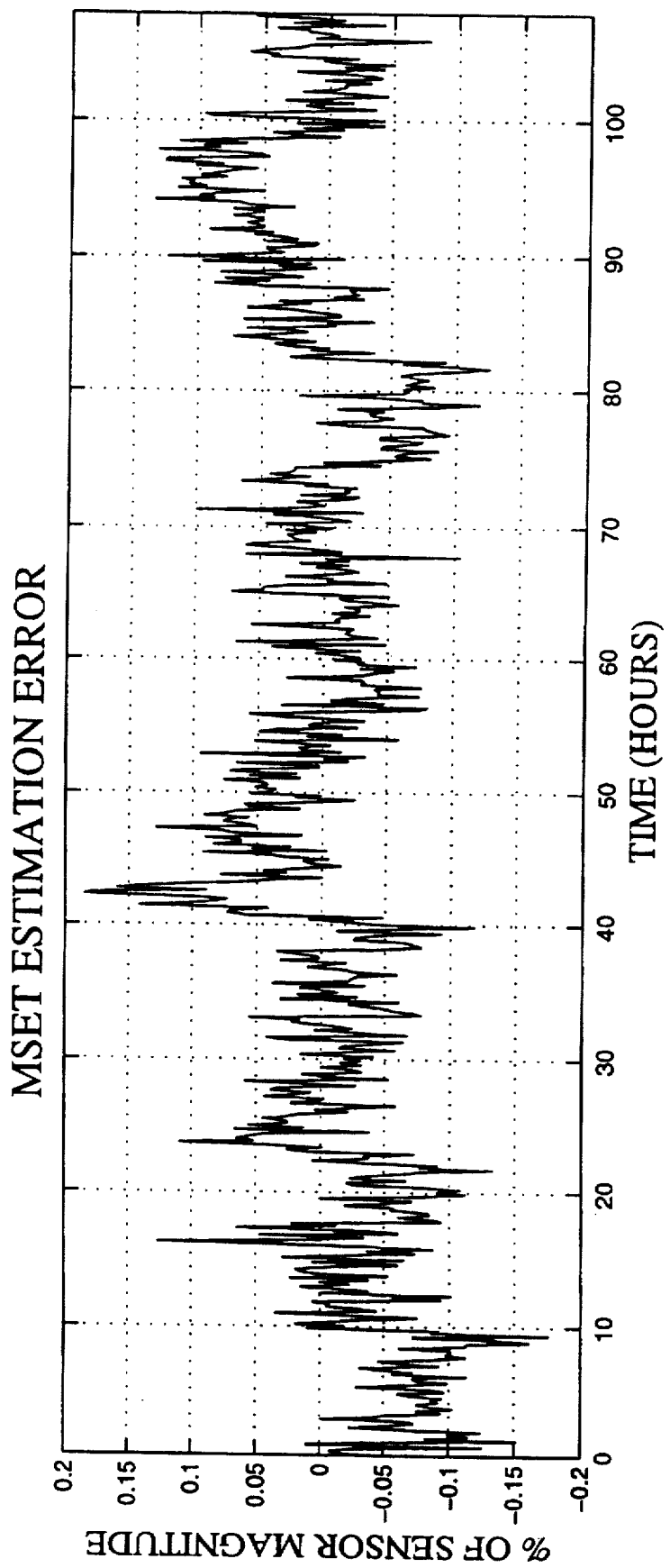
FIG. 15B illustrates the SMSET estimation error between the SMSET estimate and the sensor signal data.
Figure 15C:
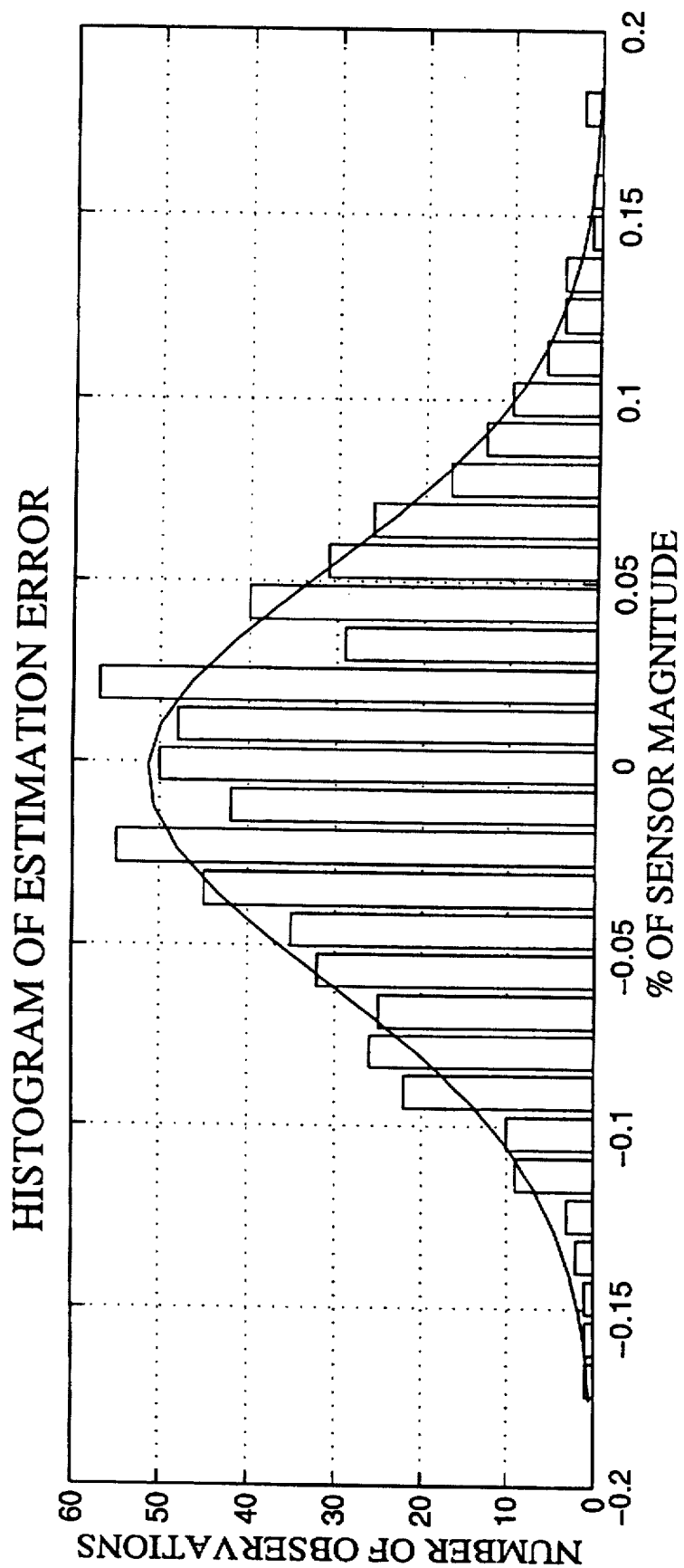
FIG. 15C illustrates a histogram of the error.
Figure 16A:
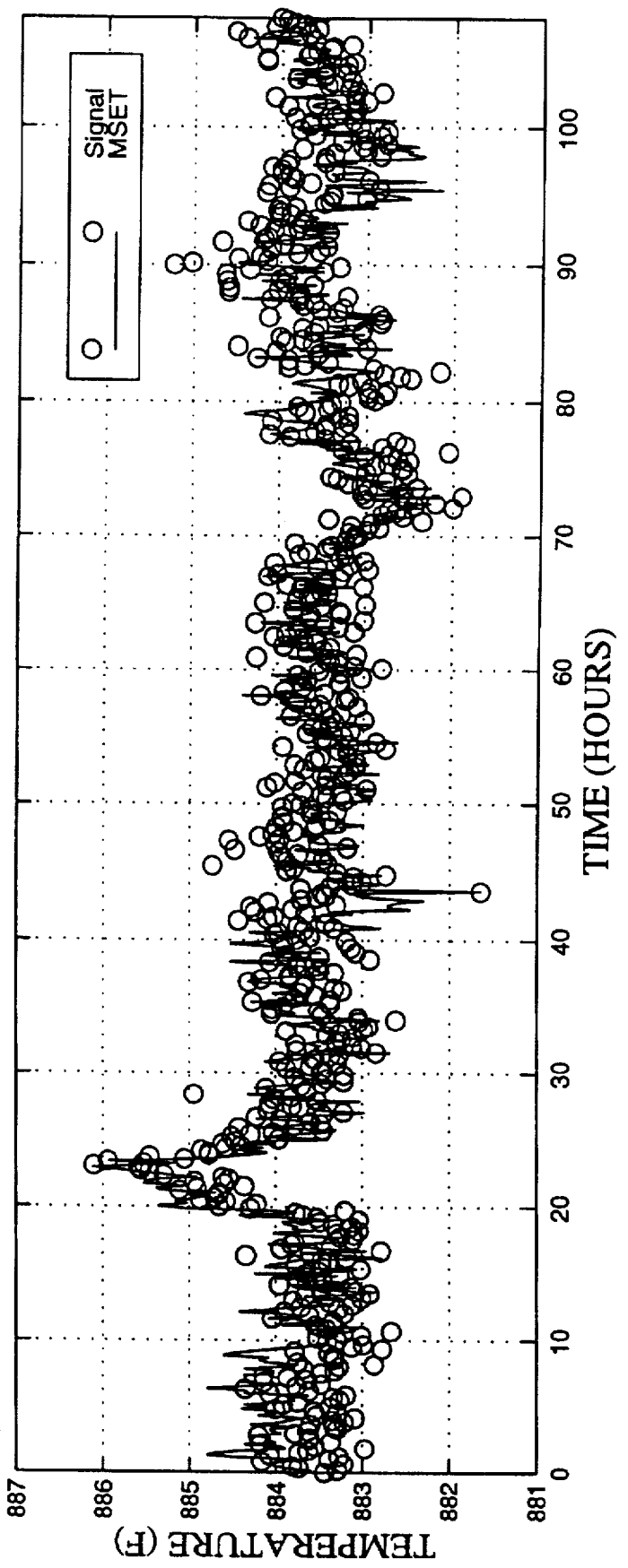
FIG. 16A illustrates sensor signal data for subassembly outlet temperature 4F 1.
Figure 16B:
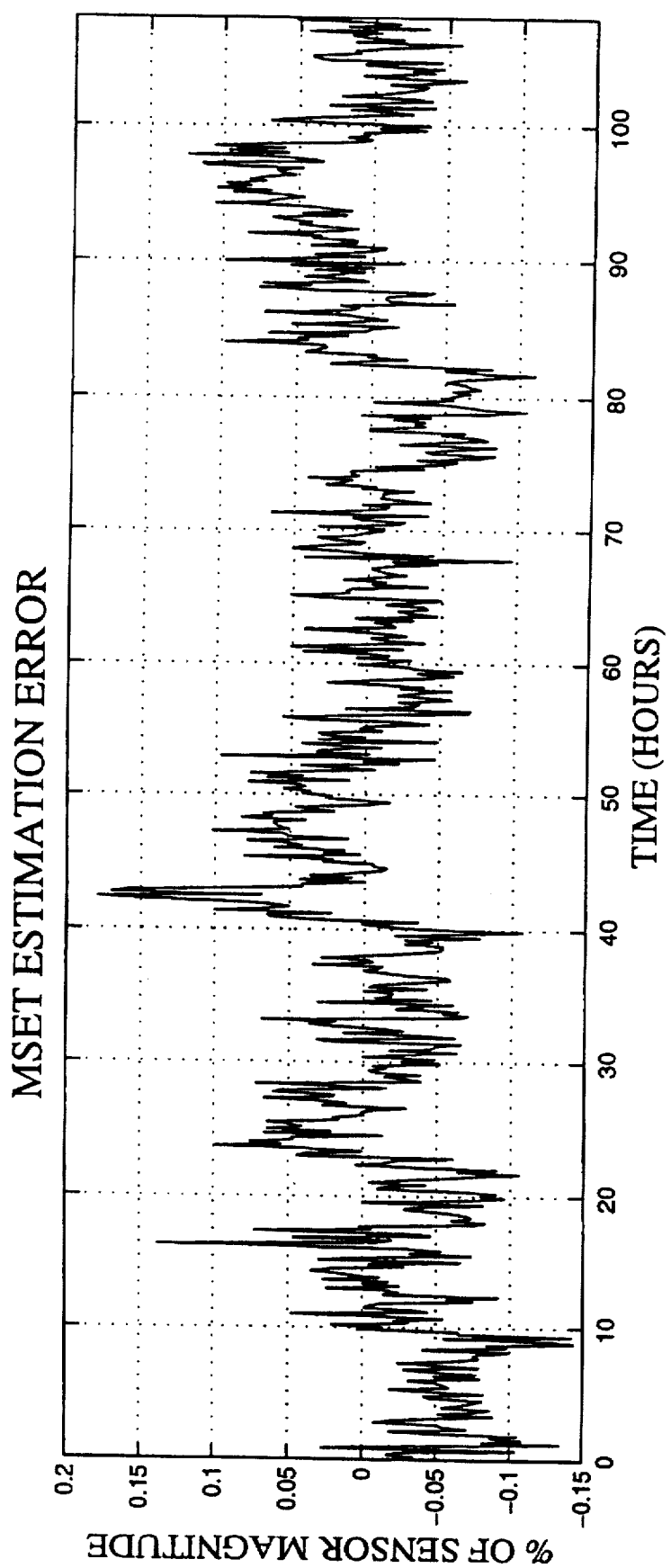
FIG. 16B illustrates the SMSET estimation error between the SMSET estimate and the sensor signal data.
Figure 16C:
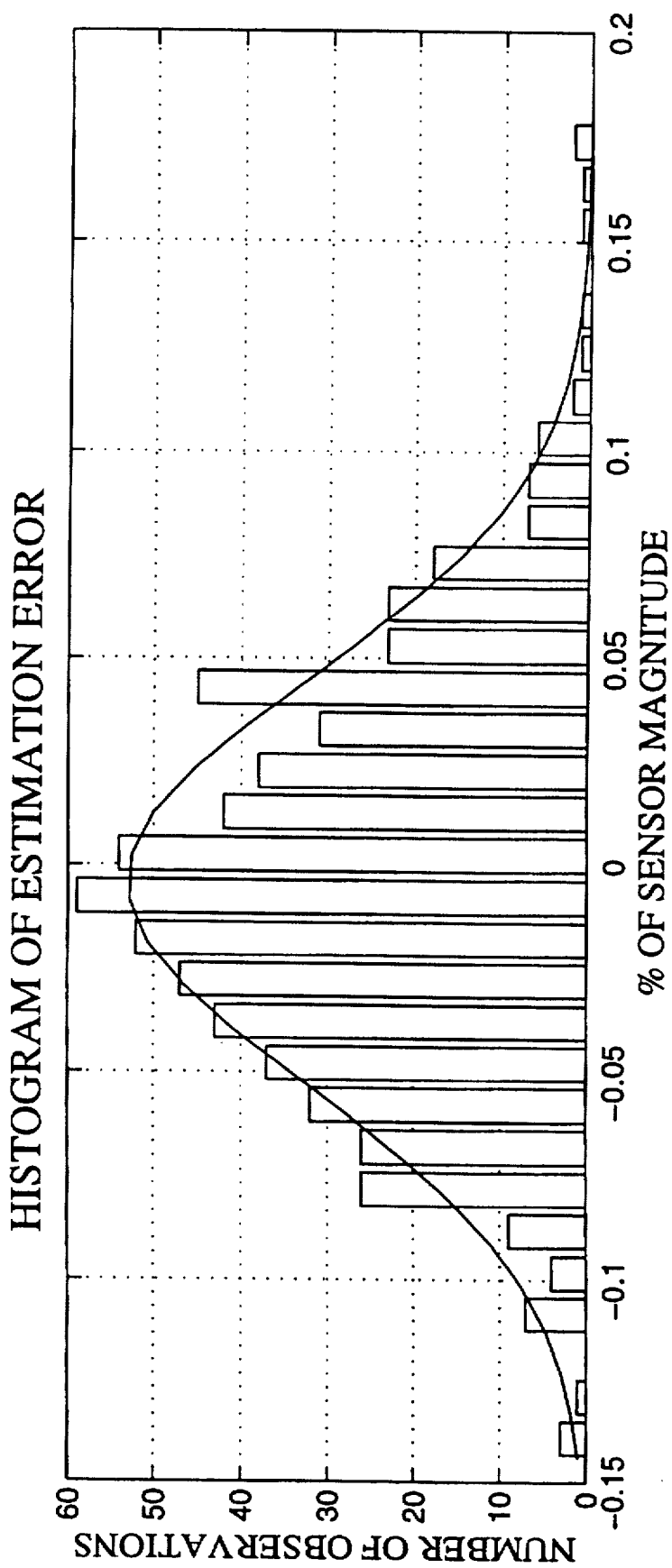
FIG. 16C illustrates a histogram of the error.
Figure 17A:
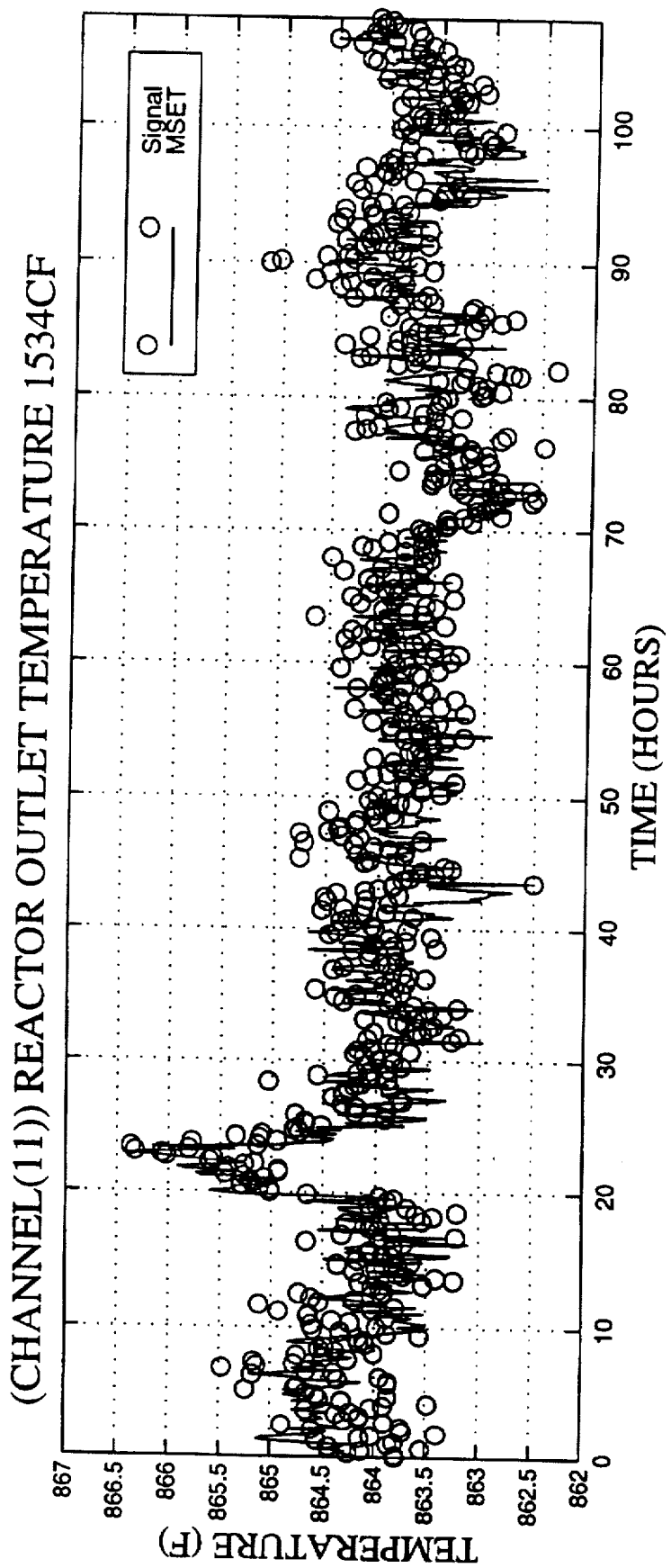
FIG. 17A illustrates sensor signal data for reactor outlet temperature 1534CF.
Figure 17B:
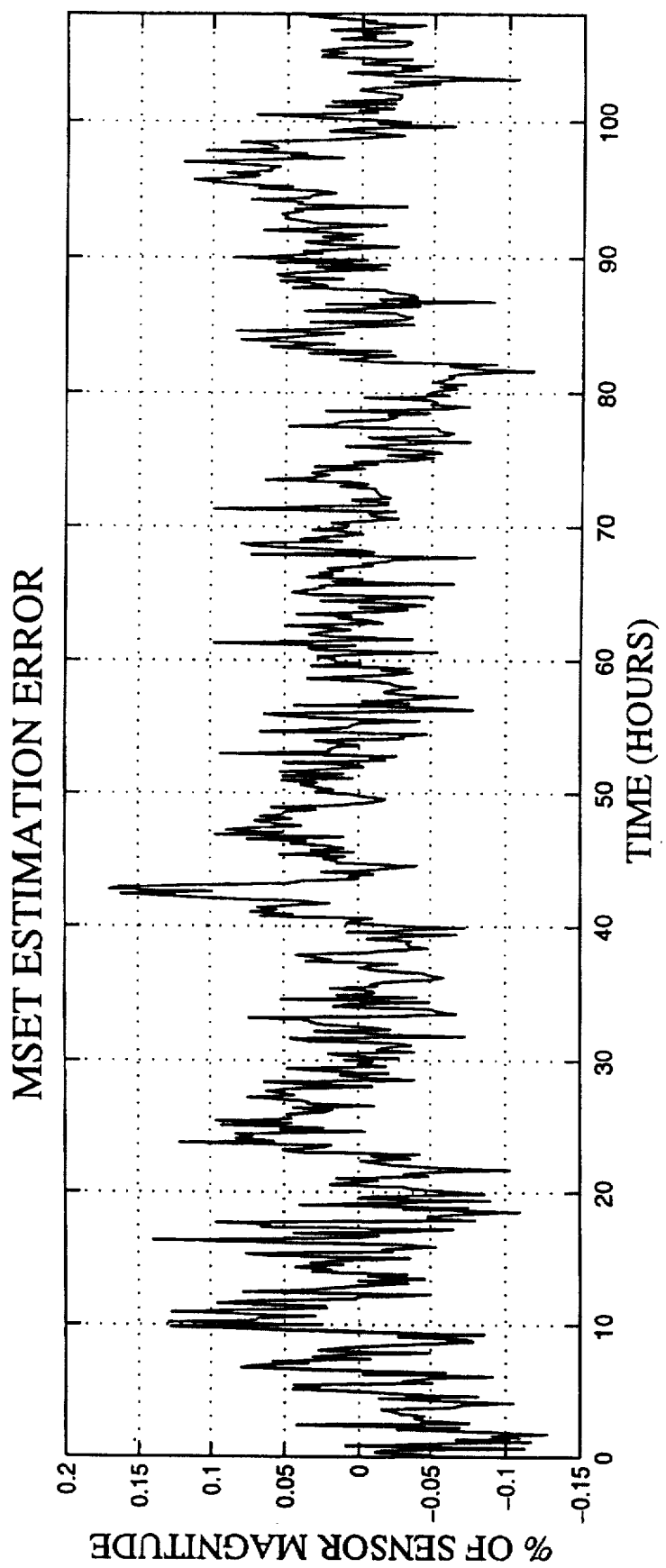
FIG. 17B illustrates the SMSET estimation error between the SMSET estimate and the sensor signal data.
Figure 17C:
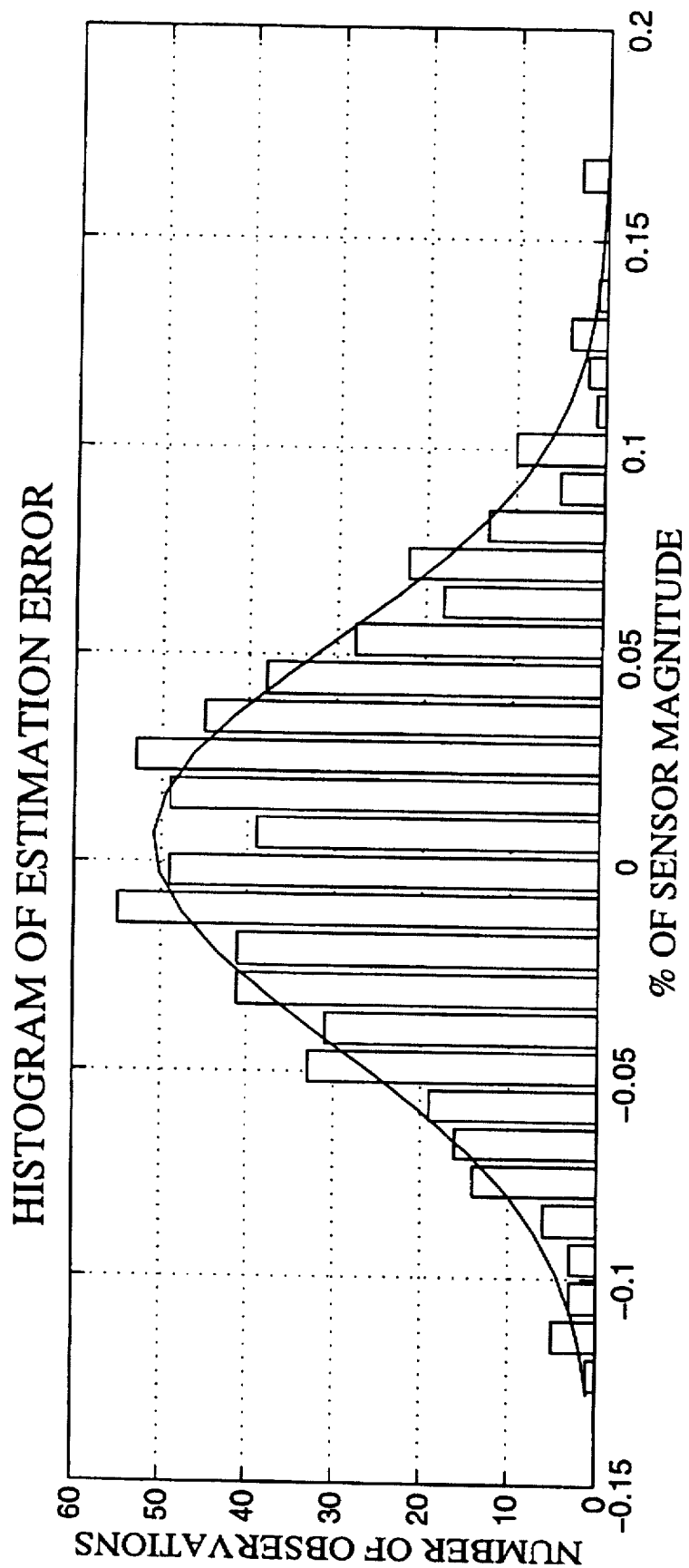
FIG. 17C illustrates a histogram of the error.
Figure 18A:
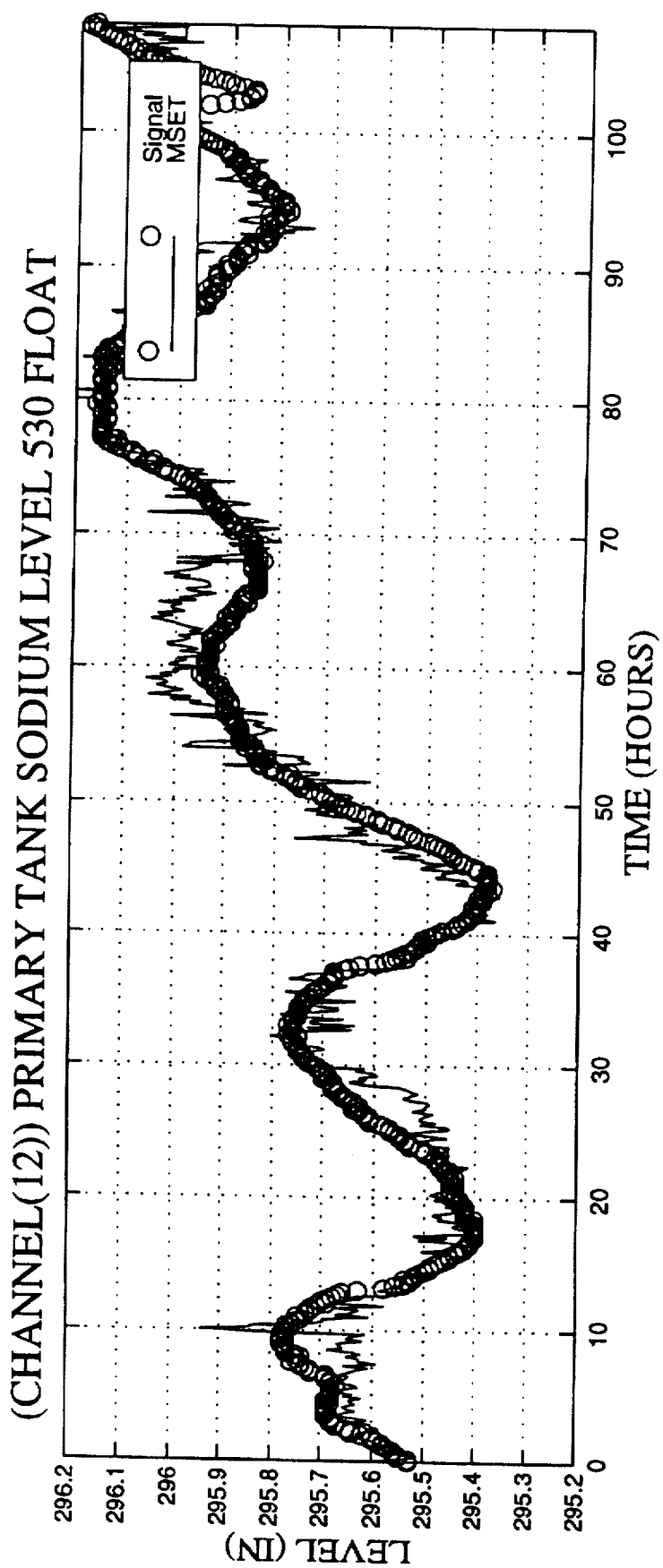
FIG. 18A illustrates sensor signal data for primary tank sodium level 530 Float.
Figure 18B:
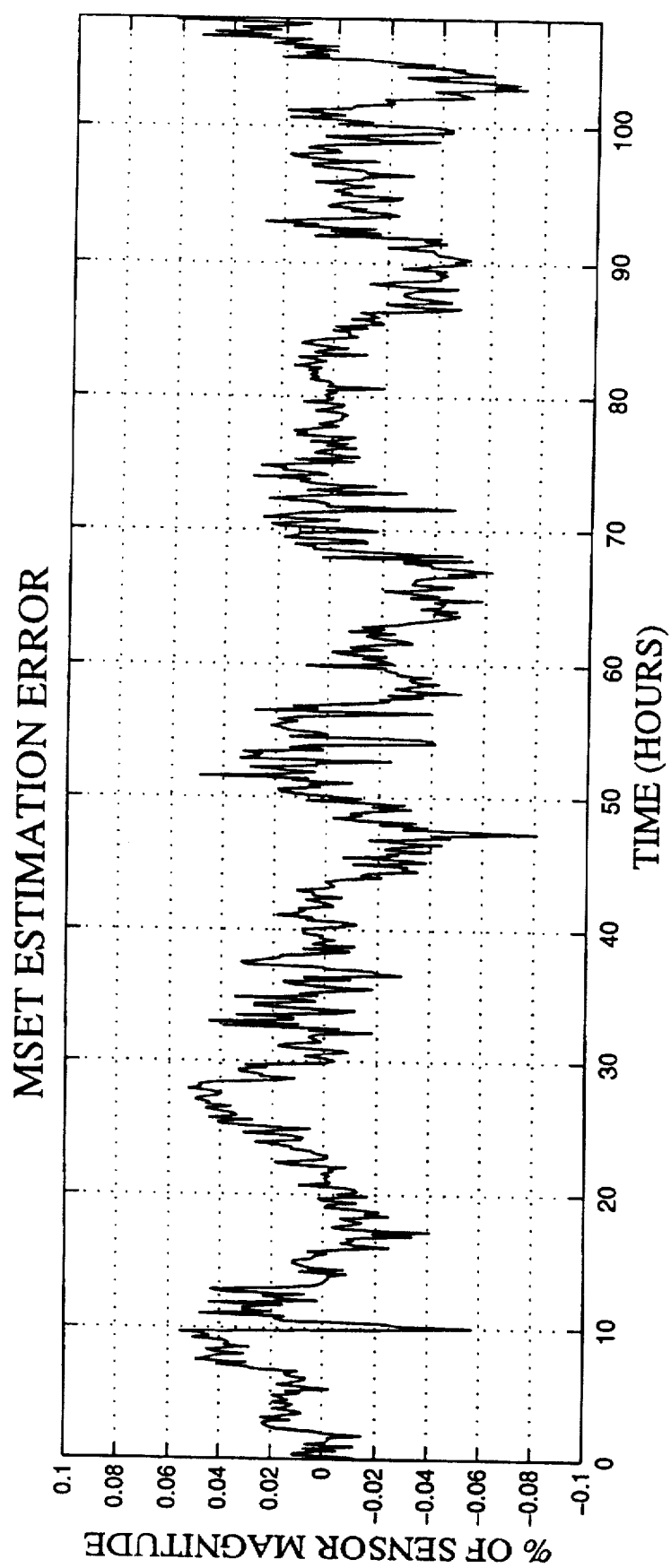
FIG. 18B illustrates the SMSET estimation error between the SMSET estimate and the sensor signal data.
Figure 18C:
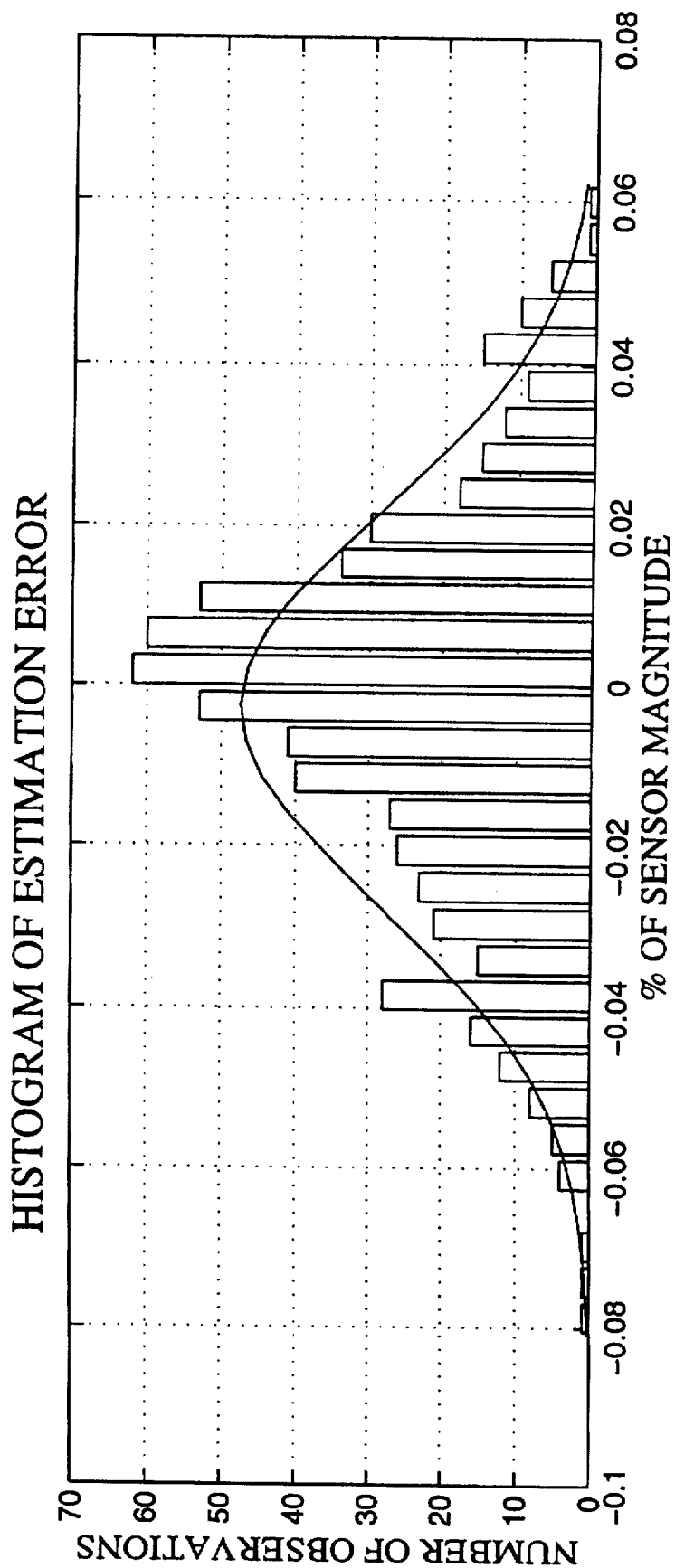
FIG. 18C illustrates a histogram of the error.
Figure 19A:
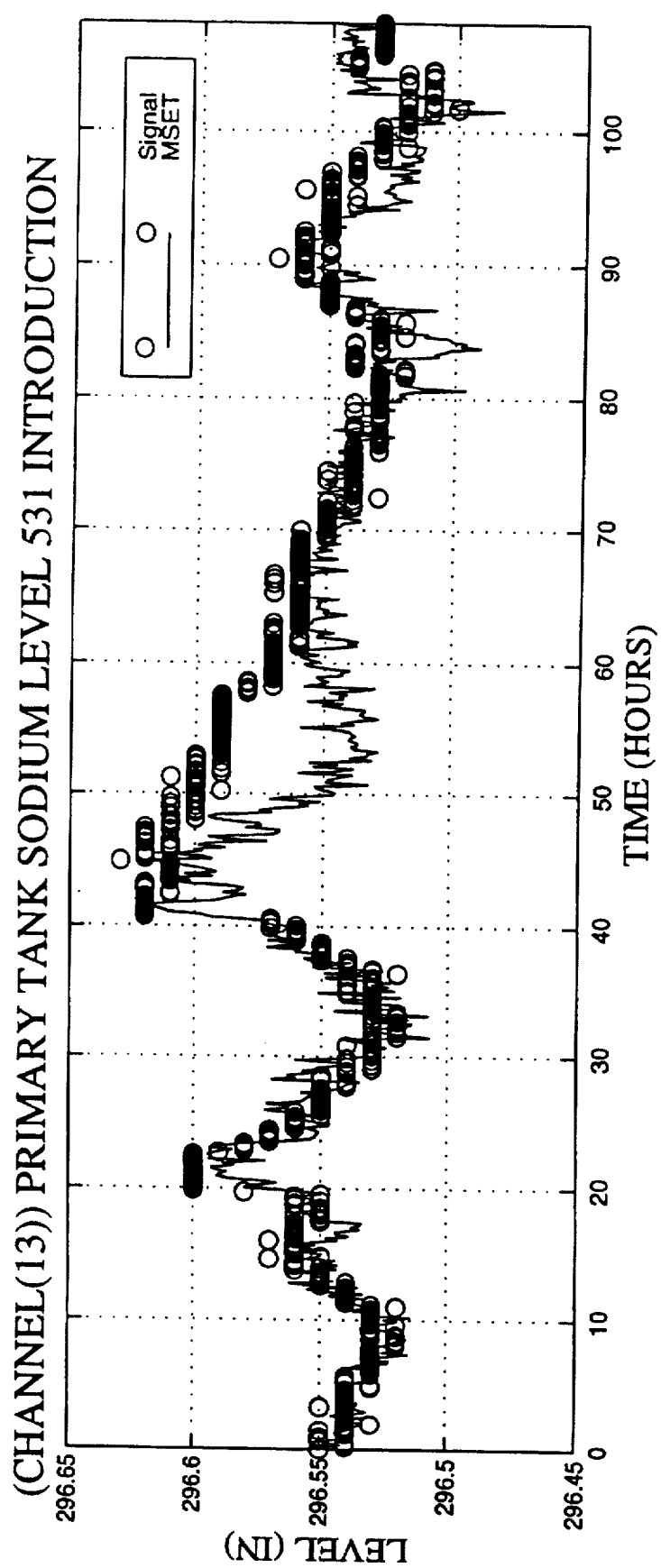
FIG. 19A illustrates sensor signal data for primary tank sodium level 531 induction.
Figure 19B:
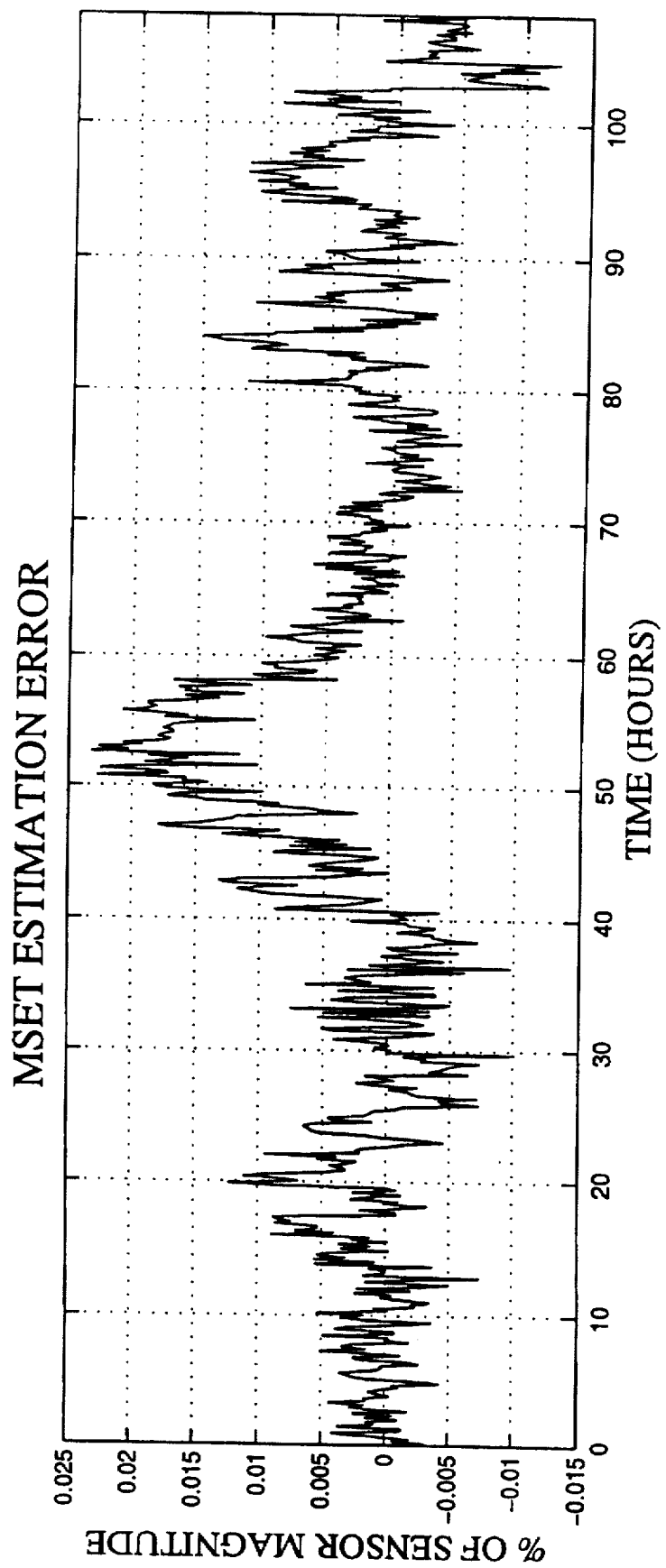
FIG. 19B illustrates the SMSET estimation en-or between the SMSET estimate and the sensor signal data.
Figure 19C:
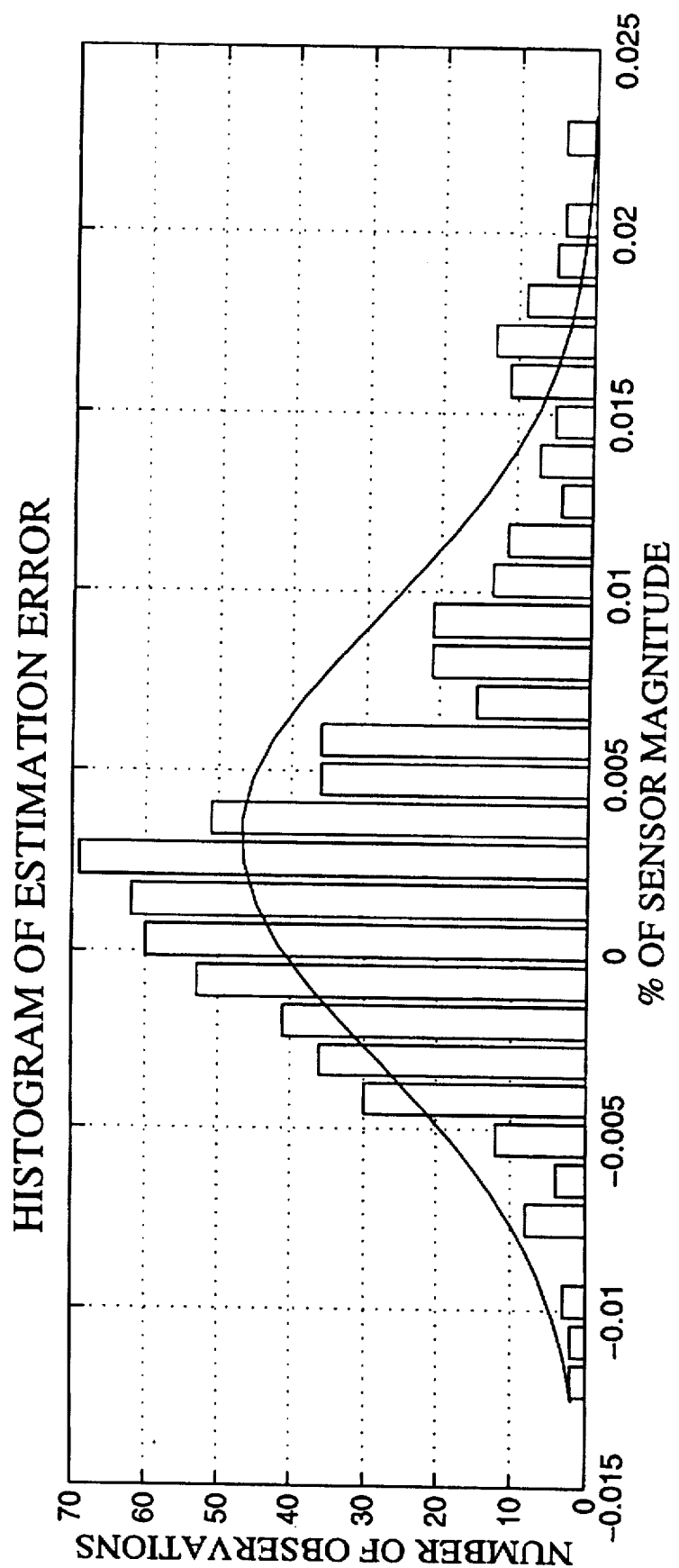
FIG. 19C illustrates a histogram of the error.

The effect of time delay correlation is described in this example, and FIGS. 6A and 6B show two voltage signals with a four second delay between them. Before the signals are processed by the Leadlag module 20 (see FIG. 6A), the correlation coefficient is 0.0182 which implies no correlation versus processing through the Leadlag module 20 to obtain a correlation of 0.9209 (see FIG. 6B). When the set of signals, or data, being used is more than two, all the possible pair combinations are used to calculate maximum possible correlation coefficients so all signals can be properly correlated.

EXAMPLE II

An experiment to determine the accuracy of the invention (the "SMSET" methodology generally) was carried out using sensor data from the Experimental Breeder Reactor II (EBR-II) at Argonne National Laboratory (US58). The sensor data set contained 13 signals from sensors monitoring EBR-II. Table I shows the SMSET Estimation accuracy for EBR-I1 Data. Table I includes the channel numbers and descriptions for each of the sensor signals used in the analysis. The experiment was conducted in three steps; first the SMSET module was trained using two days worth of EBR-II data, next the trained SMSET module was used to estimate the state of approximately 110 hours worth of EBR-II data, and then the accuracy of the estimates was analyzed. For each of the sensor signals listed in Table I, FIGS. 7–19, respectively, show the sensor signal (top plot) and SMSET estimate superimposed, the middle plot shows error between the SMSET and the sensor signal (in percent of the signal magnitude), and a histogram (bottom plot) of the error. The histogram plots are compared to a Gaussian distribution with the same mean and variance to give an idea of how Gaussian the error signals. FIG. 20 provide a summary of the data of FIGS. 7–19.

Figure 20A:
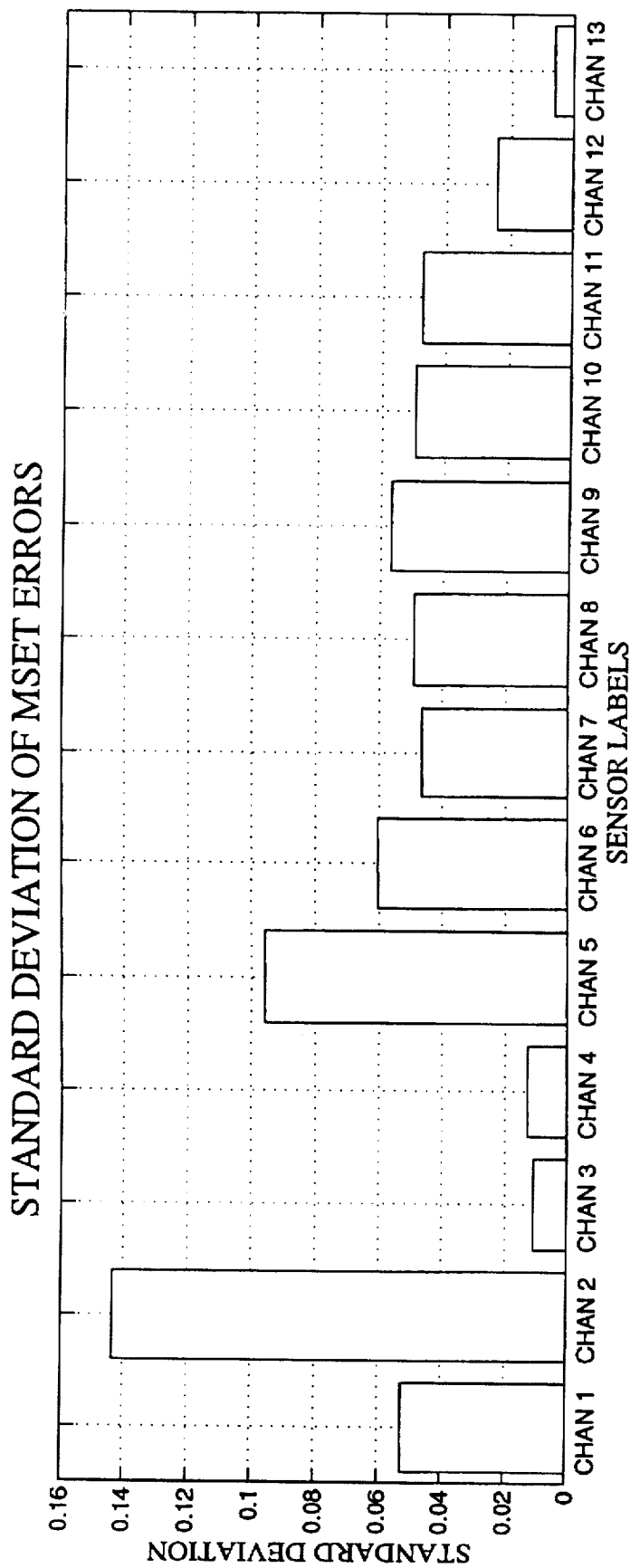
FIG. 20A illustrates standard deviation of SMSET errors for each of the data in FIG. 7-19.
Figure 20B:
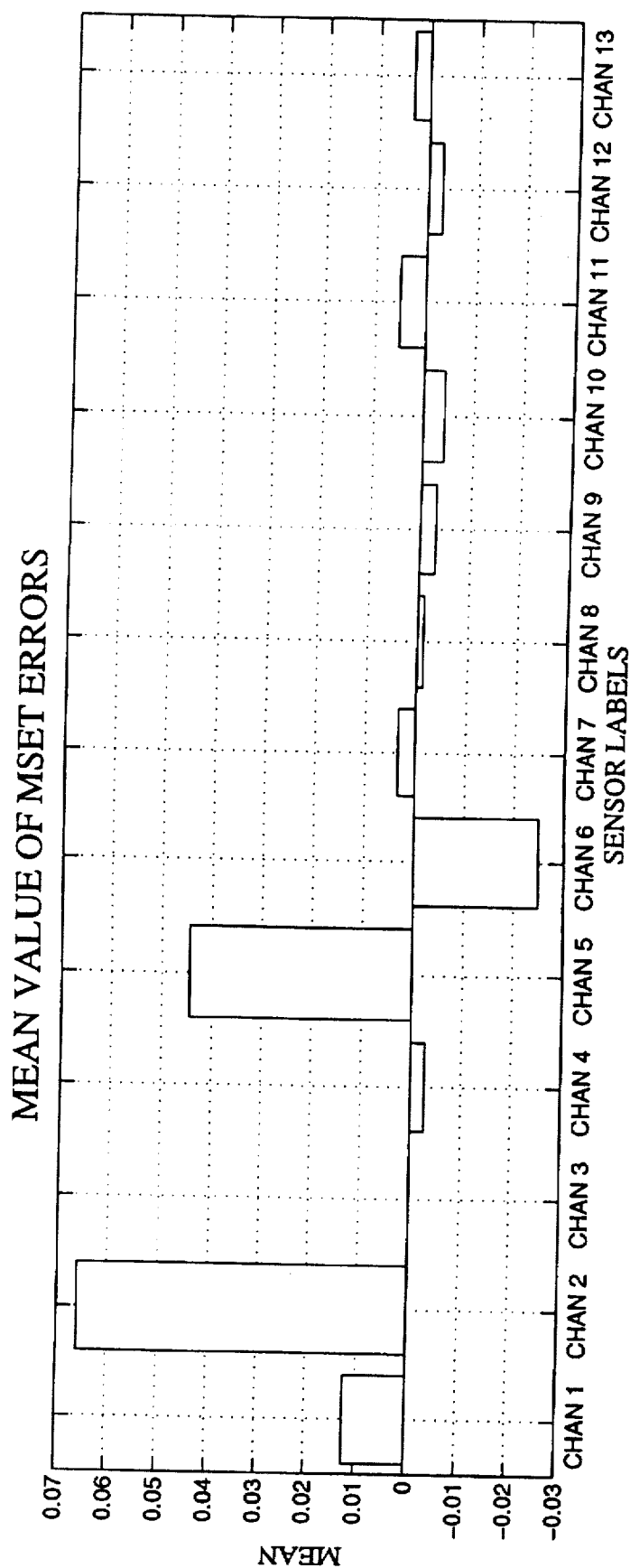
FIG. 20B illustrates the mean value of SMSET errors for each of the data in FIG. 7-19.
Figure 21A:
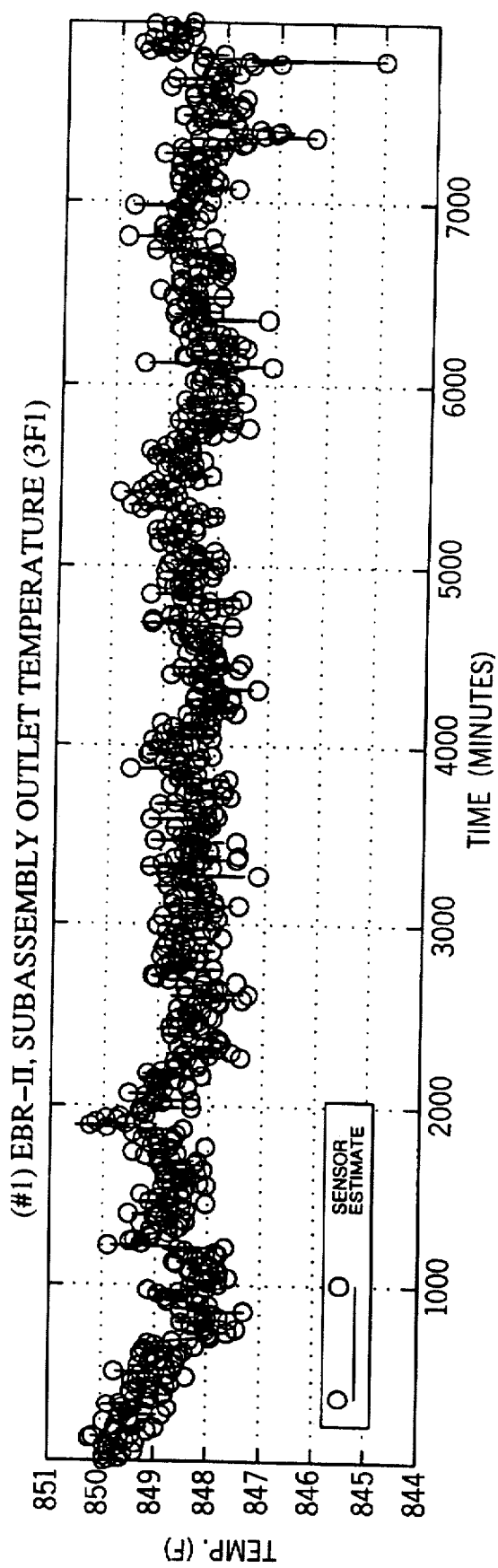
FIG. 21A illustrates time dependent normal SOT for 3F1 in the EBR-II nuclear reactor.
Figure 21B:
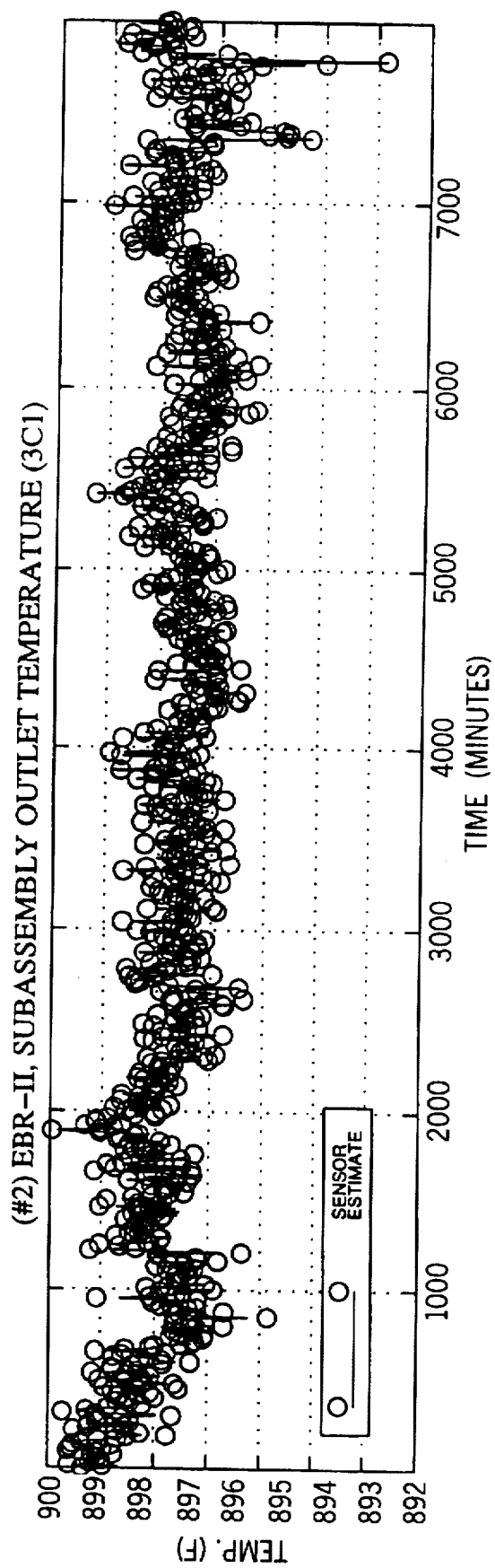
FIG. 21B illustrates normal SOT for 3C1.
Figure 21C:
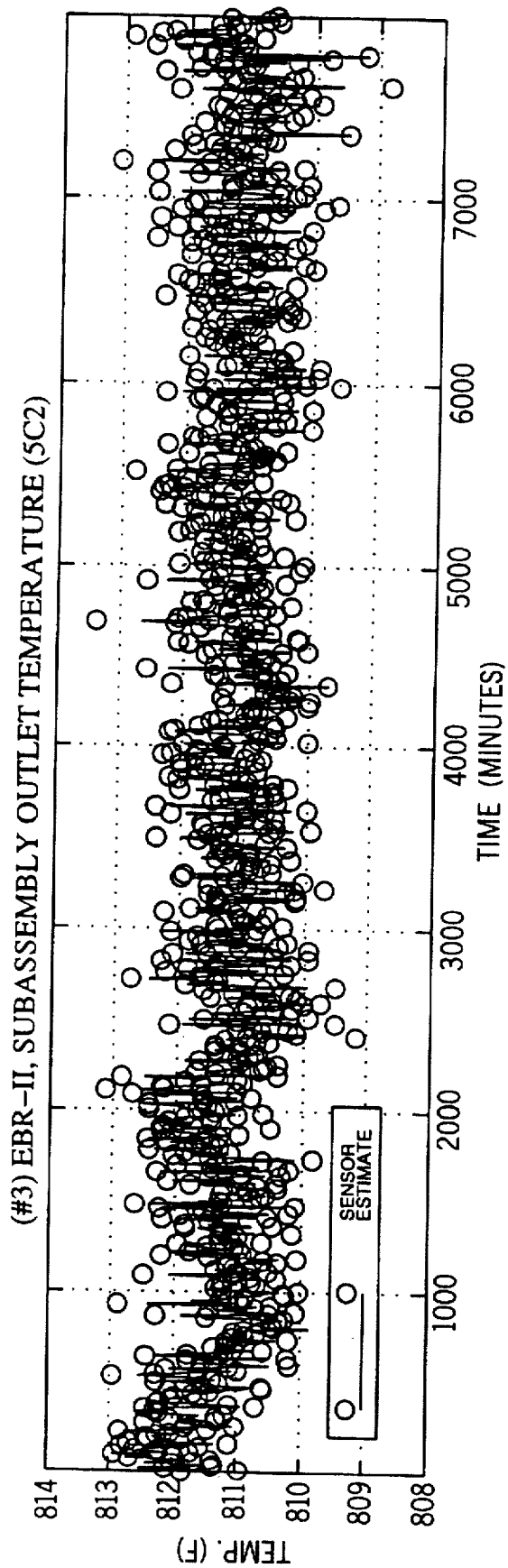
FIG. 21C illustrates normal SOT for 5C2 and FIG. 21D illustrates normal SOT for 7A3.
Figure 21D:
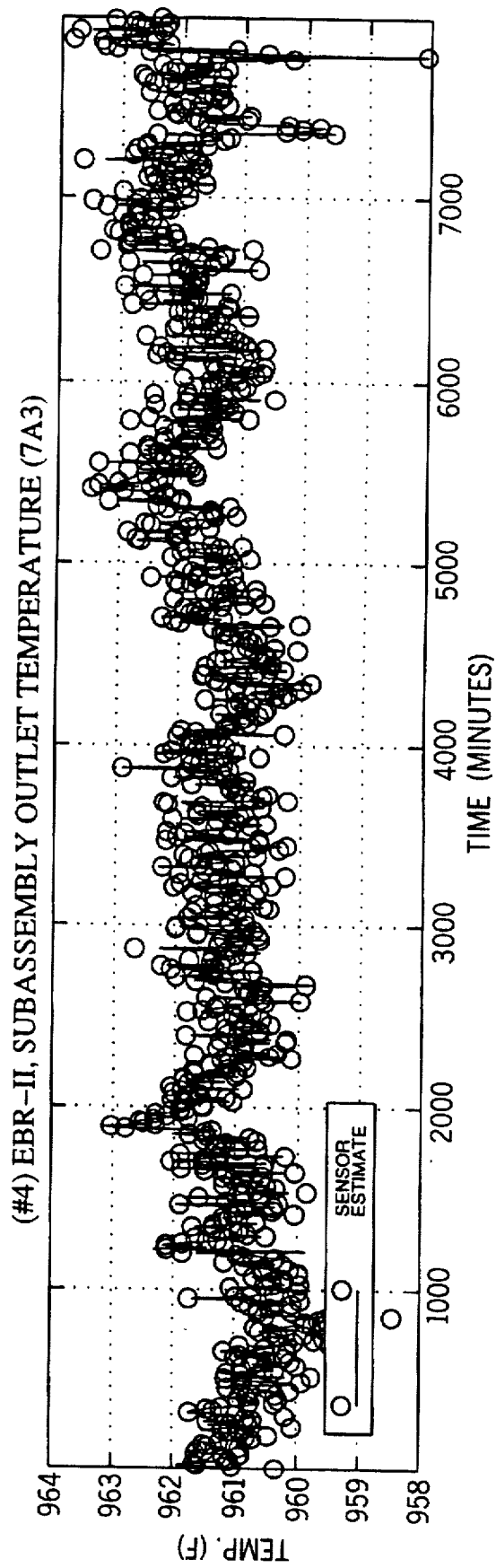
Figure 22A:
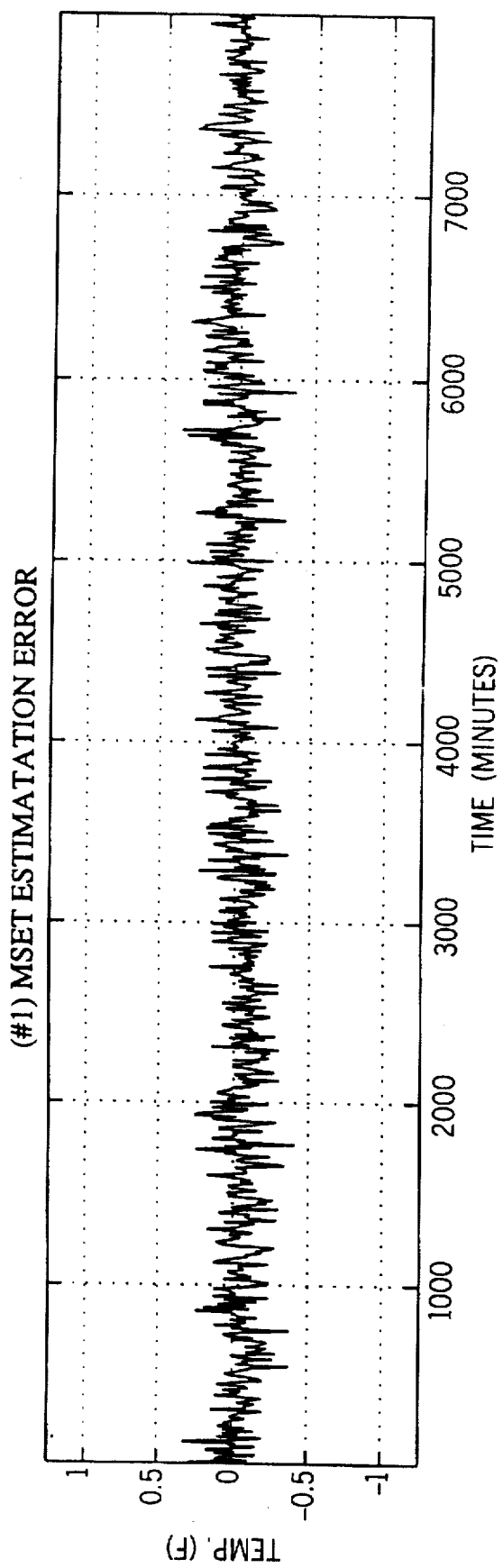
FIG. 22A–D illustrates SMSET estimation error for each of the data of FIGS. 21A–D, respectively.
Figure 22B:
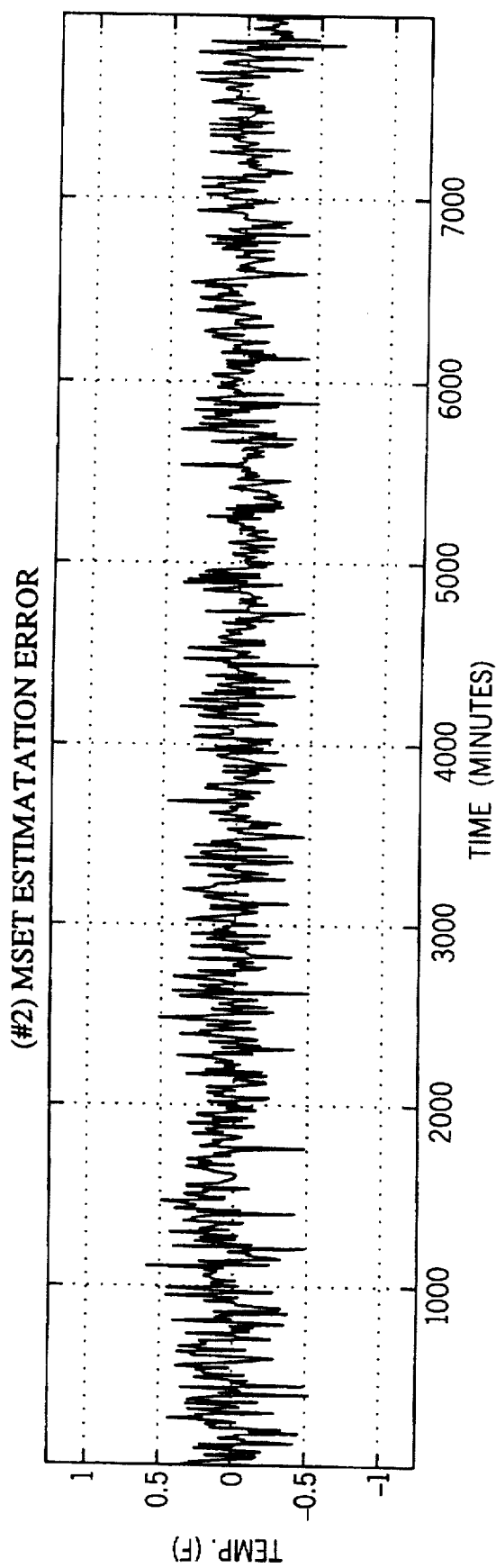
Figure 22C:
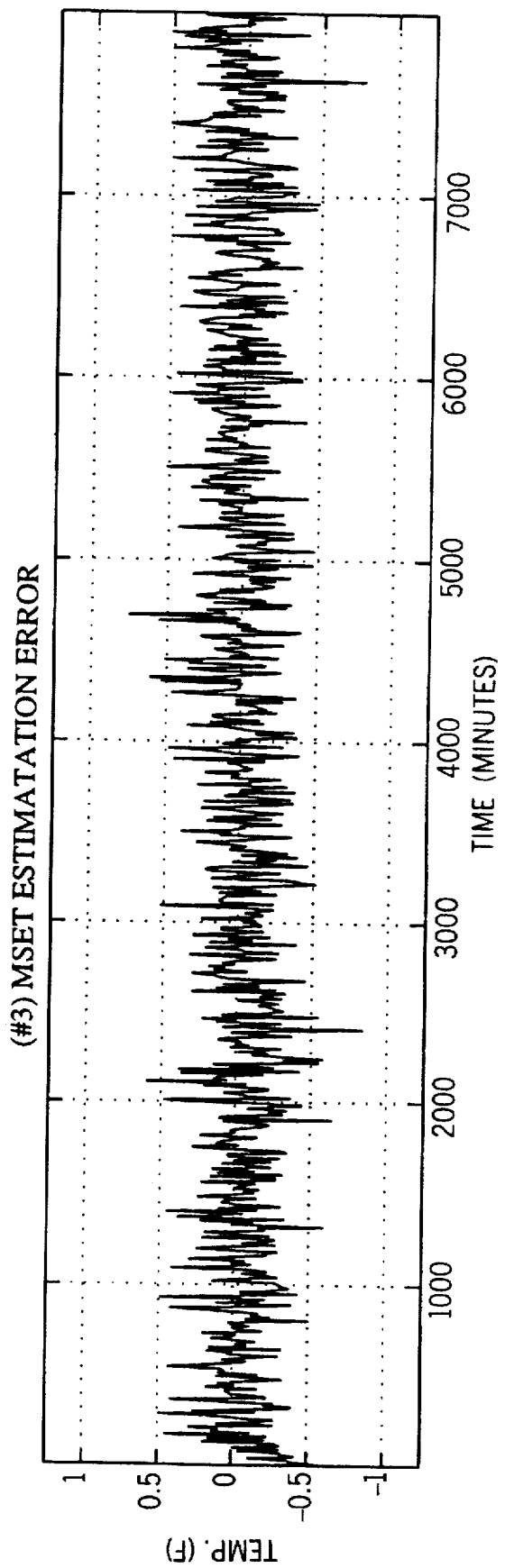
Figure 22D:
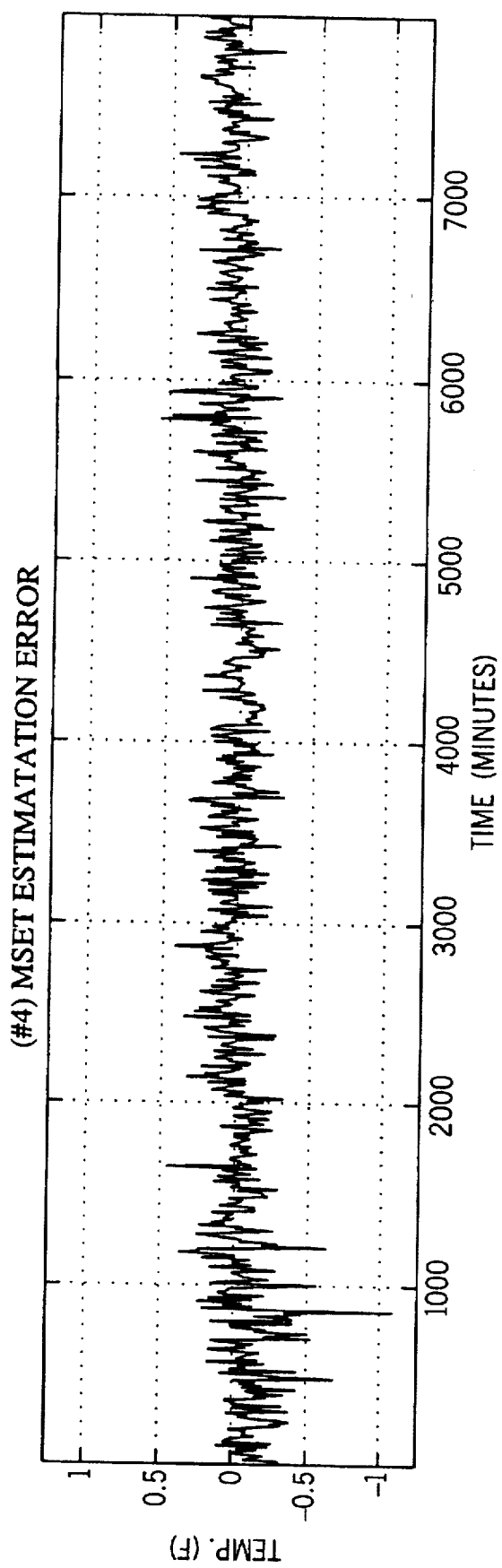
Figure 23A:
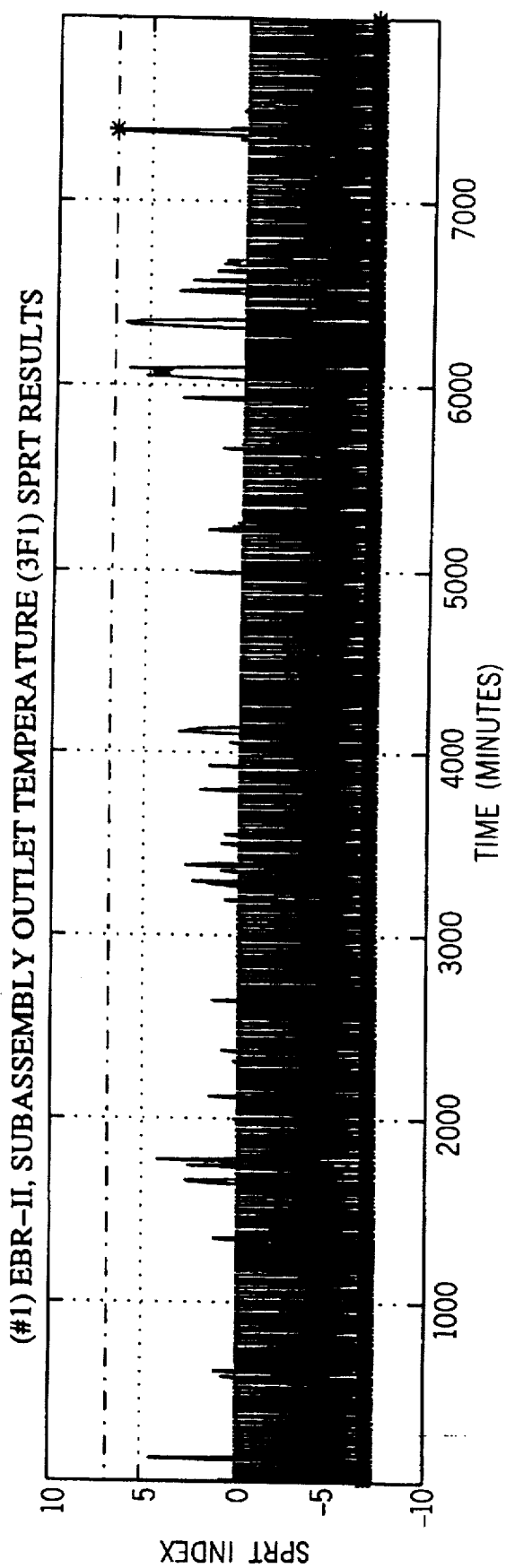
FIG. 23A–D illustrates SPRT results for each of the data of FIGS. 21A–D, respectively.
Figure 23B:
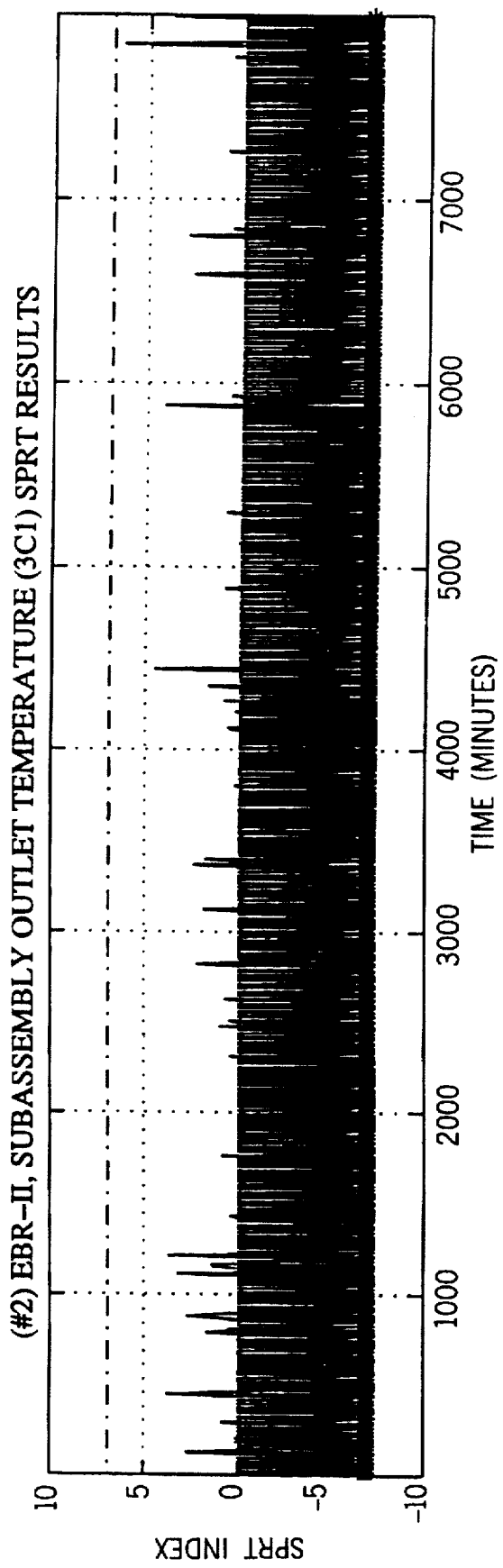
Figure 23C:
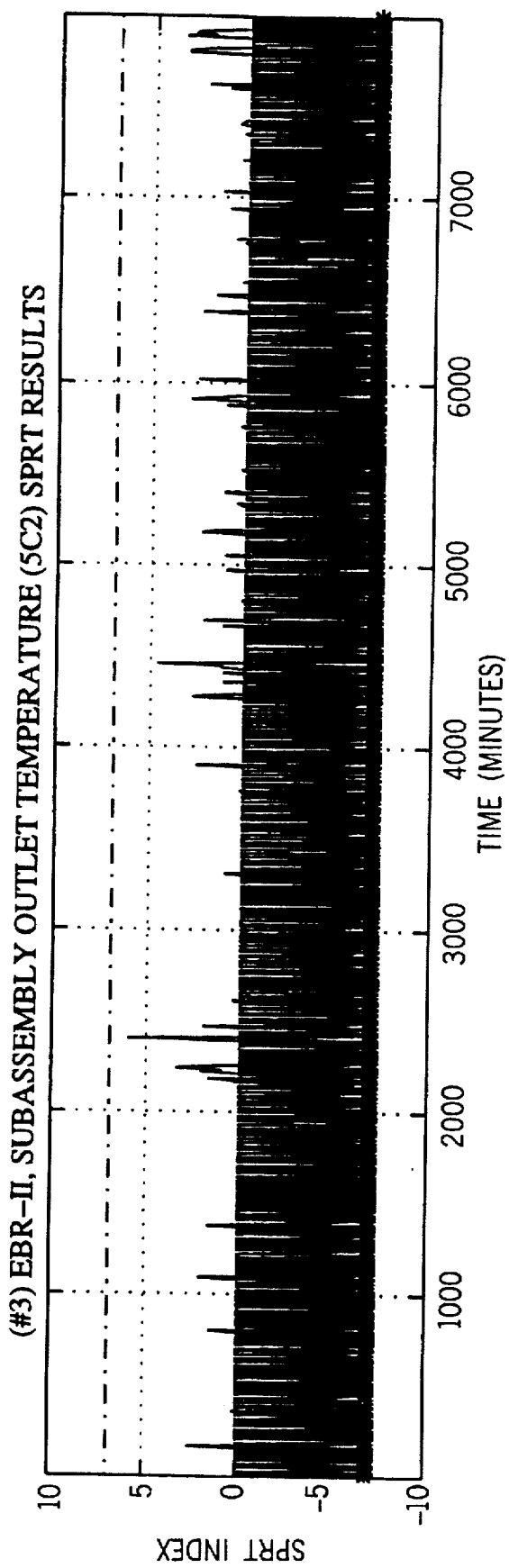
Figure 23D:
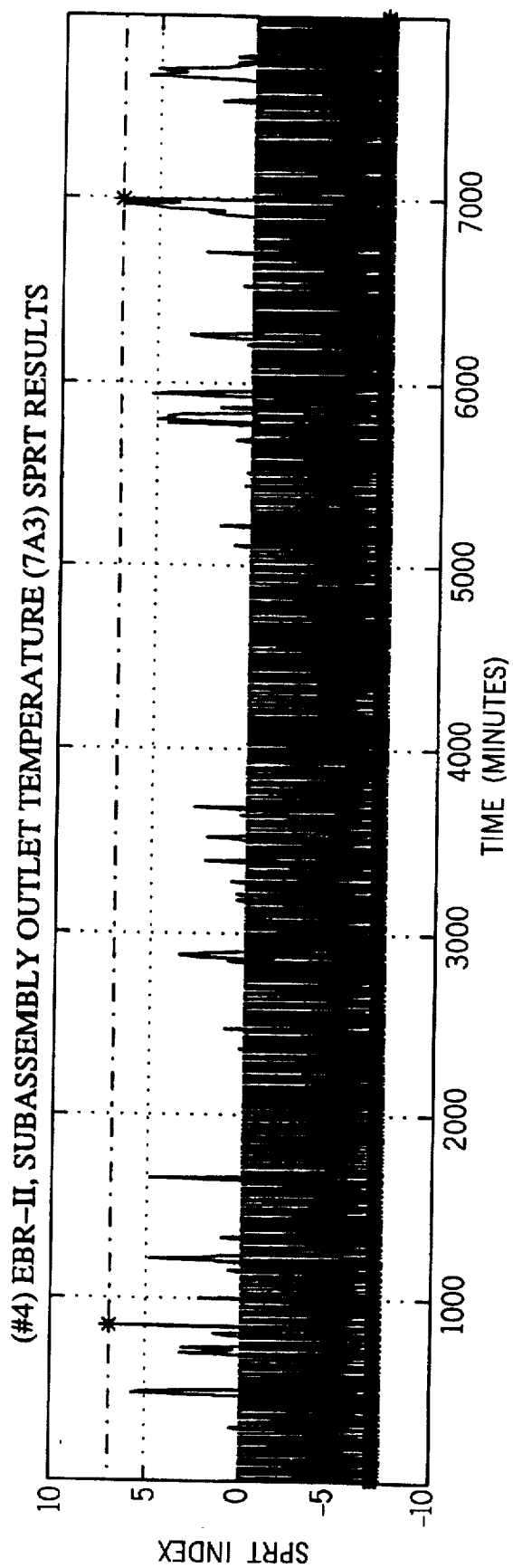
Figure 24A:
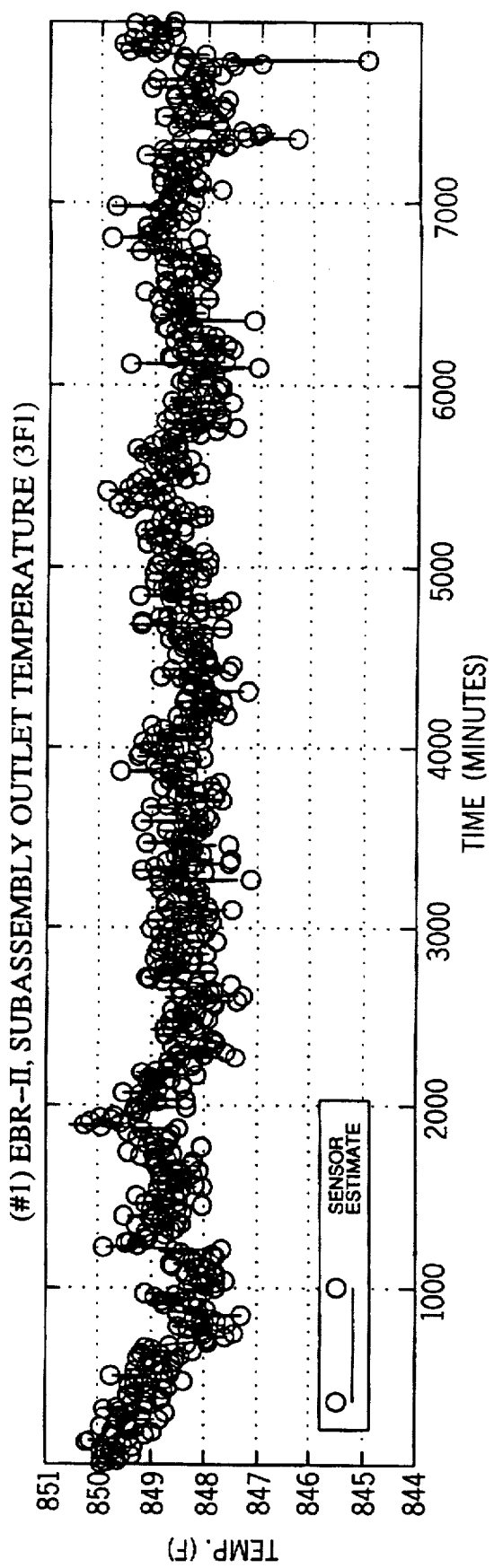
FIG. 24A corresponds exactly to FIG. 21A.
Figure 24B:
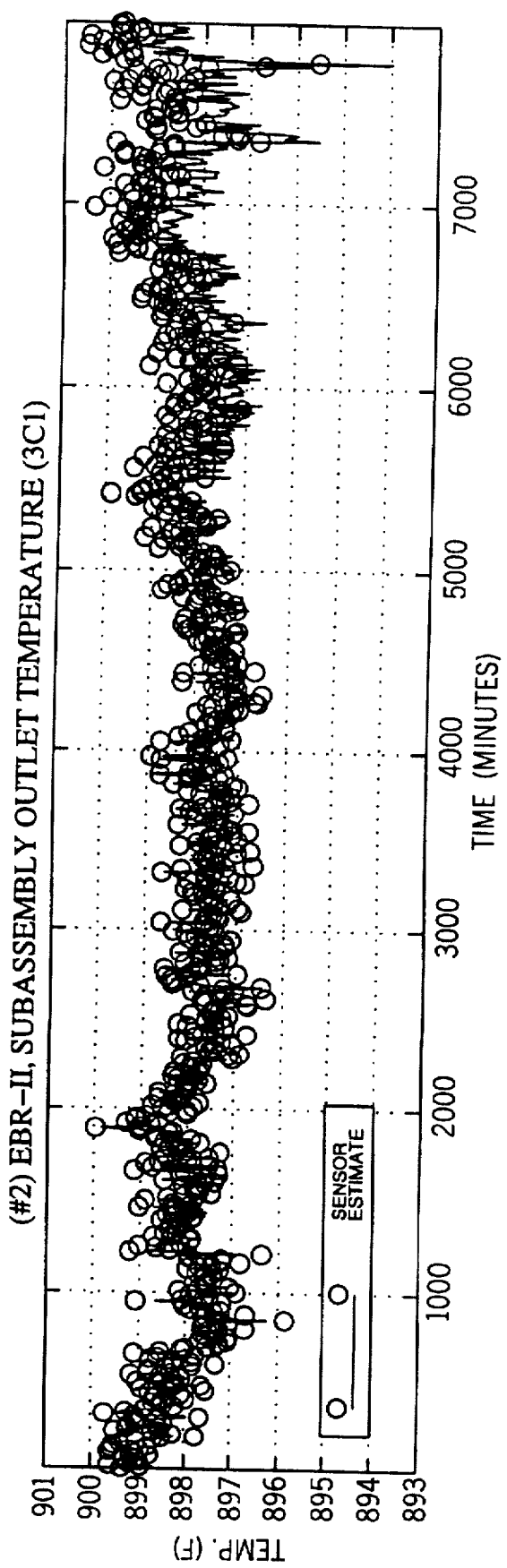
FIG. 24B includes a linear drift component compared to FIG. 21B.
Figure 24C:
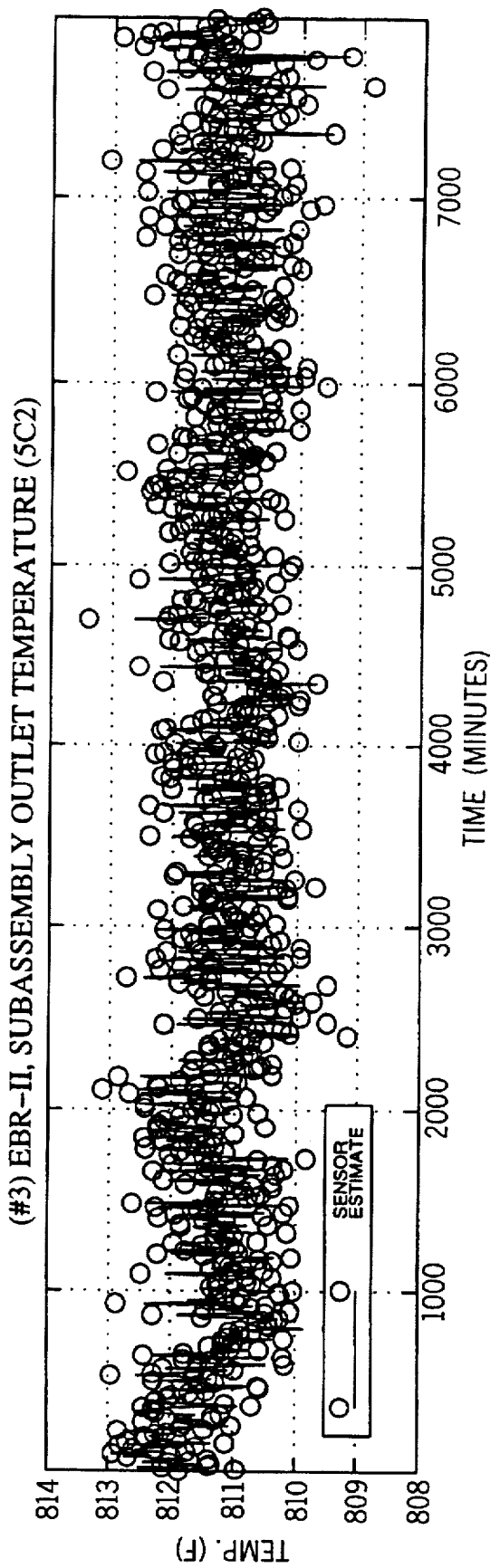
FIGS. 24C and 24D correspond exactly to FIG. 21C and 21D, respectively.
Figure 24D:
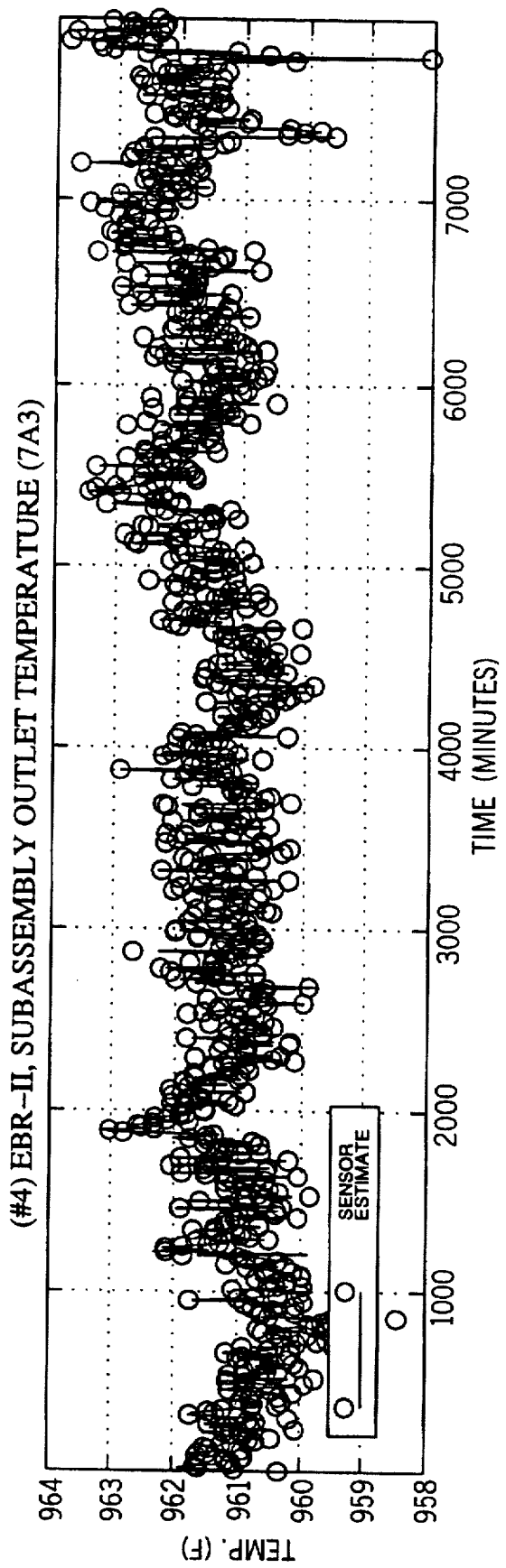
Figure 25A:
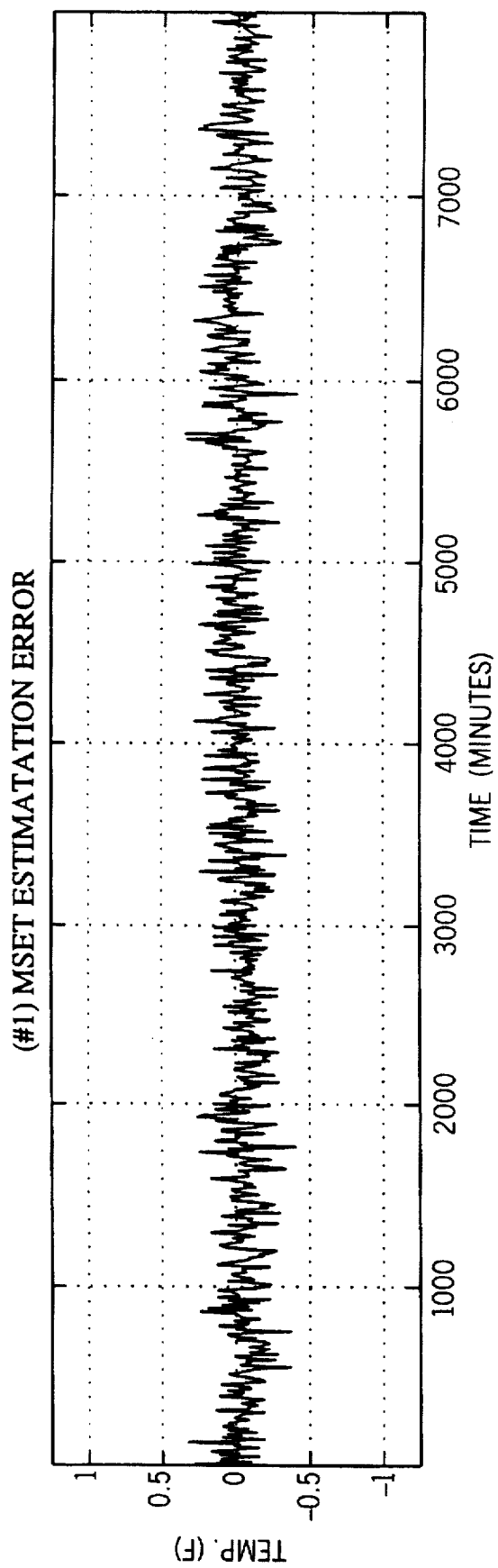
FIG. 25A corresponds exactly to FIG. 22A.
Figure 25B:
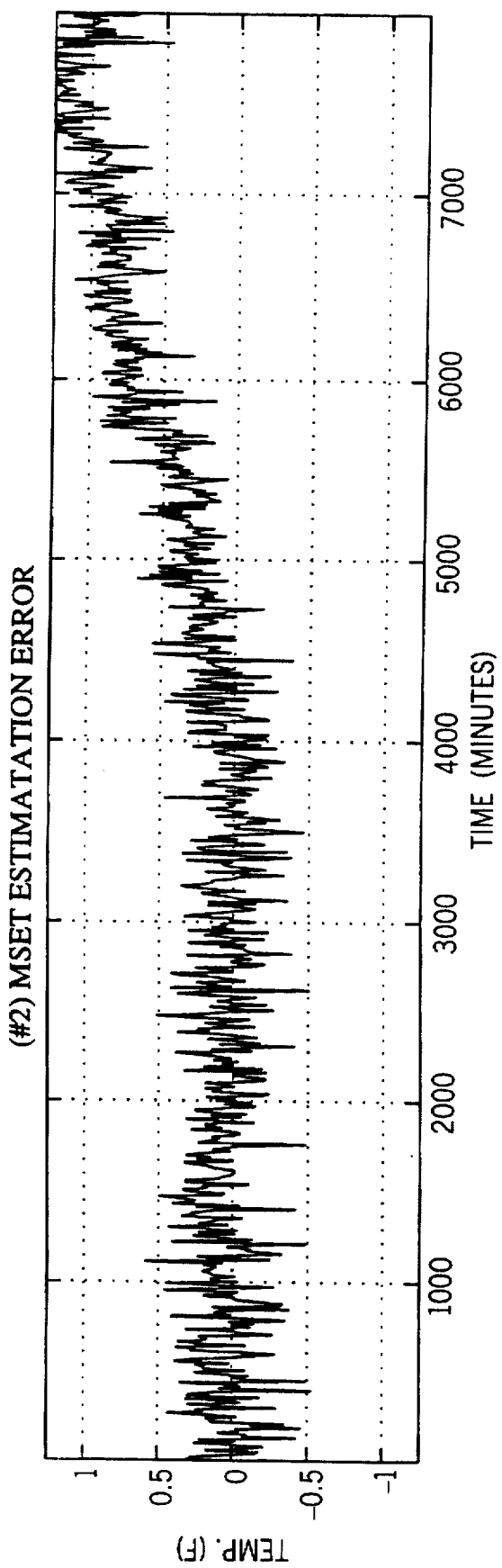
FIG. 25B includes the effect on SMSET estimation error of the linear drift of FIG. 24B.
Figure 25C:
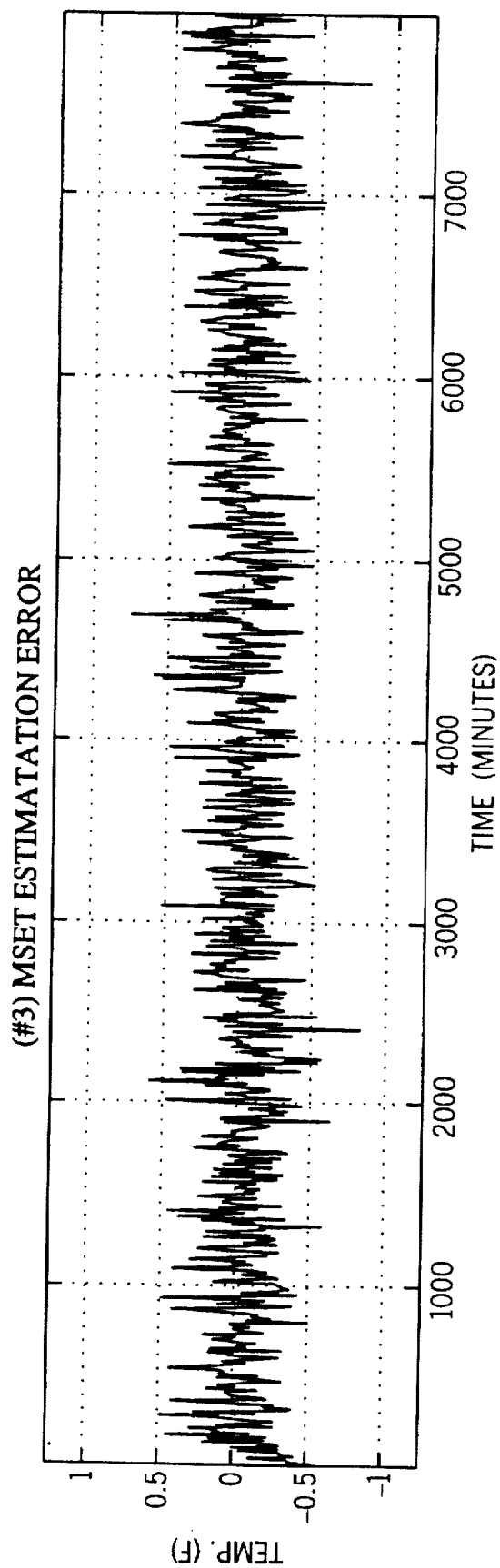
Figure 25D:
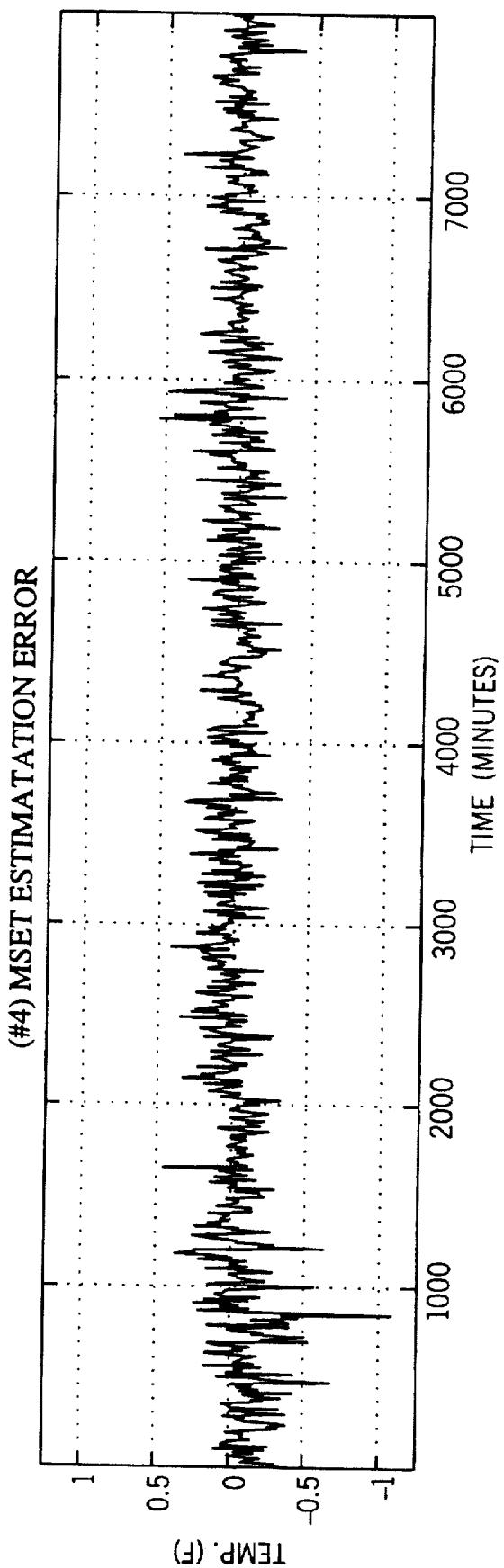
Figure 26A:
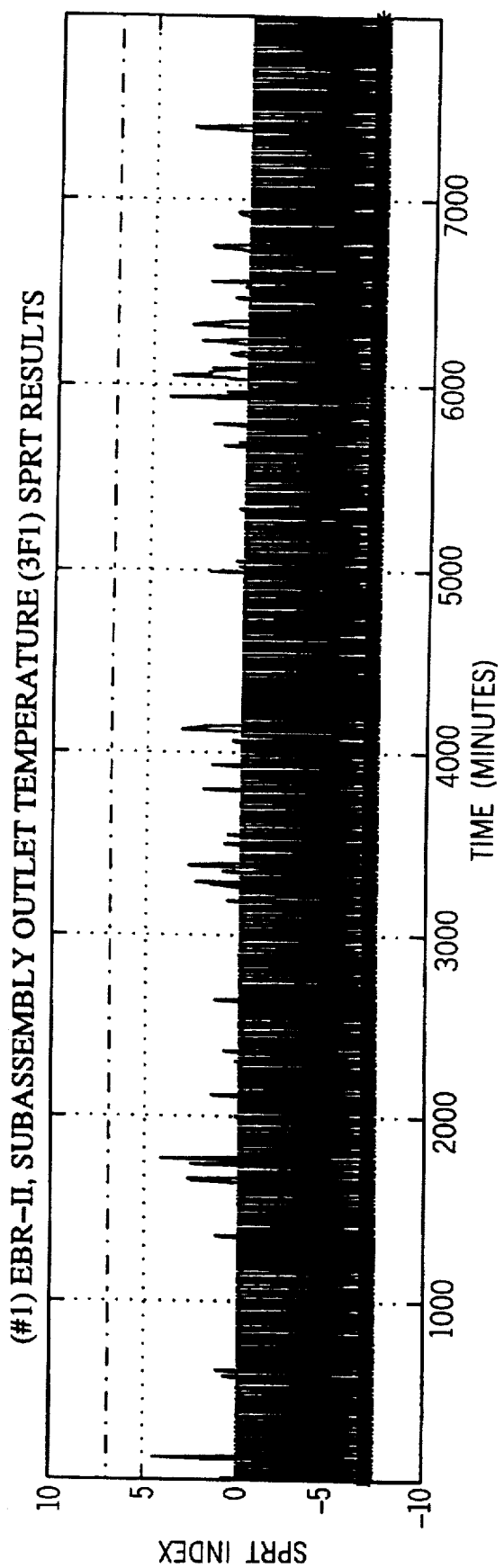
FIG. 26A corresponds exactly to FIG. 23A.
Figure 26B:
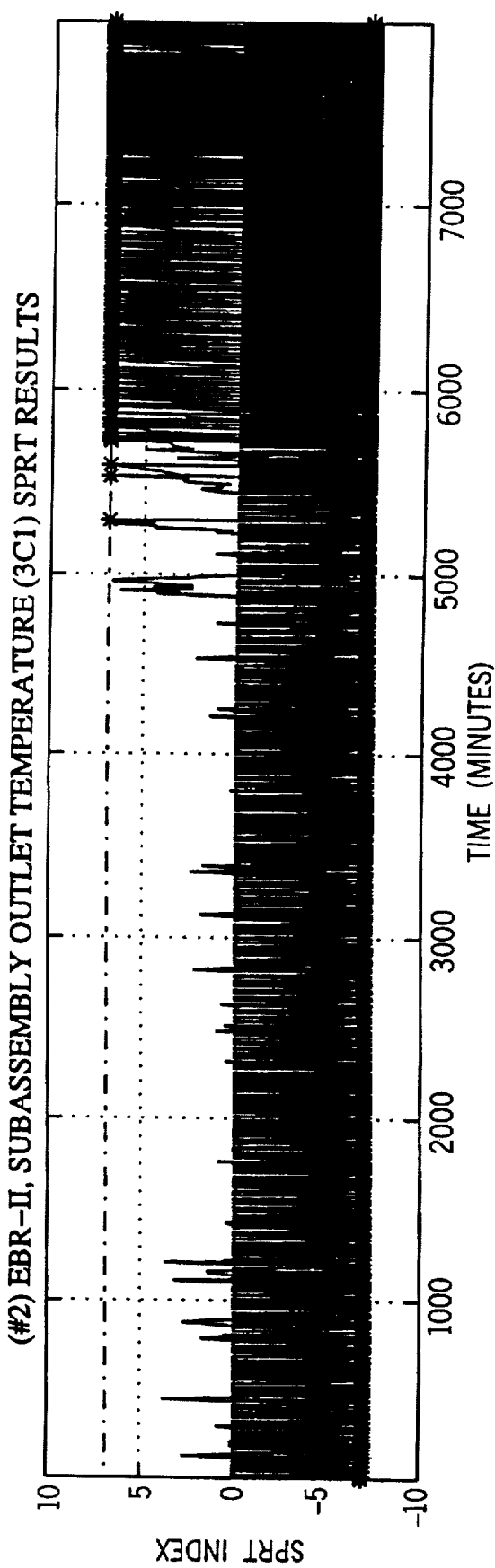
FIG. 26B illustrates the SPRT results for the linear drift error of FIG. 24B.
Figure 26C:
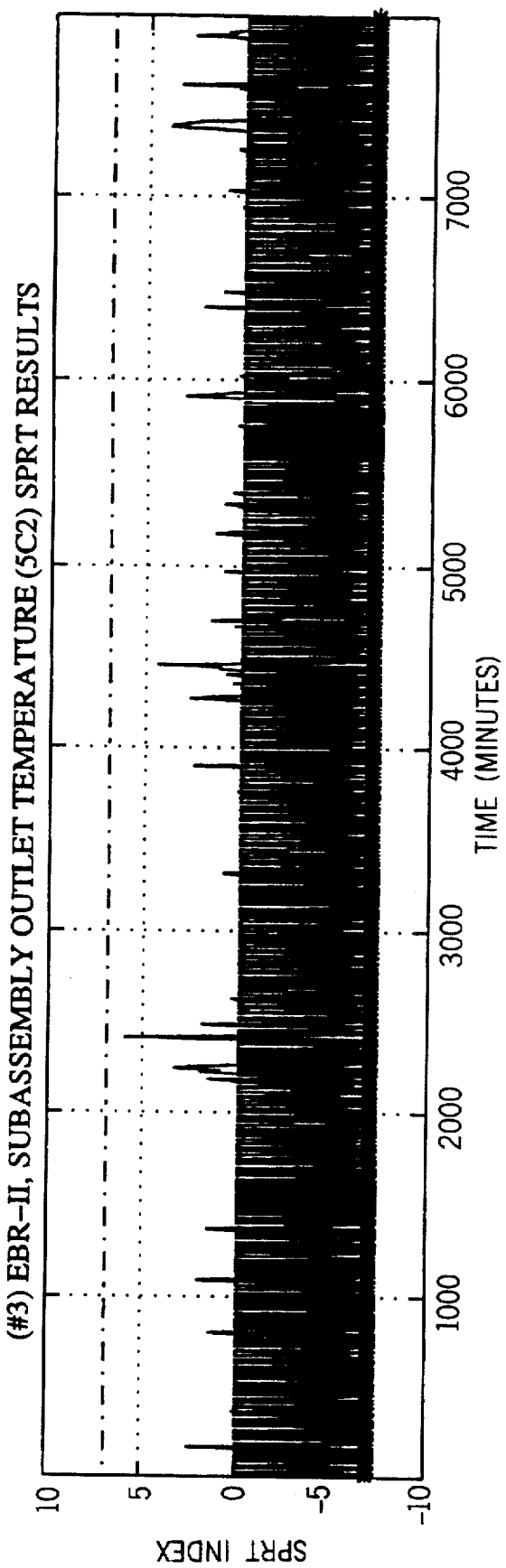
FIGS. 26C and D corresponds exactly to FIG. 23C and D, respectively.
Figure 26D:
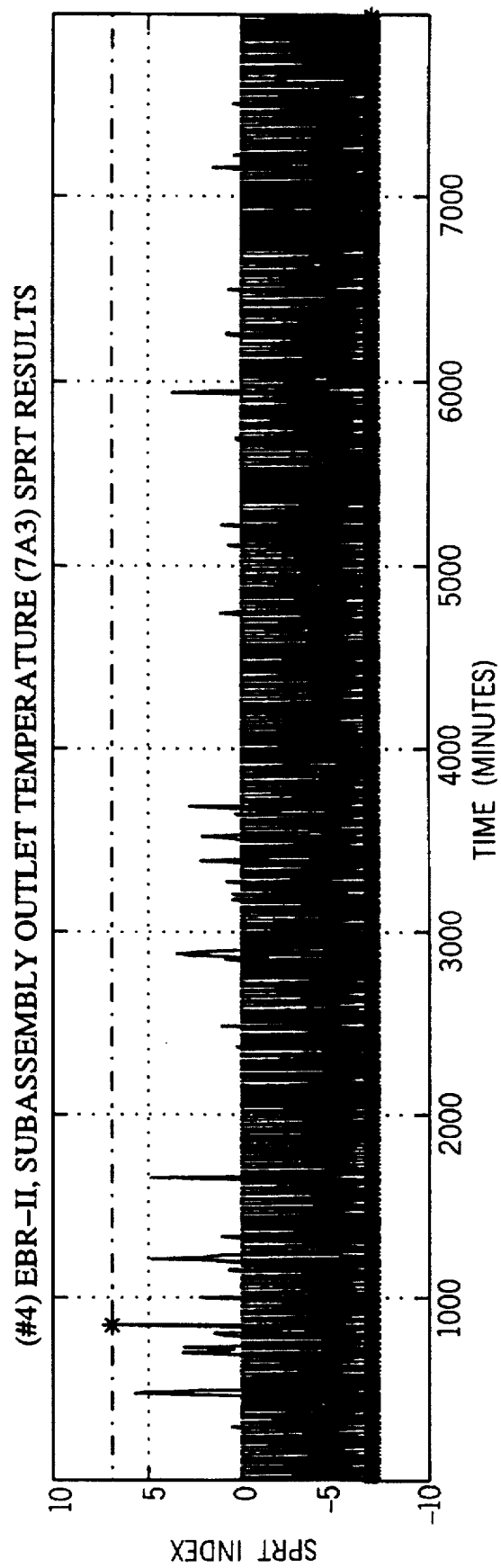
Figure 27A:
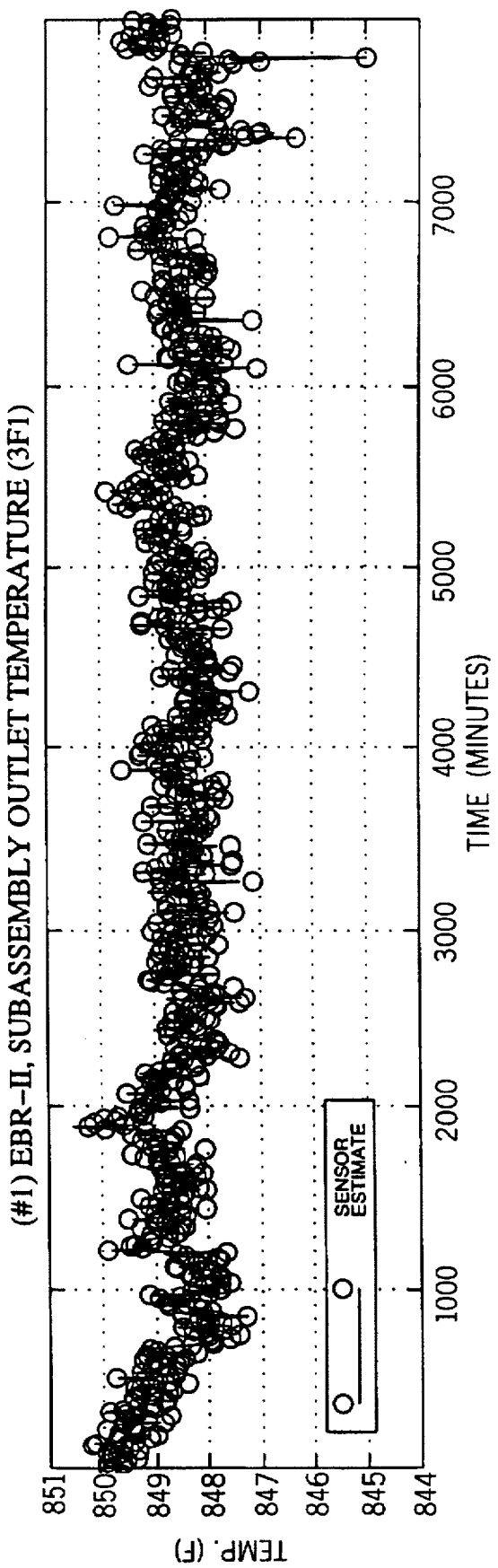
FIGS. 27A and 28B corresponds exactly to FIGS. 21A and 21B, respectively.
Figure 27B:
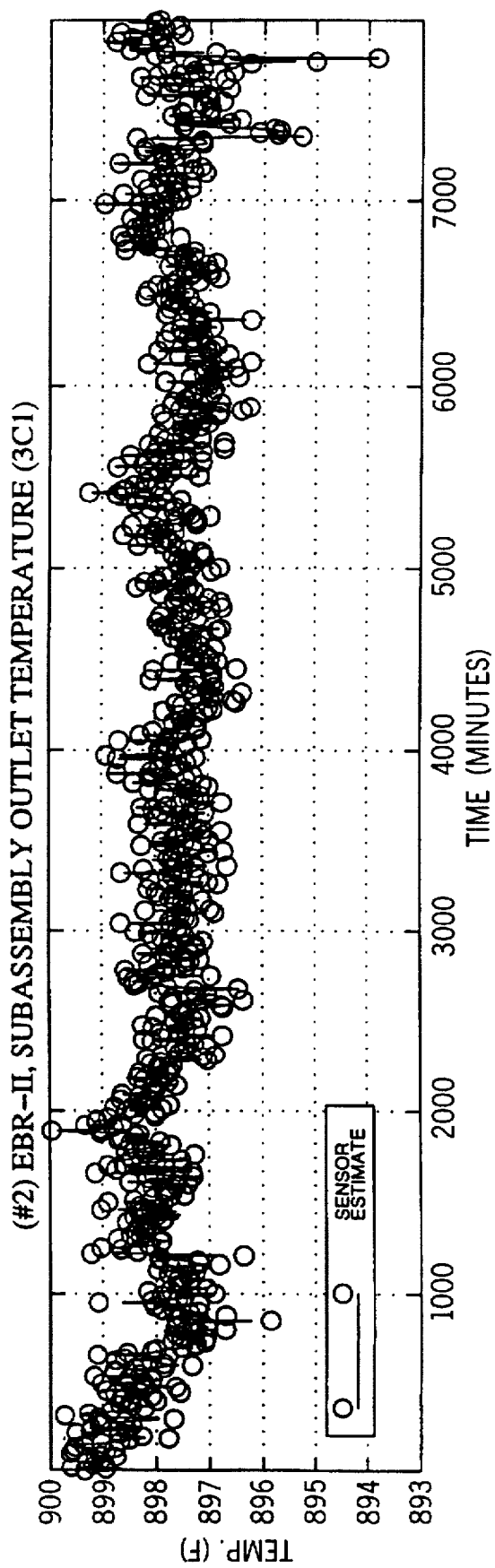
FIG. 27C includes a temporary amplitude pulse of 0.25% of the signal magnitude.
FIG. 27D corresponds exactly to FIG. 21D.
Figure 27C:
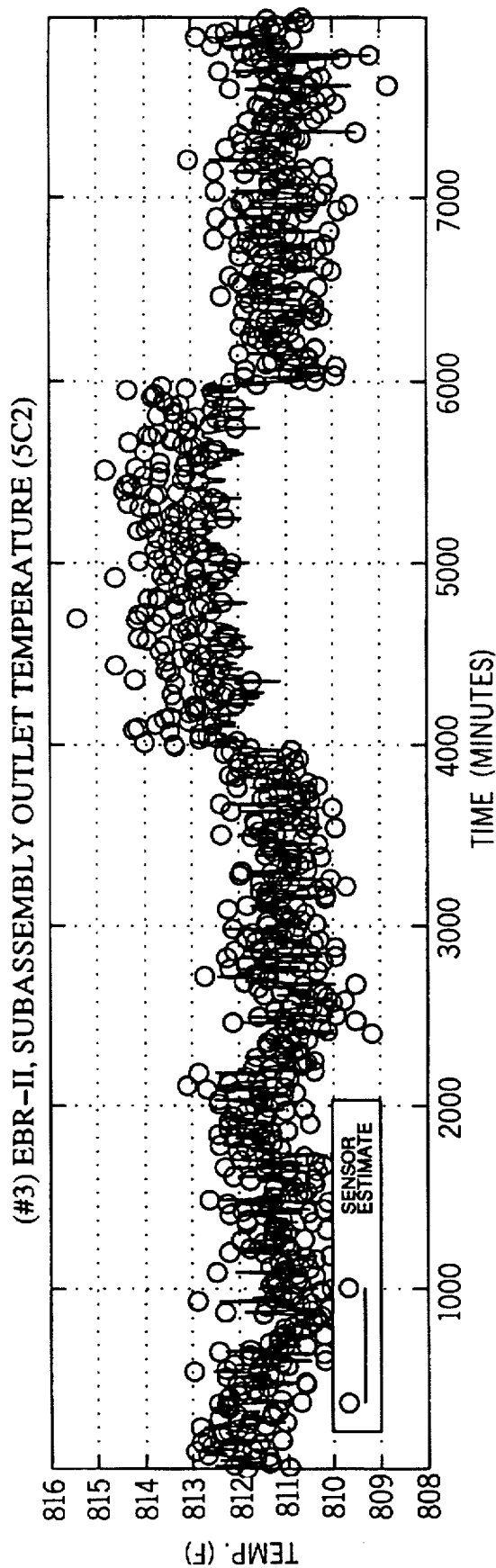
Figure 27D:
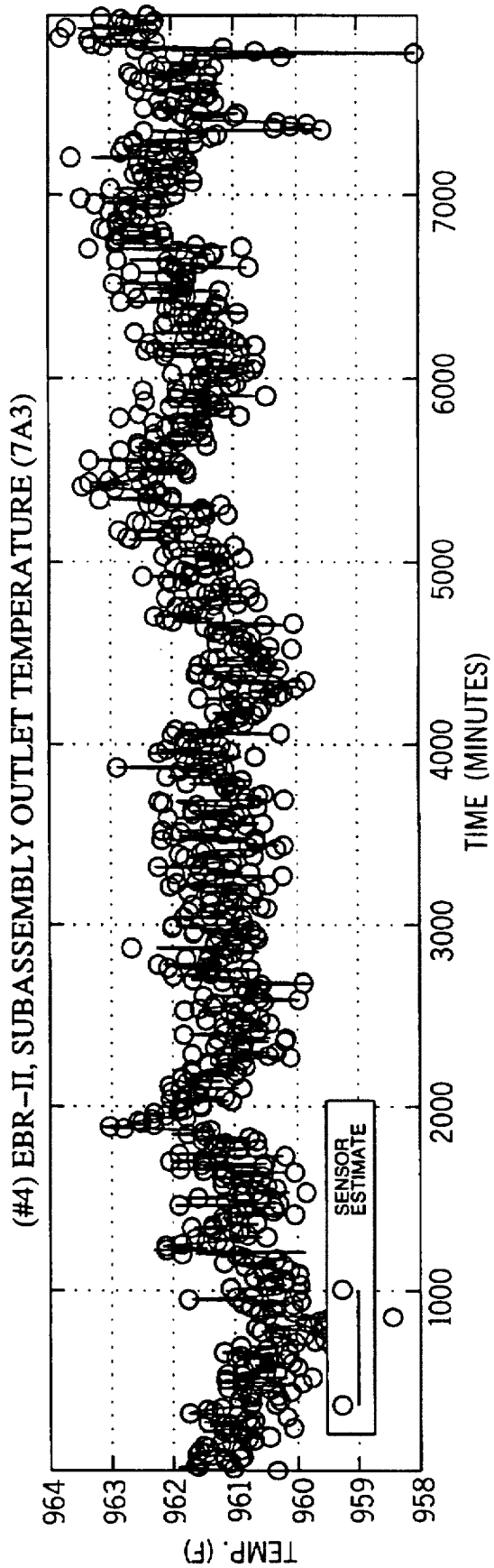
Figure 28A:
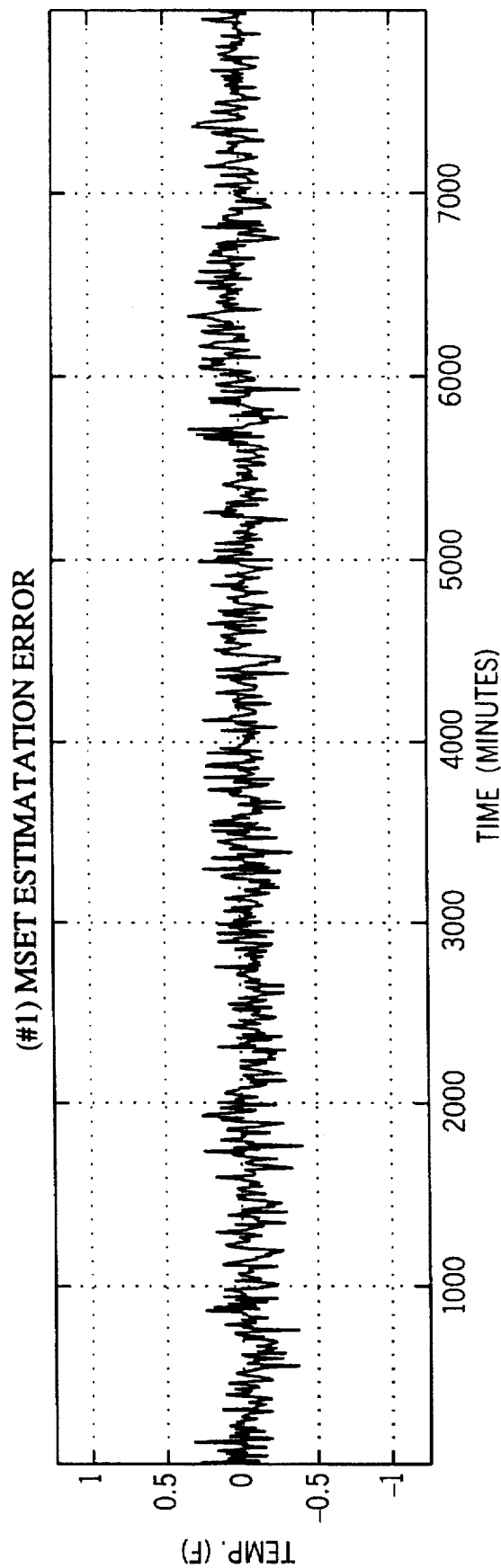
Figure 28B:
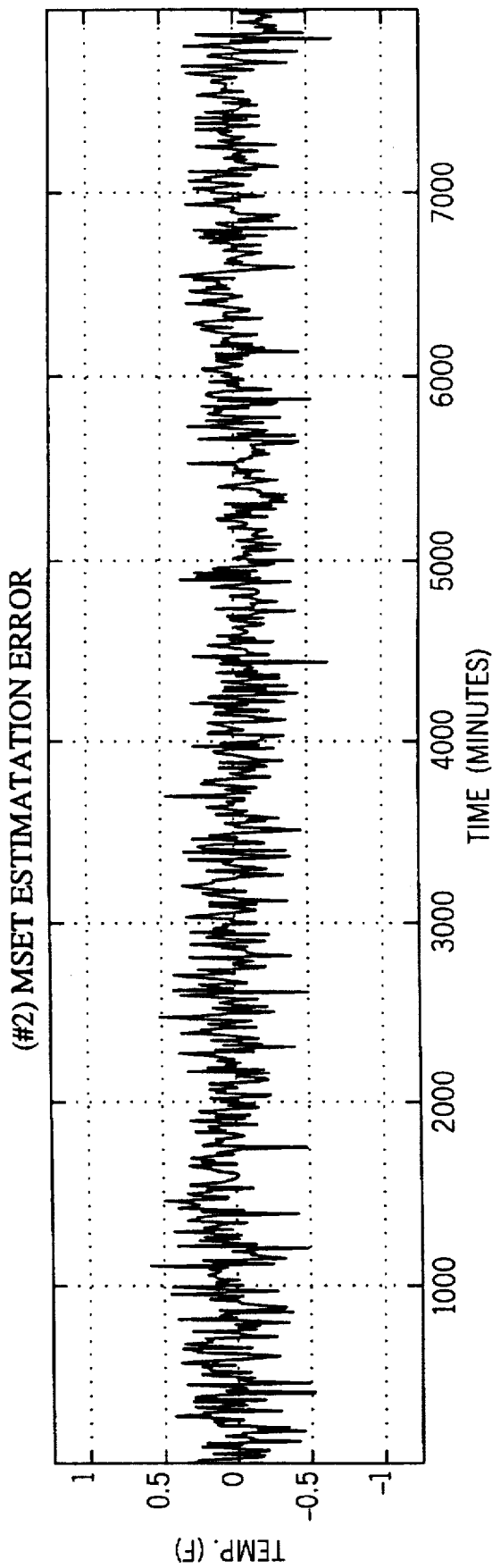
Figure 28C:
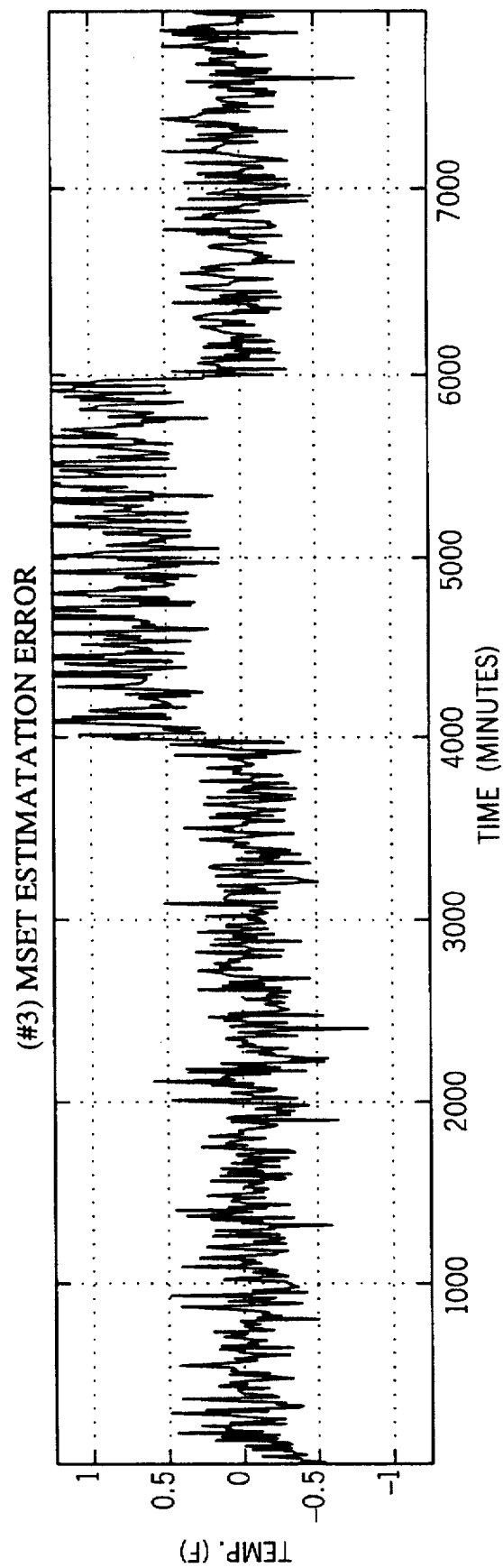
FIG. 28C illustrates SMSET estimation error for the amplitude pulse effect of FIG. 27C and FIG. 27D corresponds exactly to FIG. 22D.
Figure 28D:
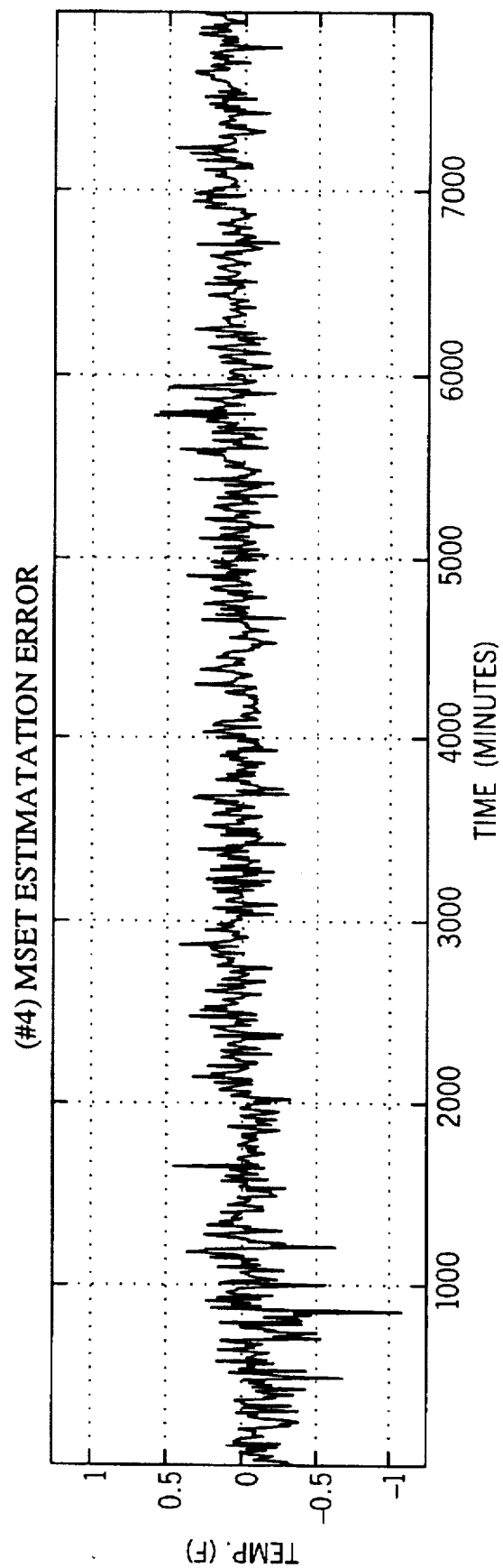
Figure 29A:
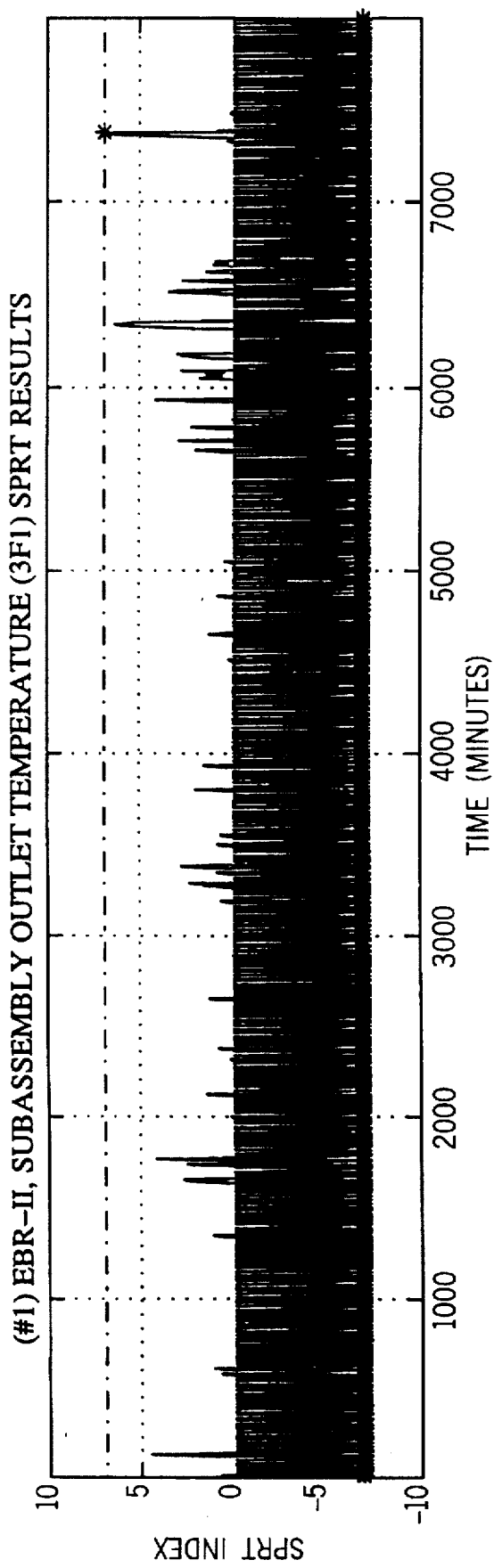
FIGS. 29A and 29B corresponds exactly to FIGS. 23A and 23B.
Figure 29B:
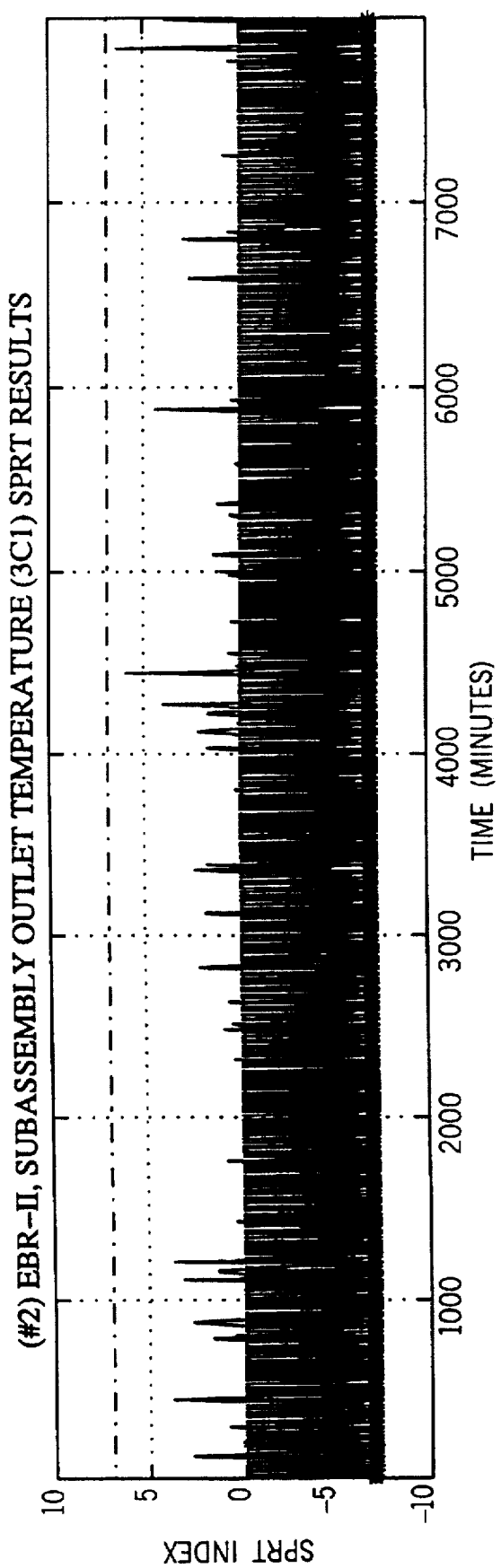
Figure 29C:
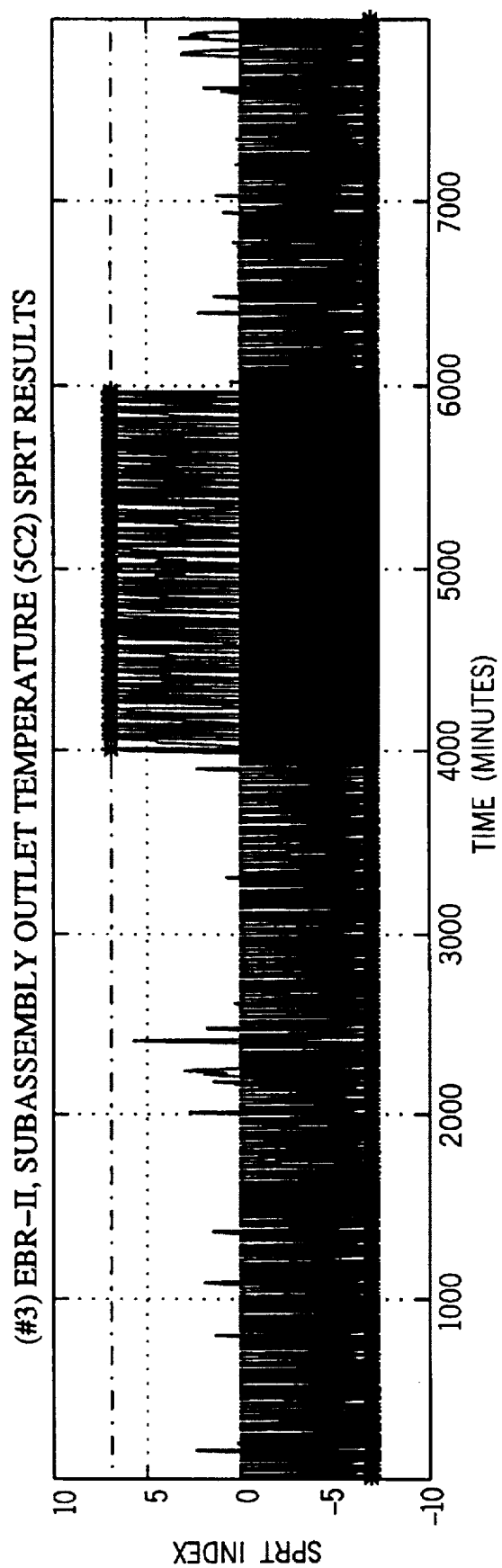
FIG. 29C illustrates SPRT results of the amplitude pulse in FIG. 27C.
Figure 29D:
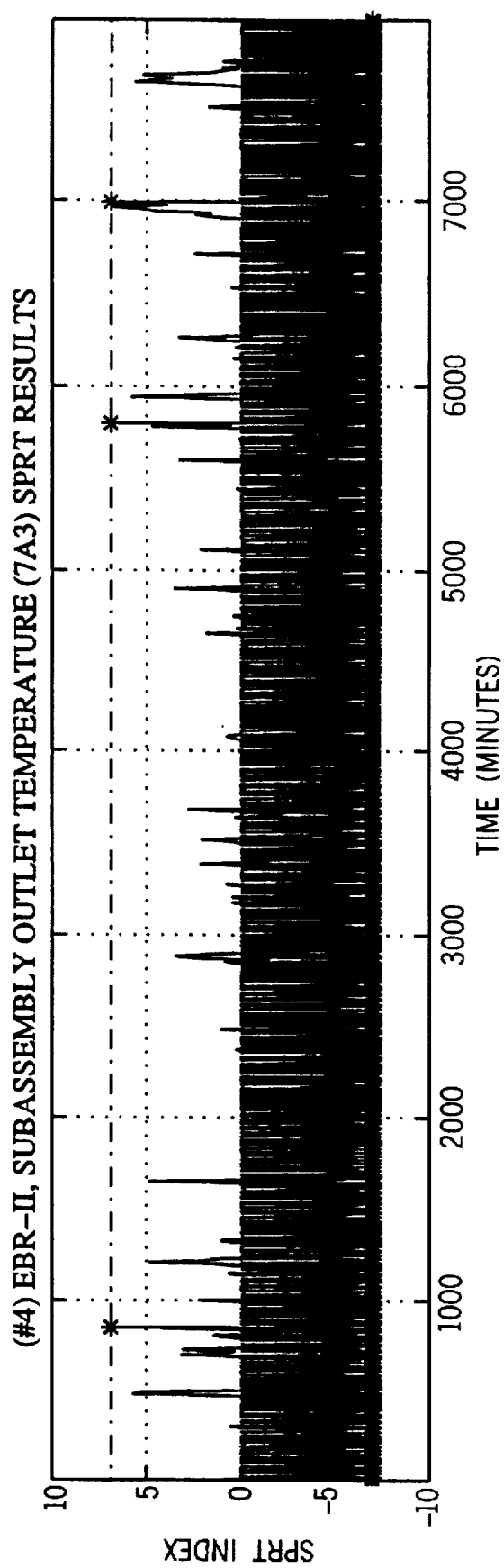
FIG. 29D corresponds exactly to FIG. 23D.
Figure 30A:
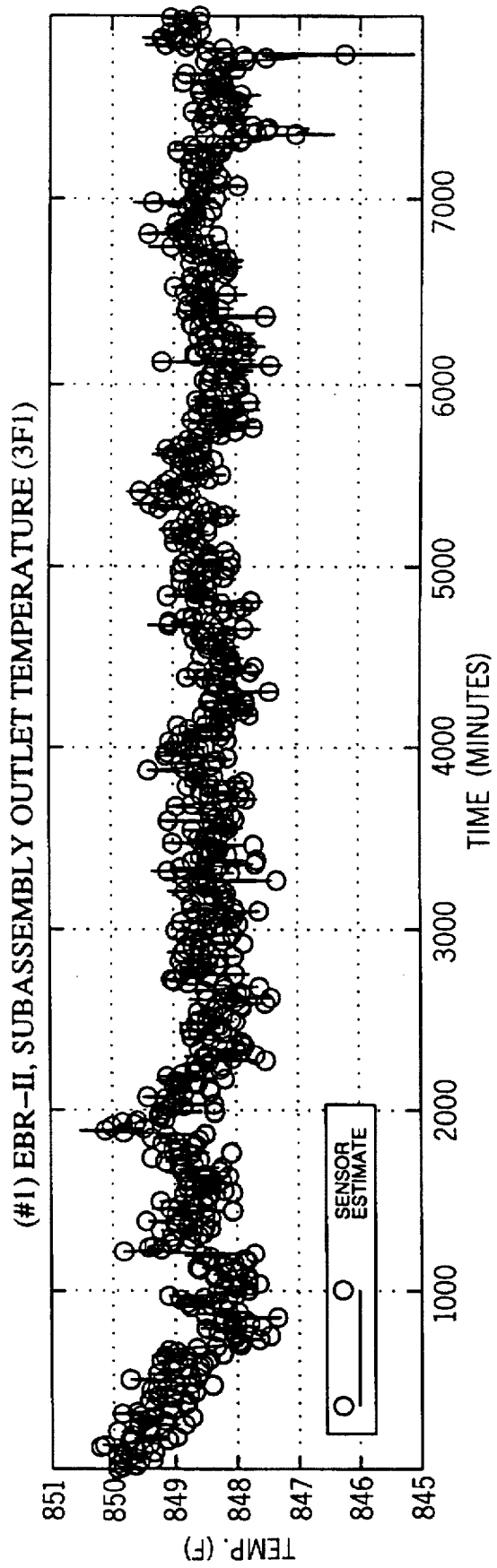
FIG. 30A illustrates EBRII subassembly temperature data 3F1 but includes a uniform gain change compared to FIG. 21A and FIGS. 30B–D correspond exactly to FIGS. 21B–D.
Figure 30B:
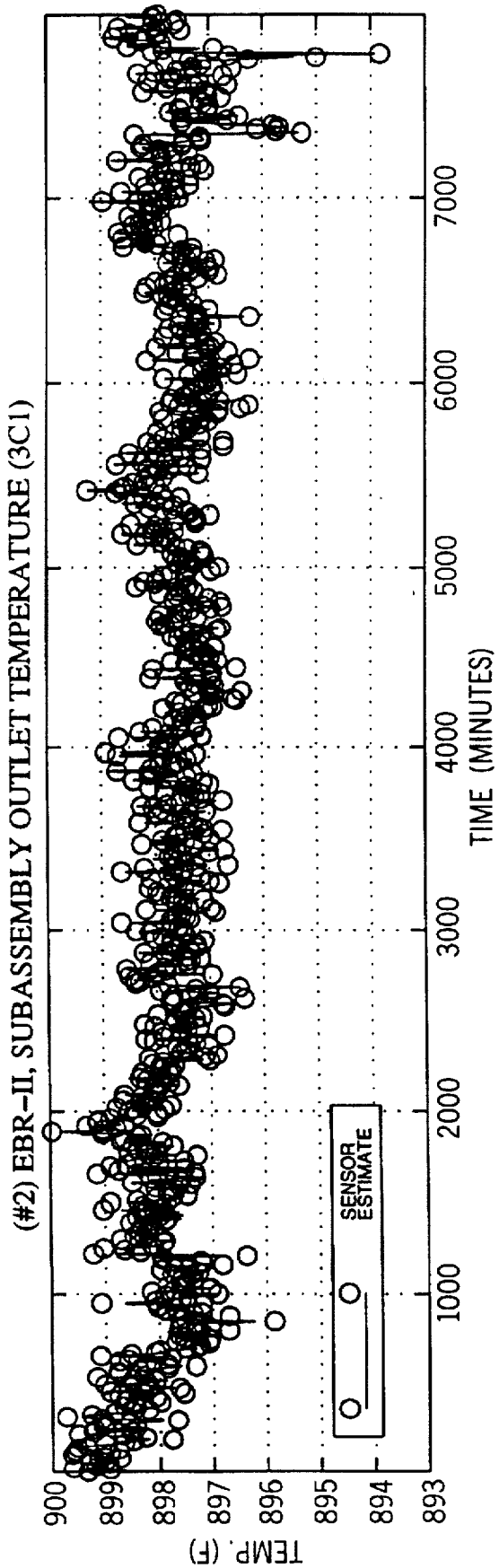
Figure 30C:
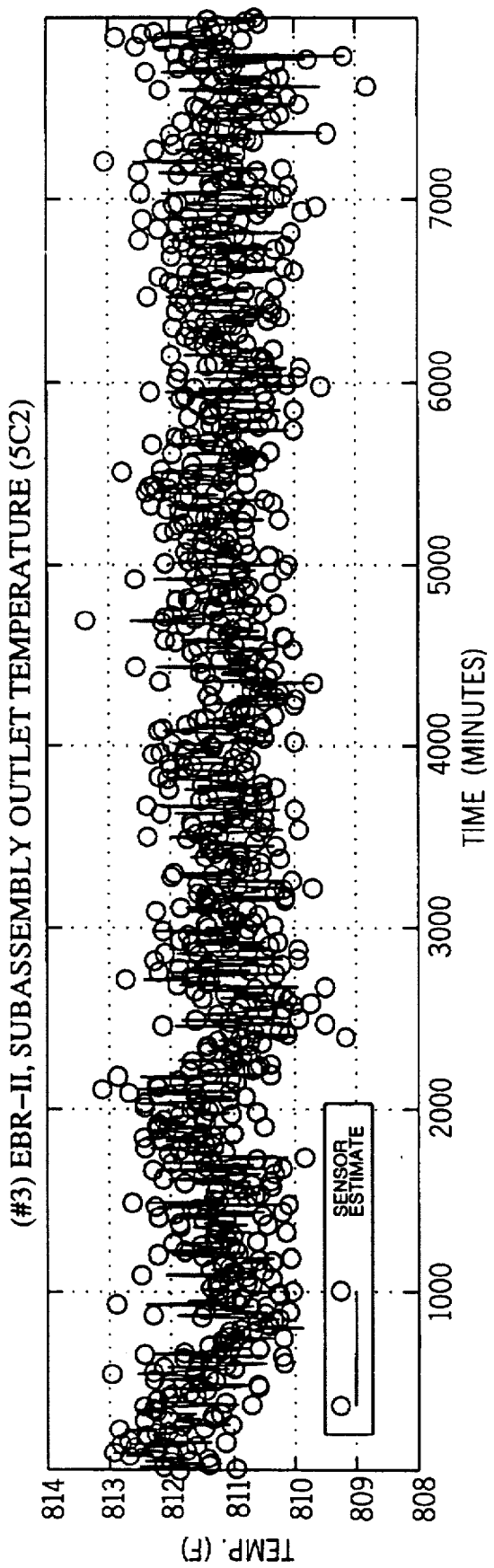
Figure 30D:
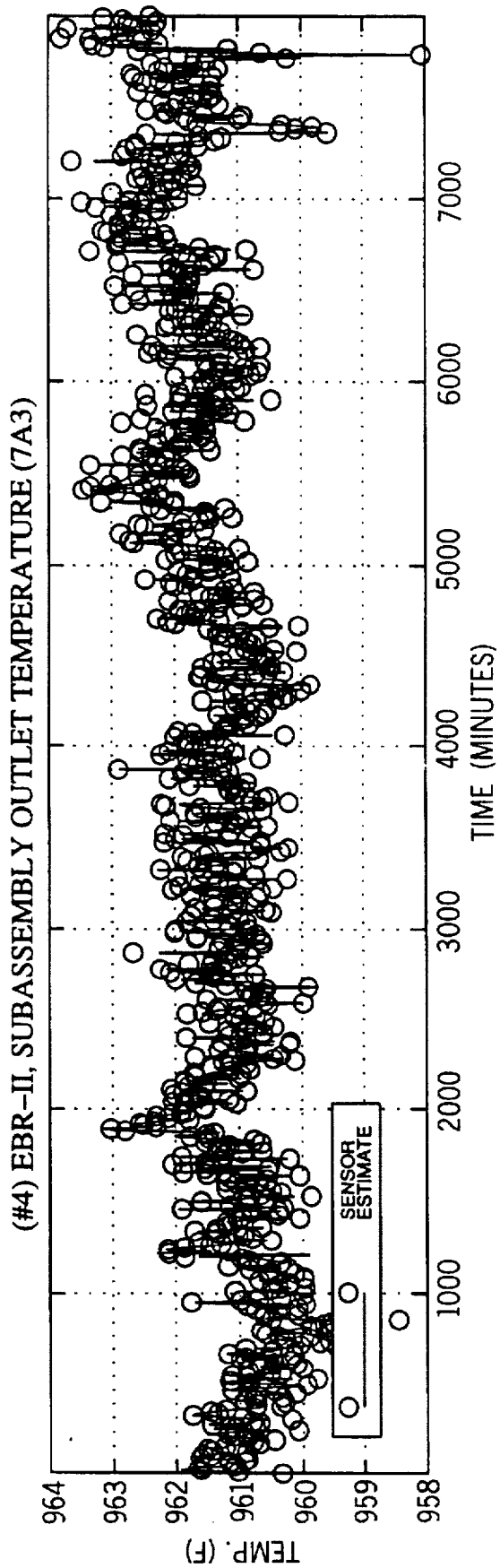
Figure 31A:
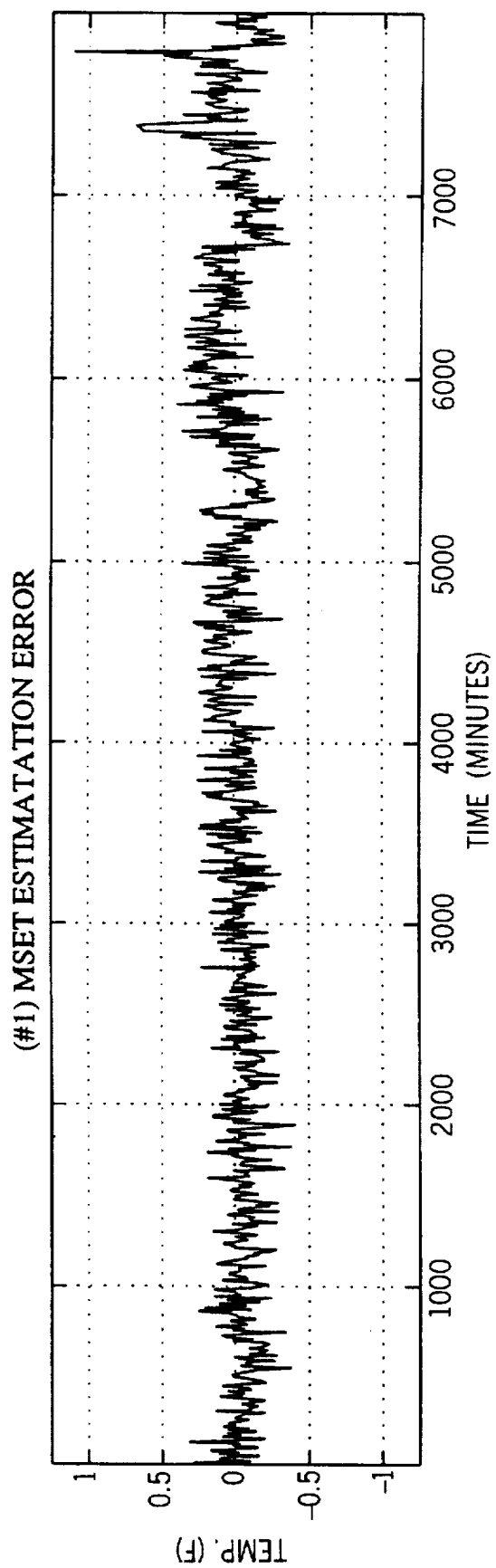
FIG. 31A illustrates the SMSET estimation error for the gain change of FIG. 30A.
Figure 31B:
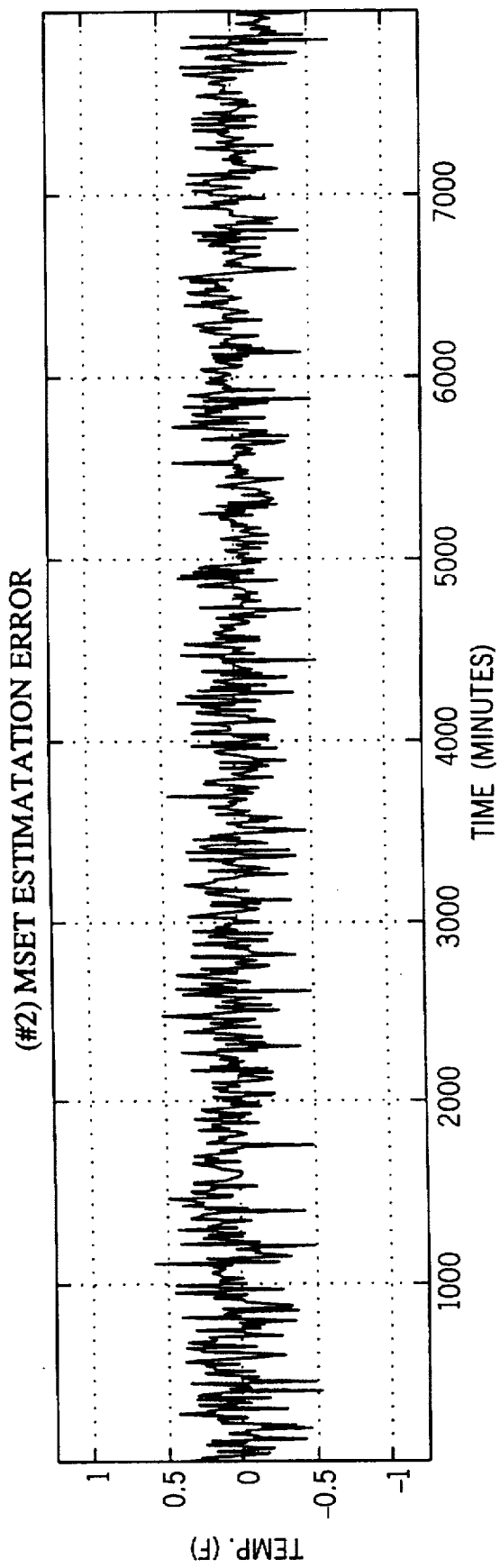
FIGS. 31B–D correspond exactly to FIGS. 22B–D, respectively.
Figure 31C:
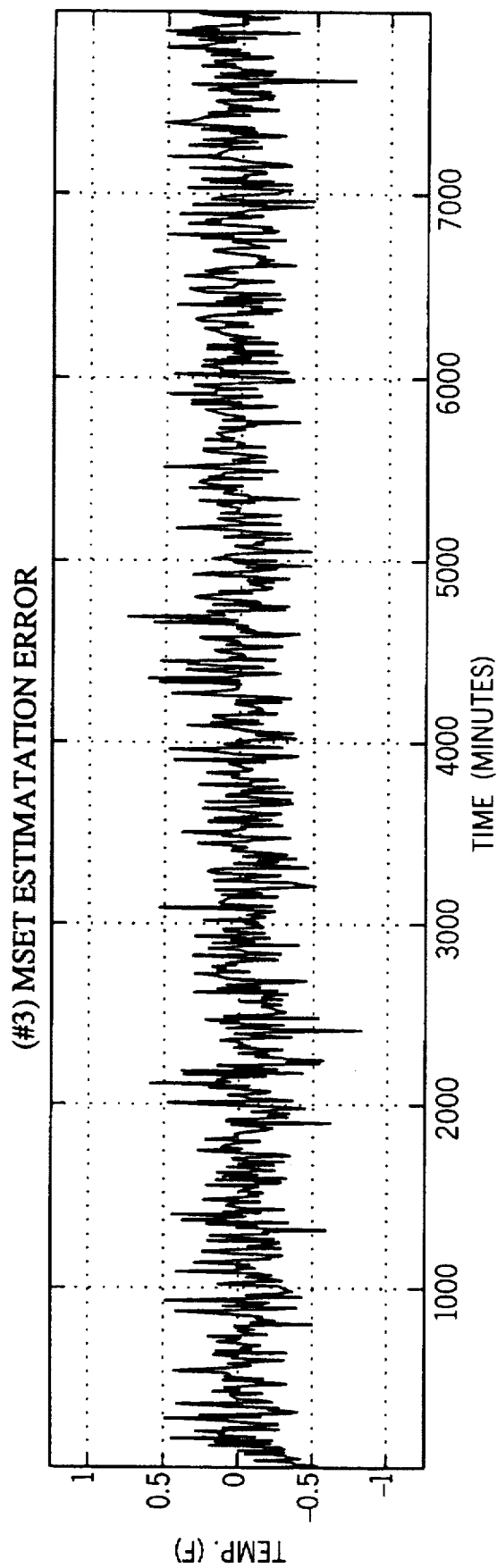
Figure 31D:
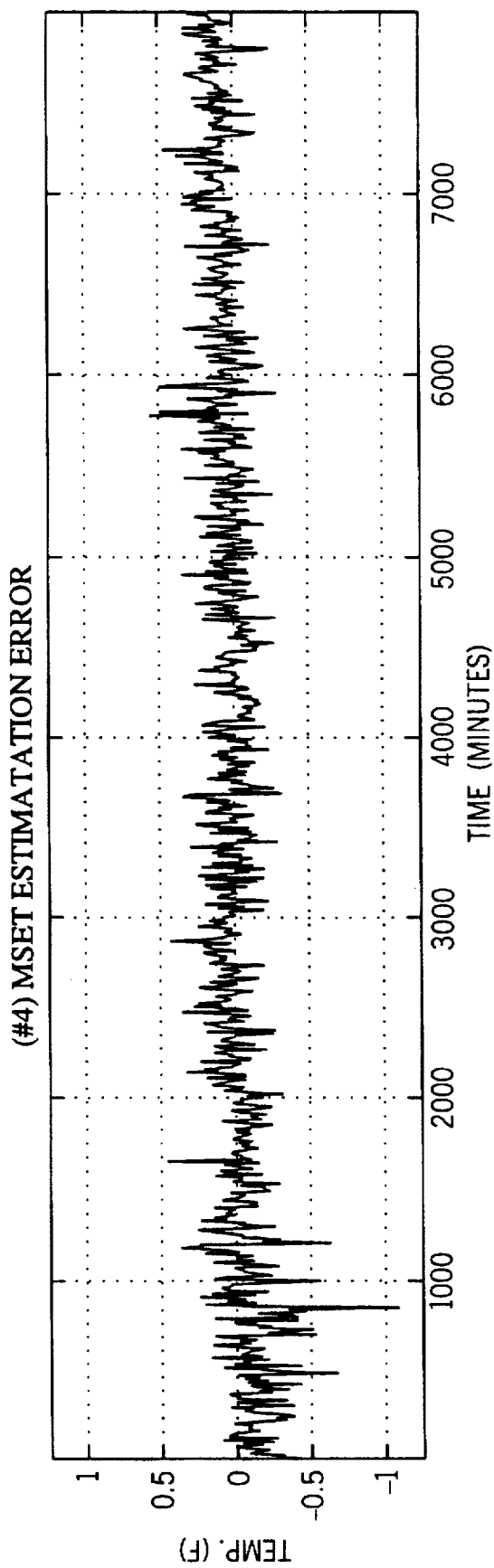
Figure 32A:
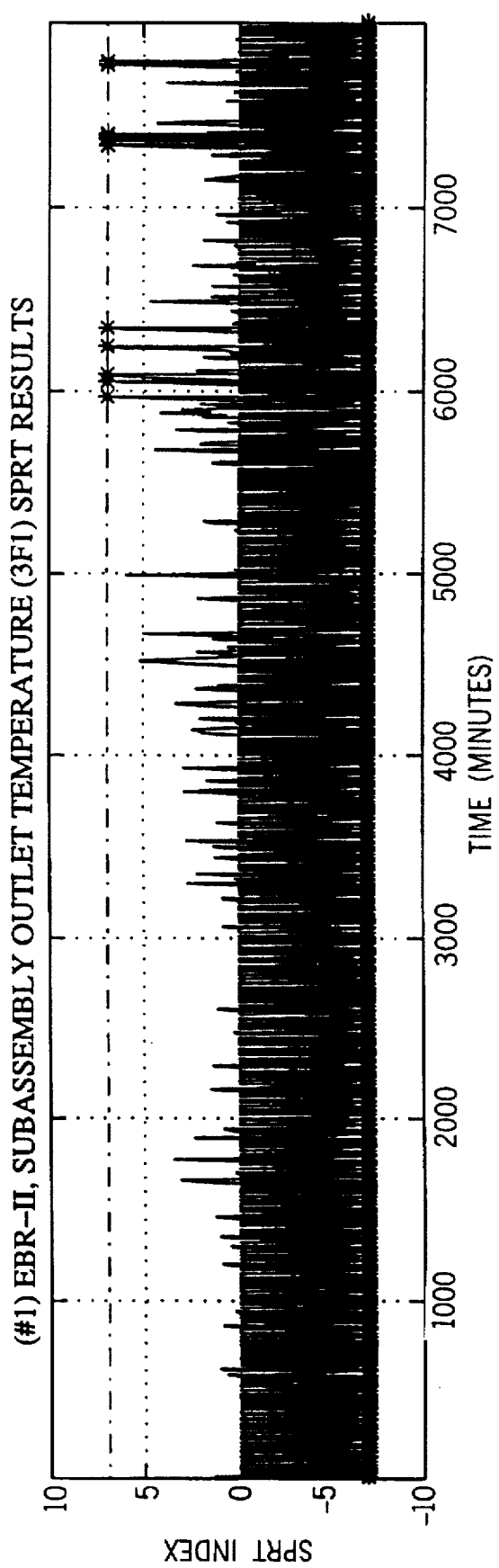
FIG. 32A illustrates the SPRT results for the gain change of FIG. 30A and SMSET analysis of FIG. 31A.
Figure 32B:
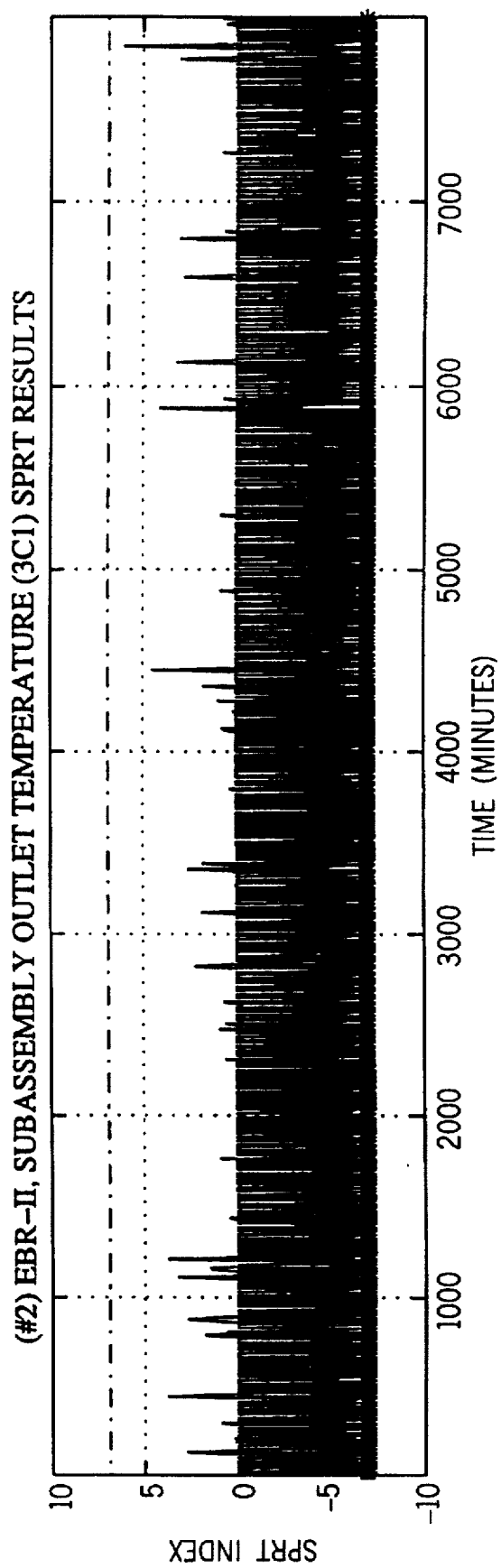
FIGS. 32B–D correspond exactly to FIGS. 23B–D, respectively.
Figure 32C:
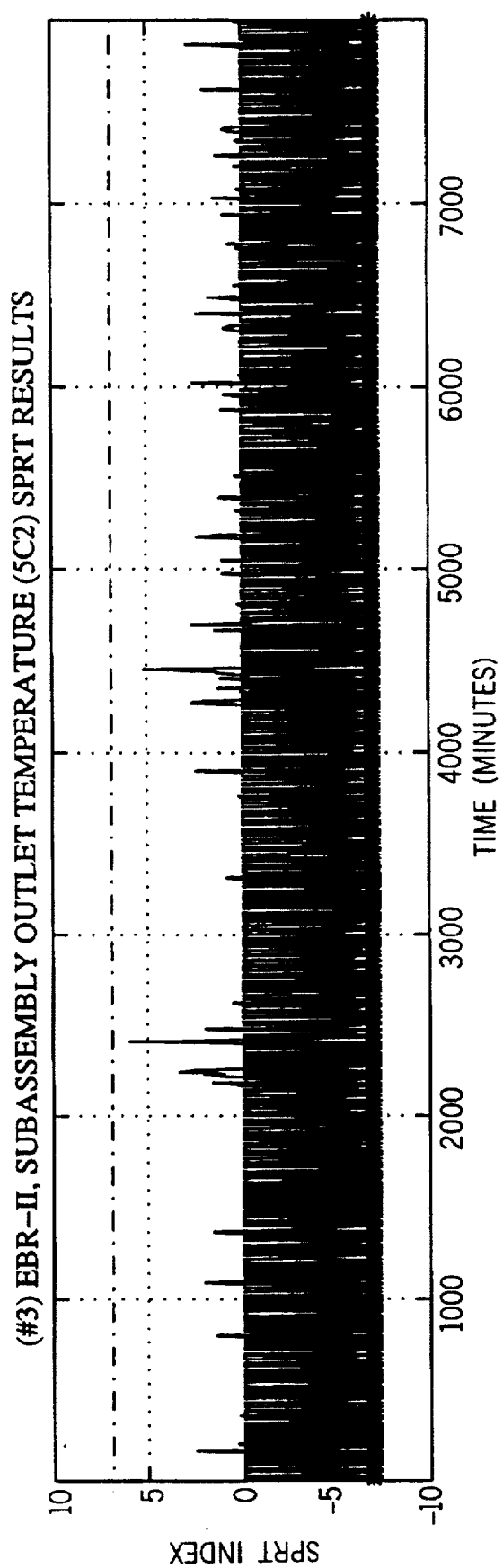
Figure 32D:
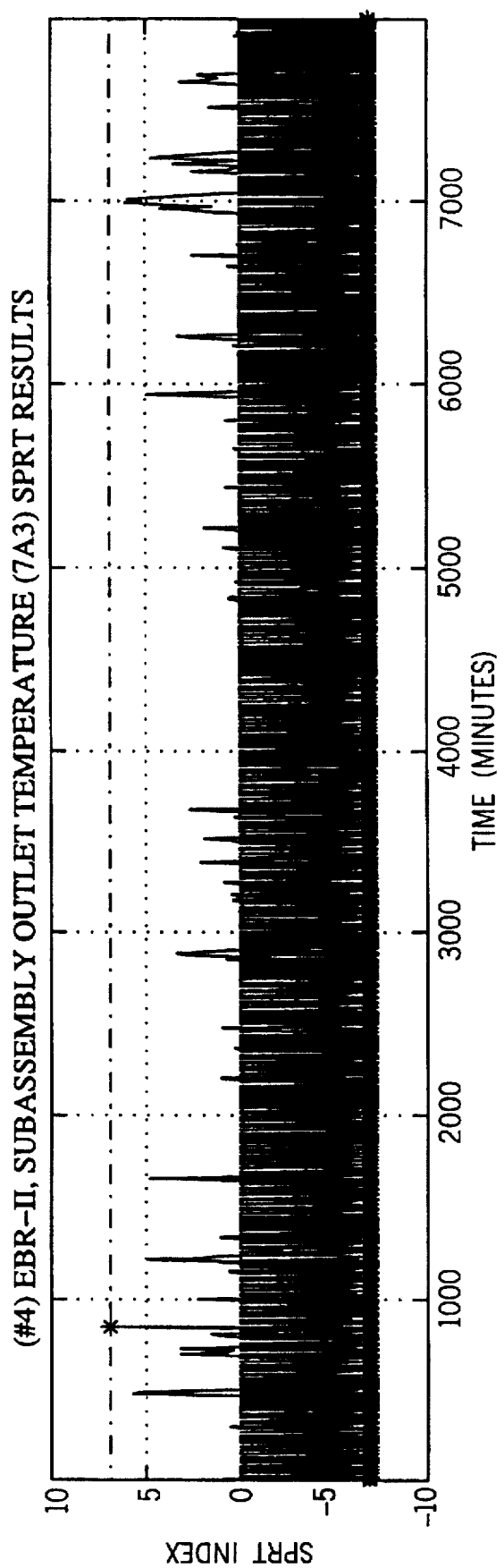

A methodology entitled MiniMax (Appendix B) was used to train the system using the two days of training data cited above. After the MiniMax method was applied, a training matrix was constructed consisting of twenty-five unique vectors constituting an empirical model of the overall system. After creating the model, the methodology was then applied to the signals listed in the accuracy table. Each signal in the system has its own estimation error signal that is a measure of how close the pattern recognition model is representing the system relative to the sensor readings. The second column of Table I lists the standard deviation of the estimate error for all of the signals in the experiment in terms of each of the signals' magnitude. The magnitude of the signal is defined by its mean during normal operation. The third column in Table I lists the mean of the estimate en or for all of the signals also in terms of the signal magnitude. In general the estimate en or standard deviations are in the range of 0.01% to 0.1% and the estimate error means are centered around 0. Bar graphs of the tabular information are shown in FIGS. 20A and 20B as graphic representation of the accuracy information.

TABLE I

SMSET Estimation Accuracy Table for EBRII Data:

| Channel Number and Description | SMSET Estimate Error Standard Diviation (% of Sensor Magnitude) | SMSET Estimate Error Mean Value (% of Sensor Magnitude) |
|---|---|---|
| 1) Primary Pump #1 Power | 0.05245 | 0.01241 |
| 2) Primary Pump #2 Power | 0.14352 | 0.06595 |
| 3) Primary Pump #1 Speed | 0.01078 | 0.00001 |
| 4) Primary Pump #2 Speed | 0.01272 | −0.00278 |
| 5) Reactor Outlet Flowrate | 0.09585 | 0.04452 |
| 6) Primary Pump #2 Flowrate | 0.06034 | −0.02495 |
| 7) Subassembly Outlet Temperature 2B1 | 0.04635 | 0.00339 |
| 8) Subassembly Outlet Temperature 2B1 | 0.04904 | −0.00118 |
| 9) Subassembly Outlet Temperature 4E1 | 0.05664 | −0.00306 |
| 10) Subassembly Outlet Temperature 4F1 | 0.04926 | −0.00413 |
| 11) Reactor Outlet Temperature 1534CF | 0.04727 | 0.00513 |
| 12) Primary Tank Sodium | 0.02440 | −0.00280 |
| 13) Primary Tank Sodium Level 531 Induction | 0.00615 | 0.00316 |

EXAMPLE III

In FIGS. 21–32 examples of different sensor failure modes are shown along with how the system reacts to the failures. The preferred method of FIG. 1 is applied to the data. The sensor signals used in these examples are from a subset of 22 sensor signals used in the system. The 22 sensors monitored the EBR-II subassembly system at Argonne National Laboratory (West). Each of FIGS. 21–32 contains four subplots in which the upper most plot is related to Subassembly Outlet Temperature ("SOT") 3F1, the upper middle plot is related to SOT 3C1, the lower middle plot is related to SOT 5C2, and the bottom plot is related to SOT 7A3. The system applied in each of the examples uses the same training matrix, which consists of 83 vectors selected from a training data base containing almost a weeks worth of data taken once every minute.

In FIGS. 21–23 are shown the results of using the system 10 during approximately 5.5 days of normal operation of EBR-II. FIG. 21 shows the SOT signals with their corresponding SMSET estimates (signal being the circles and the lines being the estimate). FIG. 22 shows the respective raw estimate errors (not in terms of the signal magnitude) derived by taking the difference between the SOR signals and corresponding SMSET estimates. Finally in FIG. 23 the results are shown from applying the decision making module of the system 10 (the SPRT module 50—see Appendix D) to the SMSET estimation errors of FIG. 22. The SPRT plots show a total of only three false alarms which is a false alarm rate of $9.4 \times 10^{-5}$, and this is well within the specified false alarm rate of $1.0 \times 10^{-3}$.

One type of failure mode that is common among sensors is a slow drift. This type of failure can be difficult to detect early on especially when the sensor signals contain noise. FIGS. 24–26 illustrate a comparative example of processing data from this type of failure and failure identification. Signal #2 (FIG. 24B) has a 0.2% linear drift in it's mean over the 2.75 day period starting at 4000 minutes into the signal. The other sensors are operating normally. FIG. 25 shows the resulting SMSET estimation errors for each sensor signal. The error plot for signal #2 (FIG. 25B) shows evidence of drifting after the sensor signal has drifted approximately 0.05%. In FIG. 26 the SPRT method has determined that #2 (FIG. 26B) is drifting after approximately 0.05% of drift and that all other sensors are operating normally.

Another type of failure that can occur is a step change in the sensor signal. This can be the result of a short in the sensor or DAS, a calibration error or for a variety of other reasons. FIGS. 27–29, show an example of this type of failure for the SOT measurements. In this example sensor signal #3 (FIG. 27C) contains a pulse with an amplitude of 0.25% of the signal magnitude. The pulse starts at 4000 minutes and lasts for 2000 minutes. FIG. 27 shows the sensor signals and the SMSET estimates for the four SOT signals. FIG. 28 shows the resulting SMSET estimation errors. The error signal :or #3 (FIG. 28C) shows that there is a problem starting at 4000 minutes and ending at 6000 minutes. The error signals are fed through the SPRT module 50, and the results are plotted in FIG. 29. Clearly, there has been a disturbance in sensor #3 (FIG. 29C) beginning at time 4000 minutes and ending at 6000 minutes.

In FIGS. 30–32 an example of a failure mode related to the sensor gain is shown. In this example the gain of the sensor signal changes over time, i.e., the amplitude is increasing over time. The gain begins changing linearly over time from a beginning value of 1 to a final value of 1+0.075% of the sensor magnitude. The system 10 for the estimation error is applied to the signals, and the results are shown in FIG. 31. A human operator would most likely not be able to tell that there is a problem even after 8000 minutes by looking at the sensor signal. In FIG. 31A, it is apparent that signal #1 is operating abnormally. This is confirmed in FIG. 32A by the SPRT results, showing a steadily increasing number of SPRT alarms over the 8000 minute period.

While preferred embodiments of the invention have been shown and described, it will be apparent to those skilled in the art that various changes and modifications can be made without departing from the invention in its broader aspects as set forth in the claims provided hereinafter.

Appendix A

Computer software for Leadlag module which performs dynamic, real-time intersensor lead-lag time correlation adjustments.

```
/***************************************************************/
/* LEADLAG OPTIMIZATION MODULE                                 */
/***************************************************************/ include <stdio.h>
include <math.h>
#include <stdlib.h>
include <string.h> define pi 3.1415926
define N 1024
#define xcsize 2047
#define fil_xcsize 2079
define filsize 32 void phase_shift_optimization(int argc,char argv[][20],int method);
void conv(float f[], float g[], float c[], int size);
void der(float y[], float diff[], int size);
void roots(float diffxc[], int size, float *root);
void fliplr(float a[], int size);
void prn_info(char *);

void main(int argc, char **argv)
{
 int i,method;
 char tempargv[10][20];

if(argc !=5) {
   prn_info(argv[0]);
   exit(1);
 } for(i=0;i<argc;i++)
   strcpy(tempargv[i],argv[i]);

printf("Enter 1 or 2 below.  (\"1\" means the employment of the");
 printf(" derivative technique to find the shift, while \"2\"");
 printf(" means the application of direct max. correlation");
 printf(" technique.):\n");
 scanf("%d",&method);

phase_shift_optimization(argc,tempargv,method);

} void phase_shift_optimization(int argc, char argv[][20], int method)
{
 int i,j,ph;
 float root;
 float f1[xcsize],f2[xcsize],b[fil_xcsize];
 float xc[fil_xcsize], fil_xc[fil_xcsize];
 float difffil_xc[fil_xcsize-1];
 FILE *infile1,*infile2,*infile3,*outfile, *outfile1, *outfile2;
```

```
/* Open the input and output data files. */
outfile=fopen(argv[4],"w");

for(i=0;i<xcsize;i++)
  { f1[i]=0;
    f2[i]=0;
  }
for(i=0;i<fil_xcsize;i++)
  { xc[i]=0;
    b[i]=0;
    fil_xc[i]=0;
  } if((infile1=fopen(argv[1],"r")) == NULL)
  { printf("There is no data file %s\n", argv[1]);
    exit(0);
  }
else
  { i=0;
    while((fscanf(infile1,"%f",&f1[i])) !=EOF)
      i++;
  } if((infile2=fopen(argv[2],"r")) == NULL)
  { printf("There is no data file %s\n", argv[2]);
    exit(0);
  }
else
  { i=0;
    while((fscanf(infile2,"%f",&f2[i])) !=EOF)
      i++;
  } if((infile3=fopen(argv[3],"r")) == NULL)
  { printf("There is no data file %s\n", argv[3]);
    exit(0);
  }
else
  { i=0;
    while((fscanf(infile3,"%f",&b[i])) !=EOF)
      i++;
  }

/* Calculate the cross-correlation of the input and the */
/* reference signals.                                   */ fliplr(f1,N);
conv(f1,f2,xc,xcsize);

/* To pass xc through a LPF */
conv(b,xc,fil_xc,fil_xcsize);

/* Find the shift. using direct max. correlation technique. */
if(method==2)
```

```
    { ph=fil_xc[0];
      j=0;
      for(i=0;i<fil_xcsize;i++)
        if(fil_xc[i]>ph)
          { ph=fil_xc[i];
            j=i;
          }
      ph=j-(fil_xcsize+1)/2;
      printf("The shift is %d\n",ph);
    }

/* Find the shift, using derivative technique. */
if(method==1)
  { der(fil_xc,difffil_xc,fil_xcsize);
    roots(difffil_xc,fil_xcsize-1,&root);
    ph=root-(fil_xcsize+1)/2;
    printf("The shift is %f\n",ph);
  }

/* Phase-equalize the input (f2) relative to reference (f1) */
/* If ph>0, f2 leads f1; if ph<0, f2 lags f1. */
if(ph>0)
  { for(i=ph;i<N;i++)
      f2[i-ph] = f2[i];
    for(i=N-ph;i<N;i++)
      f2[i]=0;
  } if(ph<0)
  { ph = -ph;
    for(i=N-1;i>=ph;i--)
      f2[i] = f2[i-ph];
    for(i=0;i<ph;i++)
      f2[i]=0;
  } for(i=0;i<N;i++)
  fprintf(outfile,"%f\n",f2[i]);

fclose(infile1);
fclose(infile2);
fclose(infile3);
fclose(outfile);
} void conv(float f[], float g[], float c[], int size)
{
  int m,k;

for(k=0;k<size;k++)
    { c[k]=0;
      for(m=0;m<=k;m++)
        c[k] = c[k]+f[m]*g[k-m];
    }
}
```

```
void fliplr(float a[], int size)
{
 int i,j;
 float temp;

j=floor(size/2);
 for(i=0;i<j;i++)
  { temp=a[i];
    a[i]=a[size-i-1];
    a[size-i-1]=temp;
  }
} void der(float y[], float diffy[], int size)
{
  int i;
  float diff;

for(i=0;i<size-1;i++)
     diffy[i] = y[i+1]-y[i];

} void roots(float diffxc[], int size, float *root)
{
 int i,j;
 float term;

if(diffxc[0]*diffxc[size-1] > 0)
   { printf("The cross_correlation is not unimodal.\n");
     exit(0);
   }
 else
   { (*root)=0.0;
     for(i=0;i<size-1;i++)
       { term=i;
         for(j=0;j<size-1;j++)
          if((i-j)>0)
            term=term*((-diffxc[j])/(diffxc[i]-diffxc[j]));
         (*root) = (*root) + term;

}
   }
} void prn_info(char *pgm_name)
{
 printf("\n%s%s\n",
    "Usage: ", pgm_name, " infile1 infile2 infile3 outfile");
 printf("\n");
 printf("Note that infile1 & infile2 are reference and input signal");
 printf(" respectively. infile3 should contain the coefficients of");
 printf(" the LPF, and outfile receives the phase-equalized input signal.\n");
}
```

Appendix B

Computer software for producing an optimal training set derived by searching signal information during a training period to construct training vectors including highest and lowest points for signals under surveillance.

```
/******************************************************************/
/*    MINIMAX TRAINING MODULE                                     */
/******************************************************************/ void MinMax(){ int L,W,j,i,k,numPairs,didSwitch;
    int time_pts[MAXSENS*2],c;
    /*int min_time_pts[MAXSENS];*/
    float minmax[2][MAXSENS],tmp,ex;

InitialScreen();
    textLook(YELLOW,BLUE);
    fseek(Train,0L,0);

gotoxy(17,8);
    cprintf("    train using the full file? (y/n):        ");
    gotoxy(56,8);
    c=getche();
    /*cscanf("%c",&c);*/ if(c=='n'){
        gotoxy(17,8);
        cprintf("    How many lines into the file:        ");
        gotoxy(53,8);
        cscanf("%d",&L);
    }
    else{
        L=lengthFile(Train);
        fseek(Train,0L,0);
    }

W=readinputSample(Train);

gotoxy(17,8);/*                                           */
    cprintf("    Finding max and min for all sensors...   ");
    for(j=0;j<W;j++){
        minmax[0][j]=Sample[j];
        minmax[1][j]=Sample[j];
        time_pts[j]=0;
        time_pts[W+j]=0;
```

```
                    for(j=0;j<RowsD;j++)
                            std[j]+=(D[j][i]-mn[j])*(D[j][i]-mn[j]);
            for(j=0;j<RowsD;j++)
                    std[j]/=(ColsD-1);

/**** Extending the range of the training matrix***/
            for(i=0;i<ColsD;i++){
                    for(j=0;j<RowsD;j++){
                            if(D[j][i]<=mn[j]){
                                    D[j][i]-=std[j]*ex;
                                    Dt[i][j]-=std[j]*ex;
                            }
                            else{
                                    D[j][i]+=std[j]*ex;
                                    Dt[i][j]+=std[j]*ex;
                            }
                    }
            }

}
int lengthFile(FILE *fl){
        char c;
        int i;
        i=0;
        while((c=getc(fl))!=EOF)
                if(c=='\n') i++;
        fseek(fl,0L,0);
        return (i);
}
/*
int widthFile(FILE *fl){
        char c;
        int i;
        i=0;
        while((c=getc(fl))!='\n'){

}
*/
int ChooseTraining()
{
        int ch, yy, xx, stop;
        char *buff;
        textLook(YELLOW,BLUE);
        gotoxy(8,7);
     cprintf(" There are four different ways of extracting training data from ");
        gotoxy(8,8);
        cprintf(" the training file, ");
        gotoxy(28,8);
        textLook(13,BLUE);
        cprintf("%-12s",training);
        gotoxy(40,8);
        textLook(YELLOW,BLUE);
        cprintf(", choose one below:          ");
            gotoxy(30,11);
            textLook(BLACK,LIGHTGRAY);
            cprintf(" 1) Use File as is ");
            gotoxy(30,13);
            cprintf(" 2) MinMax method  ");
            gotoxy(30,15);
```

30

```
                cprintf(" 3) Equally Spaced ");
                gotoxy(30,17);
                cprintf(" 4) Specify States ");

/* make selection */
                gotoxy(48,11);
                yy=11;
                xx=48;
                stop=0;
                while (stop!=1){
                        ch=getch();

if (ch==80){
                                yy=yy+2;
                                if (yy>17)
                                        yy=11;
                        }
                        if (ch==72){
                                yy=yy-2;
                                if (yy<11)
                                        yy=17;
                        }
                        if (ch==13) stop=1;
                        /*       TESTING CONTENTS        */

/*
                        gotoxy(1,22);
                        cprintf("                              ");
                        gotoxy(1,22);
                        cprintf("choice = %d",((yy-9)/2));
                        */
                        gotoxy(xx,yy);

}
                return ((yy-9)/2);
} void GetSettings()
{
        int ch, yy, xx, stop;
        char *buff;

/* default F1 and F2 : columns for flow 1 and flow 2*/
        F1=1;
        F2=2;

textLook(YELLOW,BLUE);
        gotoxy(8,7);
    cprintf(" The default input and output file names are listed below.     ");
        gotoxy(8,8);
    cprintf(" Use %c and %c to move to selection, <backspace> to change name. ",
                        24,25);
        gotoxy(22,11);
        textLook(BLACK,LIGHTGRAY);
        cprintf(" 1) training data:");
        gotoxy(40,11);
        textLook(LIGHTGRAY,BLACK);
```

```
cprintf(" %s      ",training); /* use gotoxy(51,11) */
gotoxy(22,13);
textLook(BLACK,LIGHTGRAY);
cprintf(" 2) input data    :");
gotoxy(40,13);
textLook(LIGHTGRAY,BLACK);
cprintf(" %s      ",input); /* use gotoxy(51,13) */
gotoxy(22,15);
textLook(BLACK,LIGHTGRAY);
cprintf(" 3) SFM           :");
gotoxy(40,15);
textLook(LIGHTGRAY,BLACK);
cprintf(" 2              "); /* use gotoxy(51,15) */
gotoxy(22,17);
textLook(BLACK,LIGHTGRAY);
cprintf(" 4) Column flow 1:");
gotoxy(40,17);
textLook(LIGHTGRAY,BLACK);
cprintf(" 1              ");
textLook(BLACK,LIGHTGRAY);
gotoxy(22,19);
cprintf(" 5) Column flow 2:");
gotoxy(40,19);
textLook(LIGHTGRAY,BLACK);
cprintf(" 2              ");
gotoxy(37,21);
textLook(RED,LIGHTGRAY);
cprintf(" done "); /*use goto(42,21) */

/* make selection */
gotoxy(53,11);
yy=11;
xx=53;
stop=0;
while (stop!=1){
    ch=getch();

if (ch==80){
        yy=yy+2;
        if (yy>21)
            yy=11;
    }
    if (ch==72){
        yy=yy-2;
        if (yy<11)
            yy=21;
    } if ((ch==8)&&(yy!=21)){
        if (yy==11)
            NewName(xx,yy,1);   /* 1=training */
        if (yy==13)
            NewName(xx,yy,2);   /* 2=input    */
        if (yy==15)
            NewName(xx,yy,3);   /* 3=output   */
        if (yy==17)
            NewName(xx,yy,4);
        if (yy==19)
```

```
                    NewName(xx,yy,5);
            yy=yy+2;
    }
    if (yy==21)
            xx=42;
    else
            xx=53;

if ((yy==21)&&(ch==13)) stop=1;
    /*      TESTING CONTENTS        */

/*
    gotoxy(1,22);
    cprintf("                        ");
    gotoxy(1,22);
    cprintf("training = %s",training);
    gotoxy(1,23);
    cprintf("                        ");
    gotoxy(1,23);
    cprintf("input = %s\n",input);
    gotoxy(1,24);
    cprintf("                        ");
    gotoxy(1,24);
    cprintf("output = %s\n",output);
    */
    gotoxy(xx,yy);

}
}
void InitialScreen()
{
    textbackground(CYAN);
    clrscr();

textLook(RED,BLACK);
    highvideo();
    gotoxy(24,2);
    cprintf("                        ");
    gotoxy(24,3);
    cprintf(" MSET SIGNAL VALIDATION SYSTEM ");
    gotoxy(24,4);
    cprintf("                        ");
    normvideo();
    textLook(YELLOW,BLUE);

} void textLook(int txt, int bg){ textbackground(bg);
    textcolor(txt);
}
void NewName(int xpos, int ypos, int whc)
{
    int i, c, maxi;
```

```
    char temp[4];

textLook(LIGHTGRAY,BLACK);
    gotoxy(xpos-12,ypos);
    printf("            ");
    gotoxy(xpos-12,ypos);
    i=0;
    maxi=-1;
    while ((c=getche())!=13){
        if (c==8) {i=i-1;
            if (i<0) i=0;
        }
        else{
            maxi=max(i,maxi);
        switch (whc){
            case 1: training[i]=c; break;
            case 2: input[i]=c;    break;
            case 3: temp[i]=c; break;
            case 4: temp[i]=c;break;
            case 5: temp[i]=c;break;
            default: break;
        }
        i++;
        }

}
    switch (whc){
            case 1: training[maxi+1]='\0';break;
            case 2: input[maxi+1]='\0';    break;
            case 3: temp[maxi+1]='\0';
                    FACTOR=(float) atof(temp); break;
            case 4: temp[maxi+1]='\0';
                    F1=atoi(temp); break;
            case 5:
                    temp[maxi+1]='\0';
                    F2=atoi(temp); break;
            default: break;
    }

/*    F1=F1-1;
          F2=F2-1;        */
}
```

Appendix C

Computer software for modeling behavior for examples of the operating states of the commercial system.

SMSET MODULE

```
% function [Erms, X_hat, Err,WW2,WW] = mset (Input, rangeL, rangeU, D, DDi, ...
%           out_cols, prt_cols, alpha, beta, p_flag,thrsh);
%
%     This function estimates the state of a system using the (MSET). It
%     allows scaling of the input data to the range
%     0 - 1 and the use of the algorithm in a predictive mode.
%
% Function outputs:
%      Erms     - Root mean squared errors for variables specified by
%                 prt_cols.
%      X_hat    - Estimated states for variables specified by prt_cols.
%      Err      = Estimation error for variables specified by prt_cols.
%
% Function inputs:
%      Input    - input state matrix: an N by M+1 array with the first column
%                 containing a timestamp. The array contains n observation
%                 vectors, with m dependent variables in each vector.
%      rangeL   - Length M vector, where each element sets the lower limit of
%                 data for a corresponding variable.
%      rangeU   - Length M vector, where each element sets the upper limit of
%                 data for a corresponding variable.
%      D        = Training set, an M by N array.
%      DDi      = Inverse of the similarity matrix (from auto_trainnsa).
%      out_cols = Optional vector specifying which columns represent output
%                 variables predicted by the algorithm. These variables are
%                 not included in the evaluation of W.
%      prt_cols - Optional vector specifying which columns to keep in the
%                 output.
%      alpha    = Multiplicative factor in the vprprod nonlinear operator.
%      beta     = Power factor in the vprprod nonlinear operator.
%      p_flag   - Print/don't print run progress data for 0/1.
%      thrsh    - Cutoff threshold for weighting vector W (default 0)
% The rangeL and rangeU vectors are used to specify the anticipated range of
% the variables. Data is linearly scaled from the ranges specified by these
% vectors to the range 0:1. If the rangeL vector specifies the lower limit of
% the data while rangeU is 0, then the code will shift the data by subtracting
% the rangeL values from each element in a corresponding column of the data.
% If both of the rangeL and rangeU vectors are set to a scalar value of 0,
% the data will not be scaled.

function [Erms, X_hat, Err,WW2,WW] = mset (Input, rangeL, rangeU, D, DDi, ...
         out_cols, prt_cols, alpha, beta, p_flag, thrsh);
if (nargin < 11), thrsh=0.0; end
tic % Case in which not enough inputs are specified.
if nargin < 5
    error('Required arguments are: Input, rangeL, rangeU, D and DDi\n\n');
end % Remove time stamp from input matrix and transpose input matrix.
Time = Input(:,1);
Y = Input(:,2:size(Input,2))';
[M, N] = size(Y);

% If out_cols, prt_cols, alpha, beta, and p_flag are not specified, pick
% default values for them.
if nargin == 5, out_cols=0; prt_cols=1:M; alpha=1; beta=1; p_flag=0; end
if nargin == 6, prt_cols=1:M; alpha=1; beta=1; p_flag=0; end
```

```
if nargin == 7, alpha=1; beta=1; p_flag=0; end
if nargin == 8, beta=1; p_flag=0; end
if nargin == 9, p_flag=0; end
if prt_cols == 0, prt_cols=1:M; end
if alpha == 0, alpha=1; end
if beta == 0, beta=1; end % Set print flag for debug printout.
print_flag = p_flag;

% Print message if print_flag is set.
if (print_flag >= 1)
    fprintf('\n Starting MSET ........\n\n');
end % Scale the input matrix to the range 0:1, if the rangeL and rangeU
% vectors are specified.
if (length(rangeL) == M) & (length(rangeU) == M)
    % Scale each observation vector in the training matrix.
        Y=(Y-rangeL'*ones(1,N))./...
               (rangeU'*ones(1,N)-rangeL'*ones(1,N));
    %for i = 1:M
    %    Y(i,:) = (Y(i,:) - rangeL(i)) / (rangeU(i) - rangeL(i));
    %end % Print message if print_flag is set.
    if (print_flag >= 1)
        fprintf(' Data is scaled to 0:1 range....\n\n');
    end
end % Shift the training matrix by the values specified in rangeL, if the rangeL
% vector is specified and rangeU is 0.
if (length(rangeL) == M) & (rangeU == 0)
    % Shift each observation vector in the training matrix.
    Y = Y - rangeL'*ones(1,N);
    %for i = 1:M
    %    Y(i,:) = Y(i,:) - rangeL(i);
    %end % Print message if print_flag is set.
    if (print_flag >= 1)
        fprintf(' Data is shifted by the values in rangeL....\n\n');
    end
end % If the are output columns specified, then remove these variables from the
% D and Y matrices.
D_proj = D;
Y_proj = Y;
if (out_cols ~= 0)
    D_proj(out_cols,:) = [];
    Y_proj(out_cols,:) = [];
end % Print message if print_flag is set.
if (print_flag >= 1)
    fprintf(' percent complete:   0');
end
```

```
X_hat = zeros(length(prt_cols),N);
tmp = zeros(M,1);
Erms = zeros(length(prt_cols),1);
Err = zeros(length(prt_cols),N);
DtY = zeros(M-length(out_cols),1);
W = zeros(N,1);

% Main loop. Calculate estimate vectors (X_hat) for each input state
% vector Y.
for i=1:N DtY = vprprod(D_proj', Y_proj(:,i), alpha, beta);
    W = DD1 * DtY;
        WW2(:,i)=W;
    %W = W ./ sum(W);
    ii=find(W<thrsh);
    if(length(ii)>0)
       W(ii)=zeros(length(ii),1);
    %  W = W./sum(W);
    end
       WW(:,i)=W;
    tmp = D * W;
    X_hat(:,i) = tmp(prt_cols);

% Print message if print_flag is set.
    if (print_flag >= 1)
        if ((rem(i,floor(N/100)) == 0) | (i==1))
            fprintf('\b\b\b');
            fprintf('%3.0f', i/N*100);
        end
    end end % Scale the X_hat matrix from the range 0:1 back to the range specified by
% the rangeL and rangeU vectors, if necessary.
if (length(rangeL) == M) & (length(rangeU) == M)
    % Scale each observation vector in the training matrix.
    %NNN=length(rangeU(prt_cols));
    %rU=rangeU(prt_cols); rL=rangeL(prt_cols);
    %X_hat=(rU(:)*ones(1,N)-...
    %          rL(:)*ones(1,N))...
    %        * X_hat + rL(:)*ones(1,N);
    for i = 1:length(prt_cols)
        X_hat(i,:) = (rangeU(prt_cols(i)) - rangeL(prt_cols(i))) * ...
                      X_hat(i,:) + rangeL(prt_cols(i));
    end
end % Shift the X_hat matrix back to the range of the data by adding rangeL to
% the data, if necessary.
if (length(rangeL) == M) & (rangeU == 0)
    % Shift each observation vector in the training matrix.
    NNN=length(prt_cols);
    X_hat=X_hat + rangeL(prt_cols)*ones(1,NNN);
    %for i = 1:length(prt_cols)
    %    X_hat(i,:) = X_hat(i,:) + rangeL(prt_cols(i));
    %end
end
```

```
% Reset Y matrix to input matrix.
Y = Input(:,2:size(Input,2))';

% Calculate error.
Err = Y(prt_cols,:) - X_hat;

% Calculate rms error for variables specified by prt_cols.
Erms = diag(Err * Err');
Erms = sqrt(Erms' ./ (N - M - 1));

% Add timestamp to X_hat and Err arrays and transpose X_hat and Err arrays.
X_hat = [Time'; X_hat]';
Err = [Time'; Err]';

if (print_flag >= 1)
  btm=fix(clock);
  fprintf('\n\n Total time to complete MSET using %d training vectors\n', ...
          size(D,2));
  fprintf(' to analyze %d observations with %d variables each: ', N, M);
  fprintf('%6.2f mins\n\n', toc/60);
end
```

```
% function [z, norm_dist] = vprprod (x, y, alpha, beta);
%
% This function performs the nonlinear operation on matrices x and y at the
% heart of the MSET. It uses the following nonlinear
% operator to compare vectors in the matrices:
%     f(dist) = 1 / (1 + alpha dist^beta),
% where dist is the normalized distance between a vector in y and each
% observation vector in x.
%
% If the constant alpha and beta are not specified, default values of 1 are
% used for both of them.
%
% This version of vprprod returns the norm of the distance between the
% each vector in y and the exemplar vetors in x. The vector distances are
% normalized with respect to the sum of the distance vectors.
%
%
% function [z, norm_dist] = vprprod (x, y, alpha, beta);

if (nargin == 2)
    alpha = 1;
    beta = 1;
end

[Nx,Mx] = size(x);
[Ny,My] = size(y);

if (Mx -= Ny)
    fprintf('\n\n in vprprod(x,y), the number of columns in x must\n');
    fprintf(' equal the number of rows in y\n\n');
    str=['columns in x: ', num2str(Mx), ...
    ' , and the number of rows in y: ', num2str(Ny)];
    error(str);
end % Initialize arrays.
z = zeros(Nx,My);
norm = zeros(Nx,My);
y1 = zeros(Nx,Mx);
dist = zeros(Nx,1);
tmp = zeros(Mx,Nx);

for i = 1:My

% Expand each column of y into a Nx by Ny (= Nx by Mx) matrix.
``` end

Appendix D

Computer software for performing pattern recognition by detecting onset of degradation in noisy signals.

```
/* SPRT MODULE
/*******************************************************************/

/* Start the SPRT analysis..... */
    /* Calculate The variance of the estimate errors*/ if (Length<calcLength) calcLength=Length;
    mean1=0.0; mean2=0.0;
    for (i=0;i<calcLength;i++){
            fgets(buf,13,error1);
            temp=atof(buf);
            mean1+=temp/calcLength;
```

```
            fgets(buf,13,error2);
            temp=atof(buf);
            mean2+=temp/calcLength;
    }
    fseek(error1,0L,0);
    fseek(error2,0L,0);
    variance1=0.0; variance2=0.0;
    for (i=0;i<calcLength;i++){
            fgets(buf,13,error1);
            temp=atof(buf);
            variance1+=(temp-mean1)*(temp-mean1)/(calcLength-1);
            fgets(buf,13,error2);
            temp=atof(buf);
            variance2+=(temp-mean2)*(temp-mean2)/(calcLength-1);
    }
    fseek(error1,0L,0);
    fseek(error2,0L,0);

/* Actual SPRT calculation and signal swapping logic */
    sub1=0; sub2=0;
    M1=FACTOR*sqrt(variance1);
    g1=M1/variance1;
    M2=FACTOR*sqrt(variance2);
    g2=M2/variance2;
    AA=log(BETA/(1-ALPHA));
    BB=log((1-BETA)/ALPHA);
    for(i=0;i<4;i++){
            if(i==0) fprintf(params,"%f\n",AA);
            if(i==1) fprintf(params,"%f\n",BB);
            if(i==2) fprintf(params,"%f\n",AA);
            if(i==3) fprintf(params,"%f\n",BB);
    }
    fclose(params);

Spos1=0; Spos2=0; Sneg1=0; Sneg2=0;

for (i=0;i<Length;i++){
      /*    fgets(buf,13,error2);
            temp=atof(buf);
      */ fscanf(error1,"%f\n",&temp1);
            fscanf(error2,"%f\n",&temp2);

if ((Spos1 == AA)||(Spos1 == BB)) Spos1=0;
            if ((Spos2 == AA)||(Spos2 == BB)) Spos2=0;
            if ((Sneg1 == AA)||(Sneg1 == BB)) Sneg1=0;
            if ((Sneg2 == AA)||(Sneg2 == BB)) Sneg2=0;

steppos1= -g1*(M1/2 - temp1); stepneg1= -g1*(M1/2 + temp1);
            steppos2= -g2*(M2/2 - temp2); stepneg2= -g2*(M2/2 + temp2);

Spos1 += steppos1; Sneg1 += stepneg1;
            Spos2 += steppos2; Sneg2 += stepneg2;

if(Spos1 <= AA) Spos1=AA;   if(Sneg1 <= AA) Sneg1=AA;
            if(Spos2 <= AA) Spos2=AA;   if(Sneg2 <= AA) Sneg2=AA;

if(Spos1 >= BB) Spos1=BB;   if(Sneg1 >= BB) Sneg1=BB;
            if(Spos2 >= BB) Spos2=BB;   if(Sneg2 >= BB) Sneg2=BB;
```

```
        if((Spos1>=BB)||(Sneg1>=BB)) sub1=1;
        if((Spos1<=AA)&&(Sneg1<=AA)) sub1=0;

if((Spos2>=BB)||(Sneg2>=BB)) sub2=1;
        if((Spos2<=AA)&&(Sneg2<=AA)) sub2=0;

fprintf(sprtpos1,"%f\n",Spos1);
        fprintf(sprtpos2,"%f\n",Spos2);
        fprintf(sprtneg1,"%f\n",Sneg1);
        fprintf(sprtneg2,"%f\n",Sneg2);

fscanf(flow1,"%f\n",&temp1);
        fscanf(fast1,"%f\n",&temp2);

if (sub1)
                fprintf(comb1,"%f\n",temp2);
        else
                fprintf(comb1,"%f\n",temp1);

fscanf(flow2,"%f\n",&temp1);
        fscanf(fast2,"%f\n",&temp2);

if (sub2)
                fprintf(comb2,"%f\n",temp2);
        else
                fprintf(comb2,"%f\n",temp1);
        if(fmod((double)(cnt+i+1),(double)per)==0){
           gotoxy(47,11);
           cprintf("%-3.3f ",((float)(cnt+i+1))/((float)Length)*100/2);
        }
    }
    gotoxy(47,11);
    cprintf("%-3.3f ",100.0);
    gotoxy(34,15);
    textLook(WHITE,RED);
    cprintf(" HIT ANY KEY ");
    gotoxy(45,15);
    getch();
    fclose(sprtpos1); fclose(sprtneg1); fclose(fast1); fclose(error1);
                fclose(comb1); fclose(flow1);
    fclose(sprtpos2); fclose(sprtneg2); fclose(fast2); fclose(error2);
                fclose(comb2); fclose(flow2);
    fclose(In);

}

/******************************************************************/
/******************************************************************/ int readinputSample(FILE *in)
```

```c
{
        int num, flag, i, j;
        char ch, buf[16];
        num=0; flag=0; i=0; j=0;

ch=fgetc(in);
        while((ch!='\n')&&(ch!=EOF)){
                num=(!(isspace(ch)));/*&&(ch!=',')&&(ch!='*'));*/
          /*    if (ch=='\n') {k++; RowsD=j; j=0;} */
                if (num==1){
                        buf[i]=ch;
                        i++;
                        flag=1;
                }
                if ((num==0)&&(flag==1)){ buf[i+1]='\0';
                        Sample[j]=(float) strtod(buf,NULL);
                        i=0;
                        flag=0;
                        j++;
                }
                ch=fgetc(in);
        }
        if (ch==EOF){
                /*      fclose(In);    */
                return (0);
        }
        else
                return (j);

} float Ratio(float num1, float num2){ if ((num1 == 0) || ( num2 == 0 ))
                return 0.0;
        else if (num1 >= num2)
                return num2/num1;
        else
                return num1/num2;
}
void AsIsD()
{
        int num, flag, i, j, k;
        char ch, buf[16];
        num=0; flag=0; i=0; j=0; k=0;
        while((ch=fgetc(Train))!=EOF){
                num=(!(isspace(ch))&&(ch!=',')&&(ch!='*'));
                if (ch=='\n') {k++; RowsD=j; j=0;}
                if (num==1){
                        buf[i]=ch;
                        i++;
                        flag=1;
                }
                if ((num==0)&&(flag==1)){
```

46

```
                    buf[i+1]='\0';
                    Dt[k][j]=(float) strtod(buf,NULL);
                    D[j][k]=(float) strtod(buf,NULL);
                    i=0;
                    flag=0;
                    j++;
                }
        }
        ColsD=k;
        fclose(Train);
}

/******************************************************************/
```

What is claimed is:

1. A method for monitoring at least one of an industrial process and industrial sensors, comprising the steps of:

generating time varying data from a plurality of industrial sensors;

processing the time varying data to effectuate optimum time correlation of the data accumulated fi-om the plurality of industrial sensors;

searching the time correlated data to identify maximum and minimum values for the data, thereby determining a full range of values for the data from the industrial process;

determining learned states of a normal operational condition of the industrial process and using the learned states to generate expected values of the operating industrial process;

comparing the expected values to current actual values of the industrial process to identify a current state of the industrial process closest to one of the learned states and generating a set of modeled data;

processing the modeled data to identify a pattern for the data and upon detecting a deviation from a pattern characteristic of normal operation, an alarm is generated.

2. The method as defined in claim 1 wherein the industrial process comprises a physical process.

3. The method as defined in claim 1 wherein the industrial process comprises a financial process.

4. The method as defined in claim 1 wherein the step of determining optimum time correlation comprises comparing pairs of sensor signals, each characteristic of a separate sensor and calculating a cross correlation vector over time, applying a low pass filter to remove noise from the cross correlation vector and determining phase shift between the sensor signals.

5. The method as defined in claim 4 wherein the step of determining phase shift comprises differentiating the cross correlation vector with respect to lag time between each pair of signals and performing an interpolation to compute the root of the differential of the cross correlation vector.

6. The method as defined in claim 1 wherein the step of identifying a current state of the industrial process closest to the learned state includes forming a combination of the learned states to identify a true state of the industrial process.

7. The method as defined in claim 6 further including the step of substituting an expected value for incomplete observations of the industrial process.

8. The method as defined in claim 1 wherein the step of detecting a deviation from normal operation comprises applying a sequential probability ratio test to the modeled data.

9. The method as defined in claim 1 wherein the step of detecting a deviation from normal operation comprises performing a pattern recognition analysis using computer means.

10. A method for monitoring at least one of an industrial process and an industrial data source, comprising the steps of:

generating time varying data from a plurality of industrial data sources;

determining learned states of a normal operational condition of the industrial process to use the learned states to generate expected values of the operating industrial process;

comparing the expected values to current values of the industrial process to identify a current state of the industrial process closest to one of the learned states and generating a set of modeled data;

processing the modeled data to identify a pattern for the data and upon detecting a deviation from a pattern characteristic of normal operation, an alarm is generated.

11. The method as defined in claim 10 wherein the step of identifying a current state of the industrial process closest to the learned state includes forming a combination of the learned states to identify a true state of the industrial process.

12. The method as defined in claim 10 further including the step of substituting an expected value for incomplete observations.

13. The method as defined in claim 10 wherein the industrial data source is selected from the group consisting of an industrial manufacturing process, a utility operation, a business operation, an investment process, weather forecasting and a transportation system.

14. The method as defined in claim 10 wherein the plurality of industrial data sources comprises a plurality of sensor pairs.

15. The method as defined in claim 10 wherein the step of processing the modeled data comprises applying a SPRT process.

16. The method as defined in claim 10 further including a step of determining time phase shift between the plurality of the time varying data being output.

17. A method for monitoring at least one of an industrial process and an individual date source, comprising the steps of:

sensing time varying data from at least one industrial data source of an industrial process;

determining learned states of a desired operational condition of the industrial process to use the learned states to generate expected values of the industrial process;

comparing the expected values to current sensed values of the industrial process to identify a current state of the industrial process closest to one of the learned states and generating data characteristic of the current state; and processing the data that is characteristic of the current state to identify a pattern for the data and upon detecting a deviation from a pattern characteristic of the desired operational condition, a signal is generated indicating at least one of the industrial process and the industrial data source is not of the desired operational condition.

18. The method as defined in claim 17 further including the step of searching the time varying data, before comparing the current actual values to the expected values, to identify minimum and maximum values for the data, thereby establishing a full range of values for the data.

19. The method as defined in claim 18 wherein each said industrial data source is characterized by two data values associated with the minimum and maximum values.

20. The method as defined in claim 17 wherein said step of processing the data characteristic of the current state to identify a pattern comprises applying a sequential probability ratio test.

21. The method as defined in claim 20 wherein data that is characteristic of the current state is processed to generate a set of modeled data which is further processed to identify the pattern for the data.

22. The method as defined in claim 17 wherein the industrial process is selected from the group consisting of a manufacturing process, a physical process, a chemical process, a biological process, an electronic process and a financial process.

23. The method as defined in claim 17 further including the step of substituting an estimated signal for said industrial data source upon detecting the deviation from a pattern characteristic of the desired operational condition, thereby replacing a faulted data source enabling continued operation and monitoring of the industrial process.

24. The method as defined in claim 17 further including the step of processing the time varying data to effectuate optimum time correlation of the data.

25. The method as defined in claim 24 wherein the step of determining optimum time correlation comprise comparing pairs of sensor signals, each characteristic of a separate sensor and calculating a cross correlation vector over time, applying a low pass filter to remove noise from the cross correlation vector and determining phase shift between the sensor signals.

26. A method for monitoring at least one of an industrial process and an industrial sensor, comprising the steps of:
 sensing time varying data from at least one industrial data source of an industrial process;
 searching signals from the at least one industrial data source to identify maximum and minimum values for the time varying data;
 determining learned states of a desired operational condition of the industrial process to use the learned states to generate expected values of the industrial process; and
 processing the expected values by identifying a pattern for the time varying data and upon detecting a deviation from the desired operational condition, a signal is generated indicating at least one of the industrial process and the industrial data source is not of the desired operational condition.

27. The method as defined in claim 26 further including the step of substituting an estimated signal for said industrial data source upon detecting the deviation from a pattern and characteristic of the desired operational condition, thereby replacing a faulted data source enabling continued operation and monitoring of the industrial process.

28. The method as defined in claim 26 further including the step of processing the time varying data to effectuate optimum time correlation.

29. The method as defined in claim 26 wherein the step of identifying a pattern for the time varying data comprises applying a sequential probability ratio test.

30. The method as defined in claim 26 wherein the industrial process is selected from the group consisting of a manufacturing process, a physical process, a chemical process, a financial process, an electronic process and a biological process.

* * * * *

UNITES STATES PATENT AND TRADEMARK OFFICE
CERTIFICATE OF CORRECTION

PATENT NO.      : 5,764,509

DATED           : June 9, 1998

INVENTOR(S)     : Gross et al.

It is certified that error appears in the above-identified patent and that said Letters Patent is hereby corrected as shown below:

In Column 3, line 15, delete "en-or" and insert "error "
In Column 3, line 24, delete "SIMSET" and insert "SMSET "
In Column 3, line 54, delete "en–or" and insert "error "
In Column 5, line 23, insert --)-- after "air conditioning systems "
In Column 5, line 28, delete "conelation" and insert "correlation "
In Column 6, line 22, delete "e.," and insert "e.g., "
In Column 6, line 56, delete "hue" and insert "true "
In Column 9, line 4, delete "en or" and insert "error "
In Column 9 line 6, delete "en or" and insert "error "
In Column 10, line 34, delete ":or" and insert "for "
In Column 61, line 7, delete "from'" and insert "from "

Signed and Sealed this

Second Day of March, 1999

Attest:

Q. TODD DICKINSON

*Attesting Officer*    Acting Commissioner of Patents and Trademarks